United States Patent
Moffat

(10) Patent No.: US 9,397,983 B2
(45) Date of Patent: *Jul. 19, 2016

(54) PRIVATE DATA SHARING SYSTEM

(71) Applicant: Brian Lee Moffat, Simi Valley, CA (US)

(72) Inventor: Brian Lee Moffat, Simi Valley, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/638,294

(22) Filed: Mar. 4, 2015

(65) Prior Publication Data

US 2015/0180839 A1     Jun. 25, 2015

Related U.S. Application Data

(63) Continuation of application No. 13/878,345, filed as application No. PCT/US2011/055829 on Oct. 11, 2011, now Pat. No. 9,015,281, which is a continuation-in-part of application No.

(Continued)

(51) Int. Cl.
    *H04L 29/06* (2006.01)

(52) U.S. Cl.
    CPC ........ *H04L 63/0428* (2013.01); *H04L 63/0435* (2013.01); *H04L 63/08* (2013.01); *H04L 2209/16* (2013.01)

(58) Field of Classification Search
    CPC ............. H04L 9/06; H04L 9/32; H04L 9/082; H04L 29/06; H04L 63/0428; H04L 63/0435; H04L 63/08
    USPC .......... 713/168, 150–151; 709/218, 225–229; 380/277
    See application file for complete search history.

(56) References Cited

U.S. PATENT DOCUMENTS

| | | |
|---|---|---|
| 5,235,641 A | 8/1993 | Nozawa et al. |
| 6,345,101 B1 | 2/2002 | Shukla |
| 6,429,866 B1 | 8/2002 | Brundett et al. |

(Continued)

FOREIGN PATENT DOCUMENTS

| | | |
|---|---|---|
| EP | 2341682 | 7/2011 |
| WO | WO2010028437 | 3/2010 |

OTHER PUBLICATIONS

Jahid, Sonia et al., Easier; Encryption-based Access Control in Social Networks with Efficient Revocation, ASIACCS '11, Mar. 22-24, 2011, Hong Kong, China; Mar. 22, 2011.

(Continued)

*Primary Examiner* — Thu Ha Nguyen
(74) *Attorney, Agent, or Firm* — Brooks Acordia IP Law, PC; Douglas N. Larson

(57) ABSTRACT

A novel architecture for a data sharing system (DSS) is disclosed and seeks to ensure the privacy and security of users' personal information. In this type of network, a user's personally identifiable information is stored and transmitted in an encrypted form, with few exceptions. The only key with which that encrypted data can be decrypted, and thus viewed, remains in the sole possession of the user and the user's friends/contacts within the system. This arrangement ensures that a user's personally identifiable information cannot be examined by anyone other than the user or his friends/contacts. This arrangement also makes it more difficult for the web site or service hosting the DSS to exploit its users' personally identifiable information. Such a system facilitates the encryption, storage, exchange and decryption of personal, confidential and/or proprietary data.

63 Claims, 21 Drawing Sheets

Related U.S. Application Data

PCT/US2011/055417, filed on Oct. 7, 2011, said application No. PCT/US2011/055829 is a continuation-in-part of application No. 13/270,118, filed on Oct. 10, 2011, now abandoned, which is a continuation-in-part of application No. PCT/US2011/055417, filed on Oct. 7, 2011.

(60) Provisional application No. 61/404,794, filed on Oct. 8, 2010.

(56) References Cited

U.S. PATENT DOCUMENTS

| | | | |
|---|---|---|---|
| 6,584,567 B1* | 6/2003 | Bellwood | H04L 63/0464 713/171 |
| 6,965,992 B1 | 11/2005 | Joseph et al. | |
| 7,249,377 B1* | 7/2007 | Lita | G06F 21/6236 380/255 |
| 7,587,051 B2 | 9/2009 | Bisson et al. | |
| 7,971,234 B1 | 6/2011 | Sussland et al. | |
| 8,245,285 B1* | 8/2012 | Ravishankar | G06F 21/77 726/9 |
| 2002/0169953 A1* | 11/2002 | Moharram | H04L 63/0823 713/151 |
| 2003/0163697 A1 | 8/2003 | Pabla et al. | |
| 2004/0010467 A1 | 1/2004 | Hori et al. | |
| 2004/0034776 A1 | 2/2004 | Fernando et al. | |
| 2004/0117626 A1* | 6/2004 | Andreasyan | H04L 9/3263 713/175 |
| 2004/0133876 A1* | 7/2004 | Sproule | G06Q 10/063 717/105 |
| 2005/0021398 A1 | 1/2005 | McCleskey et al. | |
| 2007/0130070 A1 | 6/2007 | Williams | |
| 2007/0172066 A1 | 7/2007 | Davin | |
| 2007/0240226 A1 | 10/2007 | Song et al. | |
| 2008/0005195 A1 | 1/2008 | Li | |
| 2008/0063191 A1 | 3/2008 | Hatano et al. | |
| 2008/0184031 A1* | 7/2008 | McGough | H04L 63/062 713/171 |
| 2008/0222734 A1* | 9/2008 | Redlich | G06F 21/577 726/26 |
| 2009/0006853 A1 | 1/2009 | Li | |
| 2009/0150968 A1 | 6/2009 | Ozzie et al. | |
| 2009/0158041 A1 | 6/2009 | Kang et al. | |
| 2010/0031335 A1 | 2/2010 | Handler | |
| 2010/0046749 A1 | 2/2010 | Hatano et al. | |
| 2010/0058054 A1 | 3/2010 | Irvine | |
| 2010/0095119 A1 | 4/2010 | Tachibana | |
| 2010/0205221 A1 | 8/2010 | Shaw et al. | |
| 2011/0040975 A1 | 2/2011 | Alve et al. | |
| 2011/0154041 A1 | 6/2011 | Godfrey et al. | |
| 2011/0197237 A1 | 8/2011 | Turner | |
| 2012/0087356 A1 | 4/2012 | Wentink | |
| 2012/0102329 A1* | 4/2012 | Mittal | G06F 21/10 713/176 |
| 2012/0324242 A1 | 12/2012 | Kirsch | |
| 2012/0331283 A1 | 12/2012 | Chandran et al. | |
| 2013/0061035 A1 | 3/2013 | Hook et al. | |
| 2013/0138965 A1 | 5/2013 | Kamijoh et al. | |
| 2013/0212393 A1 | 8/2013 | D'Souza | |
| 2013/0275758 A1 | 10/2013 | Marlow | |
| 2013/0318339 A1 | 11/2013 | Tola et al. | |
| 2014/0010108 A1 | 1/2014 | Tavildar et al. | |

OTHER PUBLICATIONS

PCT/US2011/055829, Written Opinion, Mar. 7, 2012.
PCT/US2011/055829, ISR, Mar. 7, 2012.
PCT/US2011/055829, IPRP (Corrected), Feb. 27, 2013.
U.S. Appl. No. 13/878,345, Notice of Allowance, Dec. 12, 2014.
PCT/US2011/055829, IPRP, Feb. 27, 2013.
Kamara and Lauter, "Cryptographic Cloud Storage," Nov. 13, 2009, Retrieved from Internet Oct. 7, 2014:URL:http://research.microsoft.com/en-us/people/klauter/cryptostoragerIcps.pdf Sections 1-4.
Dai and Zhou, "A PKI-based Mechanism for Secure and Efficient Access to Outsourced Data," Networking & Digital Society, 2010 2nd International Conference, Piscataway, NJ, May 30, 2010, pp. 640-643, Sections 1 and 2, abstract.
European Search Report for EP Application No. 11831765 mailed Apr. 16, 2015.

* cited by examiner

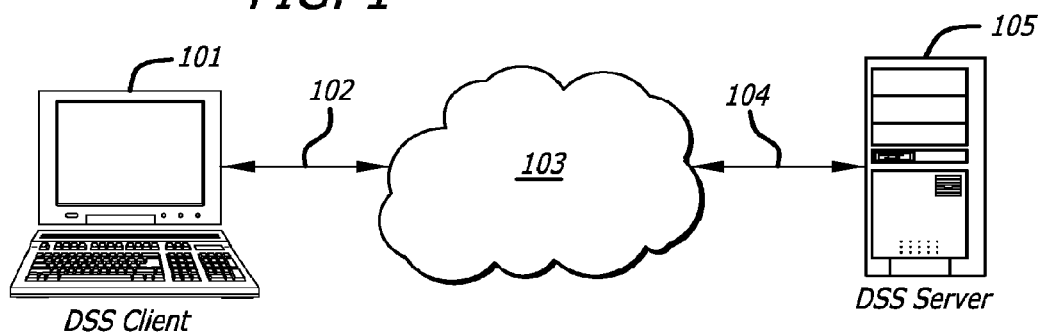
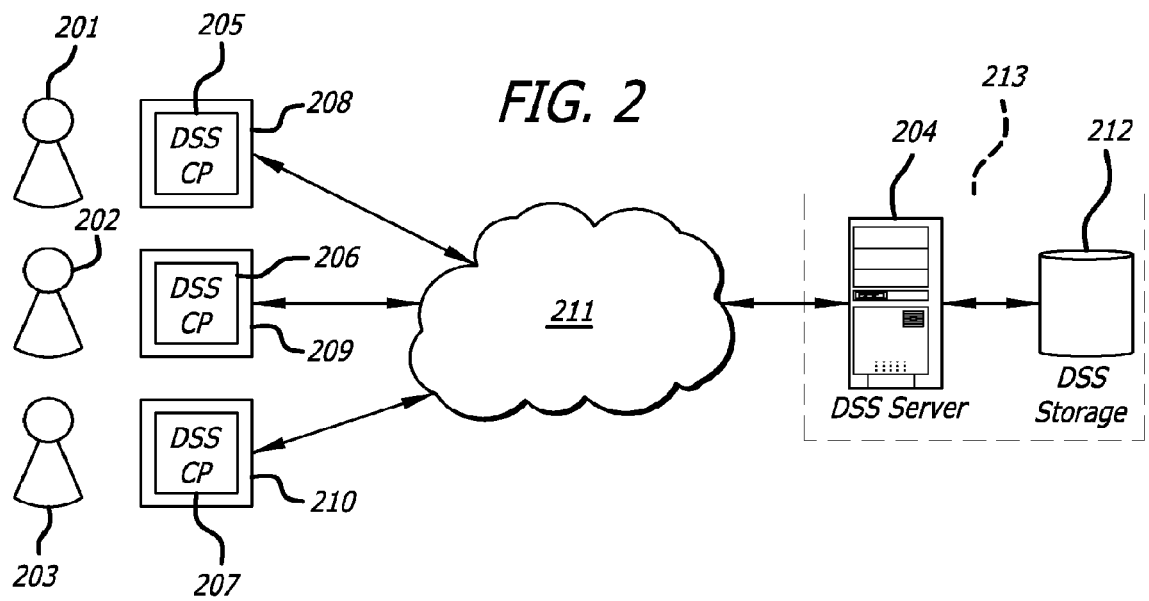

PRIVATE DATA SHARING SYSTEM

CROSS-REFERENCE TO RELATED APPLICATIONS

This application is a continuation of application Ser. No. 13/878,345, filed Apr. 24, 2013, and which is a National Stage Entry of International Application PCT/US11/55829. PCT/US11/55829 claims the benefit of U.S. Provisional Application Ser. No. 61/404,794, filed Oct. 8, 2010, and whose entire contents are hereby incorporated by reference; and claims the benefit of International Application No. PCT/US11/55417, filed Oct. 7, 2011, and whose entire contents are hereby incorporated by reference; and claims the benefit of U.S. application Ser. No. 13/270,118, filed Oct. 10, 2011, and whose entire contents are hereby incorporated by reference. U.S. application Ser. No. 13/270,118 claims the benefit of International Application No. PCT/US11/55417 and U.S. Provisional Application Ser. No. 61/404,794. International Application No. PCT/US11/55417 claims the benefit of U.S. Provisional Application Ser. No. 61/404,794.

BACKGROUND

A person's "social network" can be defined as a set of inter-personal relationships that characterize a person's life. A person's social network can also be defined as that person's set of primary, habitual, long-term communication partners. A person's "full" social network can be composed of many, possibly overlapping, smaller social networks, where many, if not all, of the smaller social networks are defined by a shared experience (e.g. attendance at a specific school), familial relationship (e.g. brothers), interest (e.g. fast cars), belief (e.g. a particular religion), genealogy (e.g. family members), goal (e.g. losing weight), location (e.g. a particular neighborhood) and so forth.

A "virtual" social network can be defined as one aspect of the manifestation of a full social network, in which interpersonal communication is achieved by "impersonal" means, rather than through face-to-face exchanges of information.

An online social network can be defined as a virtual social network, or a part thereof, in which information is exchanged by members of that social network through the electronic transmission, and/or exchange, of digital data across the Internet, or across an equivalent or similar electronic and/or electromagnetic medium.

Some social networks are intended to promote non-specific social interactions, e.g. Facebook (which is a general online social network) and MySpace (which is also a general online social network). Others are intended to facilitate specialized types of interactions. For instance, some social networks are intended to help business people promote themselves, their services and/or their businesses. An example thereof is LinkedIn, which is an online social network dedicated to promoting "business and professional networking." Some social networks promote the interaction, and mutual support, of people who have all shared, or are all sharing, a common type of hardship. An example thereof is CaringBridge, which is a charitable nonprofit organization offering free personalized websites to people facing a serious medical condition or hospitalization, undergoing medical treatment and/or recovering from a significant accident, illness, injury or procedure. Its functionality is similar to a blog. And, some are designed to coordinate and support the efforts, and share the work, of people who share a common passion. Examples thereof are Care2 ("green living and social activism") and Flickr (dedicated to sharing photos). Some social networks promote other types of topic-specific or domain-specific social interactions.

Many times, social networks that are created and marketed with a specific stated intent, such as to provide an online community for racing car enthusiasts, are utilized by their members for a different purpose, such as to exchange tips for raising vegetables in an arid environment. Despite their stated purposes, the unifying themes of social networks created online, within particular web sites, are typically determined solely by the users communicating within those social networks.

New social networks, and social networks intended to address novel needs, arise with great frequency. One of the greatest hindrances to the greater adoption and utility of social networks is the lack of adequate security and privacy, both perceived and real. There is a long-felt need for secure social networks in which only users, and the "friends" that those users specify, are able to gain access to the users' personal and/or private data. By limiting access to a user's PID ("personally identifiable data or information") to the user who created it, and to the friends of that user, both the real and the perceived privacy and security of that potentially sensitive information are increased.

Online social networks (OSN's) represent one specialized version of more general data sharing (systems or) networks (DSS's). Many organizations require the ability to share data among and between their members. For instance, many businesses must archive and share digital information among their employees, for instance, data regarding past and current clients, company policies and resources, documentation of procedures and methods, etc. Many governmental organizations must archive and share digital information among their staff, for instance, memos, analyses, projections, policies and directives. Many law enforcement agencies must archive and share digital information related to criminal investigations, suspects, tips, etc. Even some large health care organizations must archive and share digital information among doctors and staff related to patients, the results of medical tests and procedures, insurance claims and policies, etc.

And, as with the users of OSN's, the organizations and people who use these more general DSS's tend to be concerned about the vulnerability of their data, and the criminal and civil repercussions which could follow any penetration of their DSS's by hackers. Again, there is a long-felt need among many businesses and organizations for a DSS which can better protect the security and privacy of their data.

Any other user within a DSS with which any other particular user agrees to communicate and share data will be referred to herein as a "contact" or "friend" of that user. And the set of users with which any particular user of a DSS agrees to share personal information will be referred to as the "contacts" or "friends" of that user.

DSS's are varied in their central themes, objectives and user interface designs. However, most DSS's share certain server functionalities. Most DSS's today provide users with many or all of the following:

(1) The ability to create and share a "profile" about one's self to help to identify, and to differentiate, one's self from other members of the DSS (especially true with respect to OSN's). These profiles typically aid in the discovery of other members of an OSN which any particular user may wish to add as a friend.

(2) The ability to post and share comments about one's self and/or about one's friends.

(3) The visual and/or organizational discrimination of media by type. For instance, in an OSN, there is often a section, that is, a partition of each user's data within that DSS, dedicated to the storing of photos, the creation of albums of photos, the generation, storage and display of comments regarding individual photos, etc. In a DSS, there are often sections related to categorical subjects such as documents of various types (e.g. policies, letters, memos, reports, etc.), particular people (e.g. clients, patients, criminals, victims, etc.), particular places, etc.

(4) The ability to upload and share media, such as photos and videos.

(5) The ability to access, view and comment on media posted by one's self and one's friends.

(6) The automated generation and receipt of notifications regarding the activities of one's self and one's friends.

(7) The ability to exchange private messages with one's friends.

(8) The chronological ordering and/or automated expiration of user created and/or uploaded media. Social, as well as professional, interactions are typically facilitated by prioritizing the presentation to users of the most recent, or most recently edited or amended media. Also, many types of social media, such as comments and automated notifications tend to lose their relevance to users within a social context as time passes. So, the automated hiding or deletion of such "old" media tends to increase the satisfaction of users of a DSS.

(9) Usually in a seamless and transparent manner, tools are needed to create, view, edit, upload, transmit and so forth the relevant types of media (such as text, email, audio, photos and videos) which are typically stored and/or exchanged within a DSS. This also often includes the provision of the means for engaging in real-time communications, e.g. text and/or video chat.

Many companies offer social networks or the software with which people may implement their own social networks. For instance, currently popular social networks include: Facebook, MySpace, Google+, LinkedIn and others. There are also companies, open source projects and other sources, which endeavor to provide the tools for individuals, and/or groups, to establish their own social networks. Often these tools result in the creation of "distributed," and/or "peer-to-peer," social networks, in which centralized servers are replaced with loose networks of geographically-distant cooperating servers. These companies/projects include: Elgg (which is an open source social networking software that provides individuals and organizations with the components needed to create an online social environment); Appleseed (which is the first open source, fully decentralized social networking software); and OneSocialWeb (whose project aims to define a language to bridge these networks and make it easy for social networks to join a bigger social web).

There are companies which offer special-purpose online repositories of user data. The data stored within these online repositories is often encrypted with a company-supplied encryption key. These encrypted online repositories of user data, and an associated program running on a user's local computing device, are often used to automatically "back up" the contents of the user's hard drive(s) so that the data stored on such hard drive(s) can be restored should the hard drive(s) become non-functional, or be lost or stolen. These online repositories of encrypted user data are typically not shared and so are unable to facilitate social interactions between people. For these and other reasons, these online repositories of encrypted data do not provide the functionality which characterizes most social networks.

Companies, such as Dropbox, offer other types of online repositories which are intended to be shared between two or more users. These "communal" online repositories serve as shared data storage locations which may be associated with virtual folders, or directories, on the local computing device(s) of each associated user. The shared user data is typically stored on the local computing device(s) of each of the sharing users, as well as on one or more centralized data storage devices belonging to the company providing the service. The "mirrored" data, distributed among the user data stores, and the centralized data store(s), is typically kept synchronized, so that a change in any one user's data store can quickly be implemented in the data stores of each of the other users, as well as on the centralized data store(s).

The data stored on the computing devices of users is typically not encrypted (unless the user encrypts it). However, the data stored on the centralized storage device(s), and the data transmitted across the Internet, is often encrypted. The data storage company typically provides the encryption key used to achieve the encryption, and this intermediate state of encryption is typically hidden from the user. In fact, the user is usually unaware of the encryption method and the value of the encryption key used.

The computers, servers and/or programs of the centralized shared data storage web sites are often in possession of the encryption key(s) used to encrypt the user data, and are often able at any time to decrypt and examine that data. In fact, these sites regularly compare the unencrypted data in their stores, with the data stored on the users' computing, and/or storage devices, in order to detect any differences that need to be shared with the other users who have access to that data.

Users of these communal online repositories are able to share files of data, which can include photos, movies, audio files, text documents and so forth. And, users who elect to share one of these communal online repositories are often notified of any changes to the contents of the shared repositories, or to the contents of the individual files stored within those repositories. However, this is typically the extent of the "social" functionality provided by these companies, and this functionality is typically only provided to the extent that it facilitates the sharing of digital computer files among and between their users.

Technology able to facilitate the sharing of information across long distances has become more and more sophisticated over time. One can argue that the first "data sharing systems" were post offices which primarily delivered packets of hand-written information to the addresses specified on the envelopes. Later came the telegraph, allowing textual information to be quickly delivered to a specified recipient. And, later still, came the telephone which made possible the dynamic, and instantaneous, sharing of verbal information, and later digital information via modem. One might argue that the Internet represents the culmination of these earlier efforts in that it makes possible the near instantaneous sharing of a wide variety of data types on a global scale.

In modern terms, DSS's can generally be described as systematic means for the rapid exchange of digitally-encoded electronic data between, and within, a group of electronic computing devices. In such a DSS, some computing devices tend to be dedicated to the task of relaying digital data from one computing device to another. These types of computing devices are called "servers." Other computing devices are typically used by individuals who wish to use the DSS to share data with other users of the DSS. The computing devices operated by these communicating users tend to be dedicated to the creation and transmission of data packets (DP) to be shared with other users, as well as to the receipt and presentation of DP shared by other users. These types of computing devices are called "clients." And, in certain specialized DSS configurations (e.g. in "peer-to-peer" networks) computing devices may serve as both clients and servers.

One popular, and relatively new, type of DSS is the "online social network" (OSN), such as those discussed above. In an OSN, disparate groups of people who desire to communicate with one another are, by means of specialized programs and/or hardware, able to use their computing devices to share their own text, photos, videos, sound files, etc. with other users within the respective OSN-specific groups of people to which they belong (i.e. with their "friends"). They are also thereby able to receive and experience similar types of data generated and shared by their friends. "Facebook," "Google+" and "LinkedIn" are popular and well-known OSN's.

SUMMARY

Shared online data archives typically do not provide at least some of the server functionalities which are characteristic of the operation and utilization of OSN's and DSS's. These missing functionalities typically include: (1) The tools to directly create, edit, view, and otherwise manipulate, the files being stored. (While shared online archives often provide notification of newly uploaded and updated files, they do not directly provide the user with the tools required to display or edit the associated content.) (2) The direct exchange of messages between users within the shared online archives, e.g. chat and/or email. (3) The generation, distribution and display of comments, separate from, and not necessarily related to, any particular file(s) in these shared repositories. (4) The visual and/or organizational discrimination of data by data type, e.g. the segregation of photos and/or other image files, the segregation of videos, etc. (5) The automated hiding or deletion of "old" media (in fact, this type of social functionality would be completely inappropriate within the context of a shared online archive, wherein files should only be deleted by the users themselves).

A "private" DSS is disclosed herein that allows users and their specified contacts to have sole access to the data which those users create, modify and/or upload. The exclusive and proprietary access of a user, and that user's designated contacts and/or friends, to the user's data within the context of a data presentation and/or editing system is a novel aspect of the present disclosure.

Another novel aspect of the present disclosure is the specification of a DSS in which each user's data is obfuscated in a unique manner, and each user's obfuscated data can be shared with that user's contacts and/or friends in a secure and convenient manner because each user's contacts and/or friends are provided, a priori, with the unique means required to de-obfuscate that user's data. Convenience is achieved by means of a client program which stores the set of de-obfuscation means required by a user to de-obfuscate the obfuscated data which may be generated and shared by each of the user's contacts and/or friends. Convenience may be further increased through the use of an automated means of exchanging such user-specific means of data de-obfuscation between contacts.

Some other DSS's herein can encrypt user data before that data is transmitted through the Internet to the corresponding DSS server. These DSS's may even store only encrypted versions of the user data in their computers, servers and/or other computing devices. However, if the DSS server preserves the ability to decrypt, view, analyze or otherwise gain access to a user's data as a normal part of the operation of that DSS, then the DSS has failed to provide its users with complete control over the access to their own data. And, they have exposed their users' data to theft and exploitation at the hands of a hacker and/or an unscrupulous DSS provider and/or employee thereof.

An embodiment disclosed herein is intended to provide the basis for the implementation of secure data sharing, and social, networks in which only users and their specified contacts and/or friends are able to access the users' personal and/or private data. By limiting access to a user's data to the user who created it, and to the contacts and/or friends of that user, both the real and the perceived privacy and security of that potentially sensitive information are increased.

In an embodiment, a separate set of computers, servers and/or programs has the ability to review discrete elements of user data in order to check for abusive data and/or abusive behavior. And, in the event that abuse is detected, that same separate set of computers, servers and/or programs can retrieve, via a user's DSS client, the decryption key(s) of that user, in order to decrypt and archive that user's data and thereby make it available to, for example, the proper law enforcement agencies. However, this should not diminish the privacy and security provided to users who are not engaged in abusive behavior.

An embodiment herein does not facilitate, or even permit, the reconstitution of original user data for the purposes of inspection, analysis, selling and/or any other exploitative activity, on the part of the owners and/or operators of the DSS.

A novel architecture for a private DSS described herein seeks to ensure the privacy and security of users' information. In this new type of DSS, a user's information is stored and transmitted (with only a few exceptions) in an obfuscated (e.g. an encrypted) form. And, the only means (e.g. decryption key) with which the encrypted data can be de-obfuscated (e.g. decrypted), and thus viewed, is always in the sole possession of the user and the user's contacts.

This arrangement ensures that a user's data cannot be examined by anyone other than the user or the user's contacts. This arrangement also makes it more difficult for the web site, or other commercial provider (if any), hosting the private DSS to exploit its users' data. Accordingly such a system, which facilitates the obfuscation, storage, exchange and de-obfuscation of personal, confidential and/or proprietary data, offers many advantages over existing data sharing networks and/or systems.

The disclosure of a private DSS that follows involves both the "obfuscation" of data and the "de-obfuscation" of data. "Obfuscation" can mean that the true nature and data contained in a body of data is hidden in a manner which may not be reasonably revealed in the absence of a specific means of "de-obfuscation." For any particular means of obfuscation employed to "hide" data, there will be a specific corresponding means of de-obfuscation.

If the means of obfuscation is a specific symmetric encryption algorithm (as utilized in "symmetric key cryptography"), the product of such an encryption can be made unique through the use of a unique "encryption key" or "key." In the case of a symmetric encryption algorithm, the same key used to render unique an application of the algorithm to, and a subsequent encryption of, a particular body of data, is also used by the corresponding symmetric decryption algorithm in order to restore the original values to the encrypted body of data.

If the means of obfuscation is an asymmetric encryption algorithm (as utilized in "asymmetric key cryptography" and in particular in "public key cryptography") then two mathematically-linked keys are defined such that one key may be used to encrypt data and the other key may be used to decrypt the data encrypted with the first key and neither key may be used to both encrypt and decrypt data.

Other methods of data obfuscation and de-obfuscation may be used in conjunction with the operation and execution of various elements of the private DSS disclosed herein. Some may involve other encryption algorithms and schemes known to the public which, when used in conjunction with unique codes and/or keys encrypt data in a way which is sufficiently difficult to reverse so as to provide a sufficiently robust degree of protection for the data. Some other methods may involve customized algorithms and/or pairs of algorithms, and corresponding bodies of computer code, which will uniquely obfuscate data and subsequently de-obfuscate the obfuscated data. If these algorithms are themselves unique, then no corresponding unique data values may be required to achieve unique and unreasonably-difficult-to-break data obfuscation.

The following disclosure may refer to encryption and decryption instead of the more general "data obfuscation" and "de-obfuscation". And, it may refer to the use of encryption involving a single key for both encryption and decryption (i.e. to a "symmetrical encryption key"), and/or it may refer to public-key encryption (and the corresponding private-key decryption). However, the scope of this disclosure is intended to extend to the use of any means of data obfuscation, and a corresponding means of de-obfuscation, with respect to any and all steps in the operation and execution of the private DSS disclosed herein.

When the context in which a key is referred to involves data obfuscation and/or encryption, it will be referred to as an "encryption" key. However, then the context in which a key is referred to involves data de-obfuscation and/or decryption, then it will be referred to as a "decryption" key.

Embodiments also support the use of means of data obfuscation and de-obfuscation other than encryption and decryption. These means of data obfuscation and de-obfuscation may involve the use of values analogous to keys which are used in combination with a corresponding algorithm or method to achieve a unique result. These means of data obfuscation and de-obfuscation may also involve algorithms, methods and/or programs which achieve a unique obfuscation without the use of any such values or keys. When the use of any means of data obfuscation and/or de-obfuscation is denoted, without limitation as to its implementation and/or method of implementation, it will be referred to as the use of a "value, method and/or program or portion of a program" (VMP).

When we want to refer to a means of data obfuscation without limitation as to its implementation and/or method of implementation, we will refer to the use of "a data obfuscation value and/or program or portion of a program" (DOVP). Likewise, when we want to refer to a means of data obfuscation without limitation as to its implementation and/or method of implementation, we will refer to the use of "a data de-obfuscation value and/or program or portion of a program" (DDVP)

A structured method of sharing data electronically is described herein. A system implementing this method stores and transmits only encrypted user data. While the content type(s) of each packet of data may be known to the system, the actual contents cannot be known to the system. The decryption keys required to access data are retained by the "owners" (i.e. the authors and/or uploaders) of the data. The system neither possesses nor has access to these keys, and the operators of such a system are therefore unable to access, view, read, disclose or exploit user data. Keys are exchanged between users by a method that circumvents the system (e.g. a third-party email service), or by using public-key encryption, or some other asymmetric encryption scheme, to transmit only encrypted keys through the system.

A user is responsible for remembering and/or recording his own encryption and decryption keys (if they are not the same key), or just the single key used for both encryption and decryption, in the above system. However, the decryption keys of his contacts and/or friends within the system can be stored, along with the rest of his data, in an encrypted format within the system. If a user loses or forgets his own encryption/decryption key(s), methods are provided herein for securely retrieving that key from a contact within the system who still retains that key among his set of contact keys. This novel system can be applicable to the creation of private online social networks, as well as to the creation of private DSS systems intended to share and store law-enforcement data, private DSS systems to share and store medical data, etc.

An embodiment herein uses user-specified encryption to limit overall access to the user's data. It then allows the centralized system to control distribution of each piece of encrypted data to the subset of the user's total set of friends that the user specifies.

An embodiment herein advocates "trusting" the central system to make dynamic changes to user data distribution since the content is already encrypted and privacy is implicitly limited to the user's total pool of friends. In other words, the risk of "system betrayal of trust" is low because there is no motivation for the system to misdirect encrypted user content.

An embodiment herein is an integrated system for the storage and sharing of encrypted user data wherein only the user and his friends possess the keys required to decrypt and access that data, thereby protecting user data from hackers, as well as owners and operators of the system.

An embodiment herein is concerned with controlling access of various users to encrypted data stored on the same networked storage device(s).

A system herein does not attempt to verify the identity of a user at the time that an account is created. And, the identities of a user on all subsequent interactions with the system are verified by means of the username and password originally specified by a user at the time of account creation.

Pursuant to a system herein "trust" is implicit; in other words, it is the responsibility of a user of the system to verify the identity of any user account with which he exchanges decryption keys. A system herein can provide users with a means of storing and sharing private information in such a way that the owners and/or operators of the system cannot decrypt, read, view, disseminate and/or otherwise exploit the private data of the user. In an embodiment herein, users exchange keys through the system, i.e. through the network server(s) common to all users, through the use of public-key cryptographic techniques.

A system herein facilitates the secure exchange of decryption keys (and also keeps those keys unavailable to the server(s) responsible for their transmission). Accordingly, the system does not, and cannot, store user decryption keys on the networked storage device(s) which can be read and/or utilized by the DSS server(s). The keys are stored on those devices, but only in encrypted formats for which the system lacks the needed key(s) to fully decrypt them.

A system herein creates an online system for the storage and sharing of encrypted user data in which the system itself, as well as its operators and/or owners, have no ability to decrypt. For a system herein, how users exchange their decryption keys can be of less import than the requirement that such an exchange does not allow those keys to be viewed, understood and/or recorded for later use by the system itself.

A system herein encrypts data using the author's (i.e. the sender's) encryption key(s). That same data may be shared with every other user of the system possessing the needed decryption key.

A system herein keeps track of the type and/or category of data being encrypted and distributed. This facilitates complex data distribution requirements.

A method embodiment herein re-uses a single symmetric encryption key per user which may be used to both encrypt and decrypt data. A user's key can be changed, if needed or desired, but in general the same key is constantly reused. This allows a single user key (also in the possession of each of that user's authorized "contacts") to be used to decrypt all of the user's encrypted data, thereby simplifying key and data management.

A method embodiment herein uses multiple symmetric encryption keys per user in which each key is used to securely transmit and/or share data with a particular contact or group of contacts. With respect to such an embodiment, each key can be associated with the particular contact or group of contacts for which it will be used to securely share a user's data. A user may determine at the time that a data-sharing relationship is established between the user and a contact which key or keys to share with the contact, i.e. in which "distribution list(s) or group(s)" the user will be included.

A method embodiment herein uses a single pair (public and private) of asymmetric encryption keys per user. With respect to such an embodiment, a user shares with each contact the private decryption key, thereby enabling each contact to decrypt the user's data. The user must also retain a copy of this private key so as to be able to decrypt his own data. With respect to such an embodiment, the user alone retains the public encryption key with which his data will be encrypted.

A method embodiment herein uses multiple pairs (public and private) of asymmetric encryption keys per user in which each pair of keys is used to securely transmit and/or share data with a particular contact or group of contacts. With respect to such an embodiment, each pair of keys can be associated with the particular contact or group of contacts for which it will be used to securely share a user's data. A user may determine at the time that a data sharing relationship is established between the user and a contact which pair or pairs of keys to share with the contact, i.e. in which "distribution list(s) or group(s)" the user will be included. This embodiment offers the added advantage that the ownership/authorship of all of the user's encrypted data is implicitly validated with respect to any contact since the ability of the private key in the possession of the contact to be successfully used to decrypt the putative data of the apparent owner/author corroborates that ownership/authorship since the public key solely in the possession of the user must have been used to achieve the encryption.

1. Disclosed herein is a method for exchanging decryption keys through a system in such a way that the system, and those operating the system, will not have access to nor be able to recover, generate or discern the values of those keys.

2. Disclosed herein is a system for sharing data in which neither the system nor those operating it have access to or are able to recover, generate or discern the values of that data.

2a. The system of 2 in which a user of the system, after entering a username and password in order to log in to the system, enters personal encryption/decryption key(s) into a client program used to access the system.

2b. The system of 2a in which a user's encryption/decryption key(s) is/are retained within the client program in such a way so as to prevent its access or discovery by others (e.g., retained only in RAM controlled by the client program).

2c. The system of 2 in which only a user's obfuscated data is transmitted by or stored by a user's computing device and/or transmitted by or stored by a corresponding server.

2d. The system of 2c in which a first user of the system can elect to share data with a second user of the system.

2e. The system of 2d in which the system facilitates the exchange of the data and/or the computer codes (e.g. computer program) required by each user to de-obfuscate the obfuscated data of the other user.

2f. The system of 2e in which the collection of de-obfuscation-enabling data and/or computer codes acquired by a first user of the system, with the data and/or computer codes being required to de-obfuscate the obfuscated data generated by and stored with the other user of the system, is stored in a "key locker" data structure.

2g. The system of 2f in which a user's key locker is only transmitted and/or stored in an obfuscated form achieved through the application of the user's personal obfuscation data and/or computer code(s).

2h. The system of 2d in which data created or uploaded or otherwise generated by a first user is obfuscated through the application of the user's personal obfuscation data and/or computer code(s) and subsequently transmitted to a server and/or to a second user.

2i. The system of 2h in which data obfuscated through the application of the first user's personal obfuscation and/or computer code(s) may subsequently be de-obfuscated using the complementary data and/or computer code(s) stored in and retrievable from a key locker of the second user.

2j. The system of 2 in which a first user of the system can generate, store and/or share personal information with a second user of the system.

2k. The system of 2 in which a first user of the system can generate, store and/or share information for which that user serves as a custodian, editor or archivist.

2l. The system of 2k in which the data stored and/or shared relates to a business, product, investigation, set of health records, criminal investigation, event, etc.

2m. The system of 2c in which a first user of the system can elect to allow a second user to copy and/or store and/or share with others, a plain, de-obfuscated copy of a data packet and/or of all data packets shared by the first user with the second user.

2n. The system of 2m in which a user's specified permissions and/or options regarding the types of operations which may be performed on any particular packet of the user's data, and/or on all packets of the user's data, by any contact, or group of contacts, are associated with the particular data packet, and/or all of the user's data packets, as a set of unencrypted attributes.

2o. The system of 2e in which a first user of the system can recover lost or forgotten personal de-obfuscation data and/or computer code(s) from a copy of the data and/or computer code(s) available to or accessible by the client program of a second user of the system.

2p. The system of 2 in which a first user of the system can share data with a second user and/or store data in and retrieve data from a personal archive within the system.

2q. The system of 2 in which a first user of the system specifies data and/or computer code(s) which may be used to obfuscate his data.

2r. The system of 2q in which the first user shares with a second user of the system the data and/or computer code(s) required to de-obfuscate the obfuscated date of the first user.

2s. The system of 2r in which the first user can directly or indirectly specify a plurality of data and/or computer code(s) which may be used to obfuscate any particular packet of data created, uploaded and/or otherwise generated by the first user.

2t. The system of 2s in which the first user may share with a second user any one or more of the individual de-obfuscation data and/or computer code(s) which complement the obfuscation data and/or computer code(s) that the first user may directly or indirectly elect to use to obfuscate any particular packet of data.

2u. The system of 2 in which the data shared within the system may be stored on servers and/or their associated storage devices which are responsible for transmitting data from a first user of the system to a second user.

2v. The system of 2u in which some portion of the data shared within the system may be stored on the computing device(s) and/or associated storage device(s) of a first user.

3. Disclosed herein is a method for storing the de-obfuscation data and/or computer code(s) (e.g., decryption keys) required to restore (e.g., decrypt) data obfuscated in manners unique to one or more people or user accounts.

3a. The method of 3 wherein the de-obfuscation data and/or computer code(s) are stored within a DSS only in an obfuscated format for which the data and/or computer code(s) required for its de-obfuscation is not known by nor available to the DSS.

4. Disclosed herein is a method for creating multiple unique encryption keys from a single "primary" encryption key in which the primary encryption key is systematically modified with a tag, value, permutation, or other manipulation or modification (e.g. derived from the anticipated context in which each derivative key will be used).

4a. The method of 4 in which the modified key is created by appending the name of a second user, the label or a category or other descriptive text or value.

5. Disclosed herein is a system for sharing information within an electronic and/or digital network, which includes: (a) media encrypted on each respective user's computing device prior to transmission to a system of centralized programs and servers; and (b) an encryption key and/or method used to encrypt each user's data is known only to each respective user, and the user's complementary decryption key (e.g. likely the same symmetric encryption key) is shared only with those other users whom the user invites to have access to it.

5a. The system of 5 wherein data obfuscation is achieved by means other than the use of encryption, and/or data de-obfuscation is achieved by means other than the use of decryption.

5b. The system of 5 wherein the coordinating programs and/or servers are not centralized (e.g. they are distributed among various geographically distant server centers).

5c. The system of 5 wherein the coordinating programs and/or servers are decentralized in a loose confederation of cooperating systems, and/or constitute a "peer-to-peer" network.

5d. The system of 5 wherein the media is user-generated media.

5e. The system of 5 wherein the digital network is an online social network.

6. Disclosed herein is a method of sharing data between a source of data and one or more recipients (e.g. a person's "friends") in which the data may only be viewed, understood and/or modified by the source, or the recipients, of the data, which includes: (a) protecting the privacy of the data from viewing, disclosure and/or exploitation by other parties, including the owners and/or operators of the system facilitating such data sharing; and (b) wherein the protecting of the privacy of the data is by data obfuscation and/or encryption prior to its transmission from the computing device(s) of the source, and by the clarification and/or decryption of that obfuscated and/or encrypted data upon the computing devices of the recipients.

6a. The method of 6 wherein the data obfuscation is symmetric encryption and may utilize a user-unique encryption key, with that same key also uniquely determining the ability of a user to decrypt such encrypted data.

6b. The method of 6 wherein the ability of recipients to clarify and/or decrypt the obfuscated and/or encrypted data received from a particular source is achieved through the sharing of the source's clarification method and/or decryption key with the recipients.

6c. The method of 6b wherein the exchange of clarification methods and/or decryption keys is through a channel outside the system through which source data is transmitted to recipients (e.g. through a third-party email service).

6d. The method of 6c wherein the exchange of clarification methods and/or decryption keys is through the system through which obfuscated source data is transmitted to recipients through the use of public-key encryption so that the encrypted clarification methods and/or decryption keys exchanged through the system cannot be understood or exploited by the system.

Embodiments herein rely upon the obfuscation and de-obfuscation of data. The scope herein includes embodiments using any method of data obfuscation including, but not limited to, known methods and algorithms as well as customized and/or novel methods and algorithms. These data obfuscation methods may produce a result which is determined, at least in part, by some value or key which is input to the method along with the data to be obfuscated. In like manner, embodiments herein include those which use complementary methods to de-obfuscate obfuscated data, some of which may require the input of a value or key, along with the data to be de-obfuscated, in order to accurately restore the obfuscated data to its original state.

However, citing the full range of possible methods of data obfuscation and de-obfuscation in reference to each feature and variation associated with the scope and description of this invention would be cumbersome at best. Therefore, whenever "encryption" is specified within this disclosure it should be understood to refer to any method of data obfuscation including the use of algorithms known to the public, the use of unique "encryption keys" in association with any of those publicly known algorithms, and/or the use of customized algorithms for which customized programs and/or computer code is required and for which standard and/or custom keys or other data values may be required. Whenever an "encryption key" is specified it should be understood to similarly refer to any data value and/or customized computer code(s) capable of independently achieving data obfuscation or of achieving data obfuscation in association with any obfuscation algorithm known to the public.

Likewise, whenever "decryption" is specified within this disclosure it should be understood to refer to any method of data restoration and/or de-obfuscation including the use of algorithms known to the public, the use of unique "decryption keys", and/or keys also used in the corresponding obfuscation of the data, in association with any of those publicly known algorithms, and/or the use of customized algorithms for which customized programs and/or computer code is required and for which standard and/or custom keys or other data values may be required. Whenever a "decryption key" is specified it should be understood to similarly refer to any data value and/or customized computer code(s) capable of independently achieving data restoration and/or de-obfuscation, or of achieving data restoration and/or de-obfuscation in association with any de-obfuscation algorithm known to the public.

Despite any absence of a reference to the full range of data obfuscation and de-obfuscation methods included within the scope herein, that scope is nonetheless inclusive of all such variations and alternatives which would be obvious to someone skilled in the art.

Disclosed herein is a private DSS which provides both encryption and decryption of data, and presents the decrypted data in a user interface that segments data on the basis of various attributes and/or contexts, e.g. data related to photos, data related to comments, and data related to a particular subset of users.

Disclosed herein is a private DSS which provides both encryption and decryption of data, and presents the decrypted data in a user interface that provides tools with which to create new instances of at least some types of data, e.g. documents, comments, video recordings from a webcam, etc. and/or to edit at least some types of data, e.g. identifying people in photos with metadata, cropping, sizing, rotating, enhancing photos, annotating videos, etc.

Disclosed herein is a private DSS which provides encryption/decryption/data sharing relating to three or more users (all sharing together) where encryption keys used by each user are different, thereby requiring a user to possess a unique decryption key for each other user in order to decrypt the data from each other user.

Disclosed herein is a DSS method which includes: (a) receiving in a DSS server an obfuscated collection of data from a DSS client of a first user and the collection of data obfuscated with a data obfuscation value and/or program, or portion of a program, of the first user; (b) the obfuscated collection of data having a second user as an intended recipient; and (c) transmitting from the DSS server the obfuscated collection of data to the DSS client of the second user; and (d) wherein information needed to decrypt the encrypted collection of data is neither present in nor accessible by the DSS server.

Disclosed herein are novel apparatus and/or methods of or related to: the network aspects of the DSS; monetization by vendors; key exchanges; key lockers; distribution lists and special keys; guard against fraudulent client programs; unencrypted attributes of encrypted data packets; segregation of data presented to user (personas); distribution lists; creation of logs; restoring lost keys; and distribution-list-specific keys.

1. Disclosed herein is a private DSS network which includes: means for the systematic management of keys; means for the systematic storage and use of keys; and means for the automated decryption of encrypted data when corresponding decryption key available.

1a. The network of 1 wherein user decryption keys are not available in, nor stored in, an unencrypted format within the servers of the private DSS.

1b. The network of 1 including systematic exchanging of keys.

1c. The network of 1 with user data being encryption and decryption per symmetric-key encryption algorithmic method.

1d. The network of 1 with the user entering an encryption key and/or a decryption key into the user's client with the encryption key having been defined, at least in part, by the user.

1e. The network of 1d wherein a username and/or password must be validated by the DSS server for a DSS client to share data within the private DSS.

1f. The network of 1 in which at least some of the data shared by at least one user of such a secure data sharing network share proprietary data, including, but not limited to: digital movies, videos, photos, screen savers, news reports, financial analyses and/or predictions, financial data, audio files, documents, books, retail products, advise, guidance, other products, other services, and/or other types of data.

1g. The network of 1f in which other users wishing to have access to, and share, the proprietary data, products and/or services of the at least some users pay a fee to the at least one owner of the account and/or to some at least one other party in order to be provided with the means to access, experience and/or to be provided with some or all of the data, products and/or services available from that at least one user.

1h. The network of if in which the at least one user consummates a data-sharing relationship with another user of the private DSS in order to share his data, products and/or services with that another user.

1i. The network of 1h in which the data-sharing relationship between the at least one user and the another user is automatically or manually terminated after a certain period of time and must be renewed and/or reaffirmed in order to be re-established.

1j. The network of 1i wherein at least one payment is required from the another user to the at least one user in order to re-establish a terminated data-sharing relationship.

1k. The network of if in which some aspect of the sharing, including, but not limited to: the selection of data, products and/or services, the categories data, products and/or services, the quality data, products and/or services, the quantity of data, products and/or services, and/or the frequency of provision of data, products and/or services, may vary between a first and second other user.

1l. The network of 1k in which the at least one differing aspect of the sharing is at least in part determined by at least one difference in the amount of the at least one payment paid by the first and second users to the at least one owner of the account and/or to the at least one other party.

1m. The network of 1 with at least portion of encrypted user data stored in DSS server(s) but not shared with other users.

2. Disclosed herein is an automated method of key exchange which includes public/private keys.

3. Disclosed herein is an automated management method of keys (such as in key locker) which includes a system-unique key identifier and a decryption key.

3a. The method of 3 including at least one user-defined key per locker (i.e. the users).

3b. The method of 3 wherein the system-unique key identifier includes an encryption key (if any) and/or a decryption key.

4. Disclosed herein is a system of the automated association of a distribution list with an encryption key and/or decryption key which includes: a distribution list identifier; identifiers and/or names of recipients; and at least one system-unique key identifier specifying an encryption key and/or a corresponding decryption key.

4a. The system of 4 with one key identifier specifying one of the user's encryption keys.

4b. The system of 4a with a second key identifier specifying a system encryption key.

4c. The system of 4 with one distribution list identifier corresponding to encryption with the "primary" encryption key of user.

5. Disclosed herein is a system to protect against access to a network with fraudulent/modified client including: loading client from server at start of session; client loaded selected from large number of authentic variations of client; each variation differs at least with respect to some functionality; and the server can assess validity of client, terminating connection if invalid client behavior is detected.

5a. The system of 5 wherein the selection is random.

5b. The system of 5 wherein some functionality including at least functions designed to respond to various server queries with selection of available queries and/or content and/or format of responses differing between different client variations.

5c. The system of 5 wherein duration of any particular client-mediated session is limited so as to force periodic reloading of a new, likely different, variant client.

6. Disclosed herein is a system for the association of encrypted data packets with unencrypted data.

6a. The system of 6 wherein the unencrypted data includes the date that information specified by unencrypted data was created.

6b. The system of 6 wherein the unencrypted data includes the time that information specified by unencrypted data was created.

6c. The system of 6 wherein the unencrypted data includes the date that the data was encrypted.

6d. The system of 6 wherein the unencrypted data includes the time that the data was encrypted.

6e. The system of 6 wherein the unencrypted data includes the type or category of information specified by unencrypted data, with type or category including, but not limited to: comment, photo, text, video, user interface graphic, user interface template, audio recording, etc.

6f. The system of 6 wherein the unencrypted data includes size of information specified by unencrypted data, e.g. original file size.

6g. The system of 6 wherein the unencrypted data includes the identifier of the owner and/or creator and/or source of the information specified by unencrypted data.

6h. The system of 6 wherein the unencrypted data includes the name of the owner and/or creator and/or source of the information specified by unencrypted data.

6i. The system of 6 wherein the unencrypted data includes the email address of the owner and/or creator and/or source of the information specified by unencrypted data.

6j. The system of 6 wherein the unencrypted data includes the identifier of the decryption key required to decrypt the encrypted data.

6k. The system of 6 wherein the unencrypted data includes the identifier of the decryption program required to decrypt the encrypted data.

6l. The system of 6 wherein the unencrypted data includes permission-related attributes specifying what operations a recipient is allowed, by the owner, creator or source of the information specified by unencrypted data, to perform on that copy of the original information concealed within the encrypted data packet, including, but not limited to permissions regarding the recipient's printing, saving to local storage, editing, saving to external storage (e.g. a USB drive, a writable DVD, etc.), etc., of the copy of the original information.

7. Disclosed herein is a system for the segregation of the user data presented to a user by the user's client, following the client's decryption of some or all of that user data, with said decryption involving the use of, or reference to, or execution of, a plurality of decryption keys and/or algorithmic methods.

7a. The system of 7 wherein the segregation of the data excludes the data generated by one or more contacts of the user.

7b. The system of 7 wherein the segregation of the data limits the data presented to that generated by one or more contacts, or pre-defined groups of contacts, of the user.

7c. The system of 7 wherein the segregation of the data with respect to one or more types of data, including, but not limited to the types of: comments, photos, videos and audio files.

7d. The system of 7 wherein the segregation of the data with respect to one or more categories of data, including, but not limited to the categories of: data having been created or modified within a defined period of time from the time of presentation.

7e. The system of 7 wherein the nature and limits of the segregation are related to a corresponding list of a user's contacts.

7f. The system of 7e wherein the corresponding list of a user's contacts is embodied in a "distribution list" specifying the user's desired recipients for any packet of data specifically shared with that distribution list.

7g. The system of 7f wherein the distribution list is associated with an encryption key (and corresponding decryption key which may be the same as the encryption key) which is unique among the user's keys which are intended for use in encrypting data packets.

7h. The system of 7g wherein the distribution list and the associated encryption (and/or decryption) key are associated with the same identifying value.

7i. The system of 7f wherein the at least one default distribution list offered to the user by the user interface created by the user's DSS client which presents the segregated set of user data to the user in response to a user's manifest desire to share a new collection of data with his contacts, or some incomplete subset thereof.

8. Disclosed herein is a system for producing a log which specifies actions related to any particular packet of a user's data within a DSS system.

8a. The system of 8 where the actions include the distribution of a data packet to a user of the DSS system.

8b. The system of 8 where the actions include the decryption of a data packet by the client of a user of the DSS system.

8c. The system of 8 where the actions include the presentation of the unencrypted contents of a data packet to a user of the DSS system.

8d. The system of 8 where the actions include the printing of the contents of a data packet by the client of a user of the DSS system.

8e. The system of 8 where the actions include the saving of a copy of the unencrypted contents of a data packet to a local data storage device by the client of a user of the DSS system.

8f. The system of 8e where the local data storage device is an internal component of the computing device of a user of the DSS system.

8g. The system of 8e where the local data storage device is an external storage device connected to the computing device of a user of the DSS system (e.g. to a USB drive).

9. Disclosed herein is a method for restoring the lost primary encryption key and/or decryption key of a user of a private DSS system by sharing with the user a copy of that user's primary encryption key and/or decryption key stored in the key locker of a contact of the user.

9a. The method of 9 where the sharing utilizes a method which prevents the value of the restored key from being known or knowable by the DSS system.

9b. The method of 9 where the restoration of the lost encryption key is preceded by confirmation from at least one of the user's contacts that the restoration is appropriate.

9c. The method of 9 wherein the restored key is presented to the user by a computing device.

9d. The method of 9 wherein the restored key is sent to the user via a means of communication including, but not limited to: an email, an SMS text message, a letter, a digital message delivered to the user's browser when that user visits a particular page of a website controlled, at least in part, by the private DSS.

10. Disclosed herein is a method of improving the privacy of a limited distribution of a packet of a user's data by encrypting that data packet with at least one key (and/or . . . ): wherein that one key is at least a second key used by the user's client in order to encrypt that user's data; wherein the client programs of the intended recipients possess the means to decrypt a data packet encrypted with such an at least second key; and wherein the set of other users who have agreed to share data with the user (i.e. the set of the user's contacts) whose client programs are so capable of decrypting such an encrypted data packet does not include all of that user's contacts.

10a. The method of 10 wherein the at least one key is associated with a list of the user's contacts who are intended to receive any data packet encrypted with that at least one key.

10b. The method of 10a wherein the at least one key is associated with an identifier, and wherein that same identifier is associated with a list of recipients with whom the user intends any data encrypted with that at least one key to be shared.

10c. The method of 10 wherein the set of recipients for the data is an incomplete subset of the contacts associated with the at least one key.

This disclosure may refer to the data which is stored, transmitted, obfuscated, de-obfuscated, etc. as a body of data, a packet of data, a collection of data, a set of data, a data file, a data object, etc. However, all of these represent the same thing which is a unit of digital information which is manipulated, processed, transmitted and/or stored by the program in question.

This disclosure may refer to a packet of data (or the equivalent) and/or to a copy thereof. However, digital data is fungible. That is, a copy of a packet of digital data is identical to an original packet of data, and a copy is the same as the original. A packet of data is routinely moved from one memory location to another within a computing device or across a data transmission network and yet it is still an "original" packet of data. Any distinction between an original packet of data and a copy is artificial. And, any reference to a copy of a data packet should be regarded as a reference to an original as a copy and an original are indistinguishable and the distinction is at best one of convenience.

BRIEF DESCRIPTION OF THE DRAWINGS

For a fuller understanding of the nature and objects of the invention, reference should be made to the following detailed description, taken in connection with the accompanying drawings, in which:

FIG. 1 illustrates principle components of a private DSS herein and their relationships to one another.

FIG. 2 illustrates an embodiment of a private DSS herein, namely that a group of people can interact, by means of DSS client programs (i.e. DSS_CP's), electronically within a private DSS implemented within a sharing network and possessing server(s) and storage device(s).

FIG. 14A illustrates the loading from a network server of a DSS client program into a browser operating on a user's computing device.

FIG. 14B illustrates the loading of a DSS client program (or the installer of such a program) directly on to a user's computing device from a network server.

FIG. 14C illustrates the loading of a DSS client program on to a user's computing device from a program, or a program installer, stored on a data-storage module such as those that are commercially available to the general population.

FIG. 14D illustrates an option of providing users with a DSS client program pre-installed on the user's computing device prior to the user's purchase and/or possession of that device.

FIG. 15A illustrates a private DSS implemented by means of a "centralized" system architecture.

FIG. 15B illustrates a private DSS implemented by means of a "peer-to-peer" system architecture.

FIG. 15C illustrates a private DSS implemented by means of a "distributed" system architecture.

FIG. 17A illustrates a method by which a private DSS can verify that restoration of a user's encryption key is authorized and/or appropriate.

FIG. 17B illustrates a method by which a private DSS can restore to a user that user's encryption key and/or decryption key should the user forget it.

DETAILED DESCRIPTION

I. Introduction and Background

Figure 3:
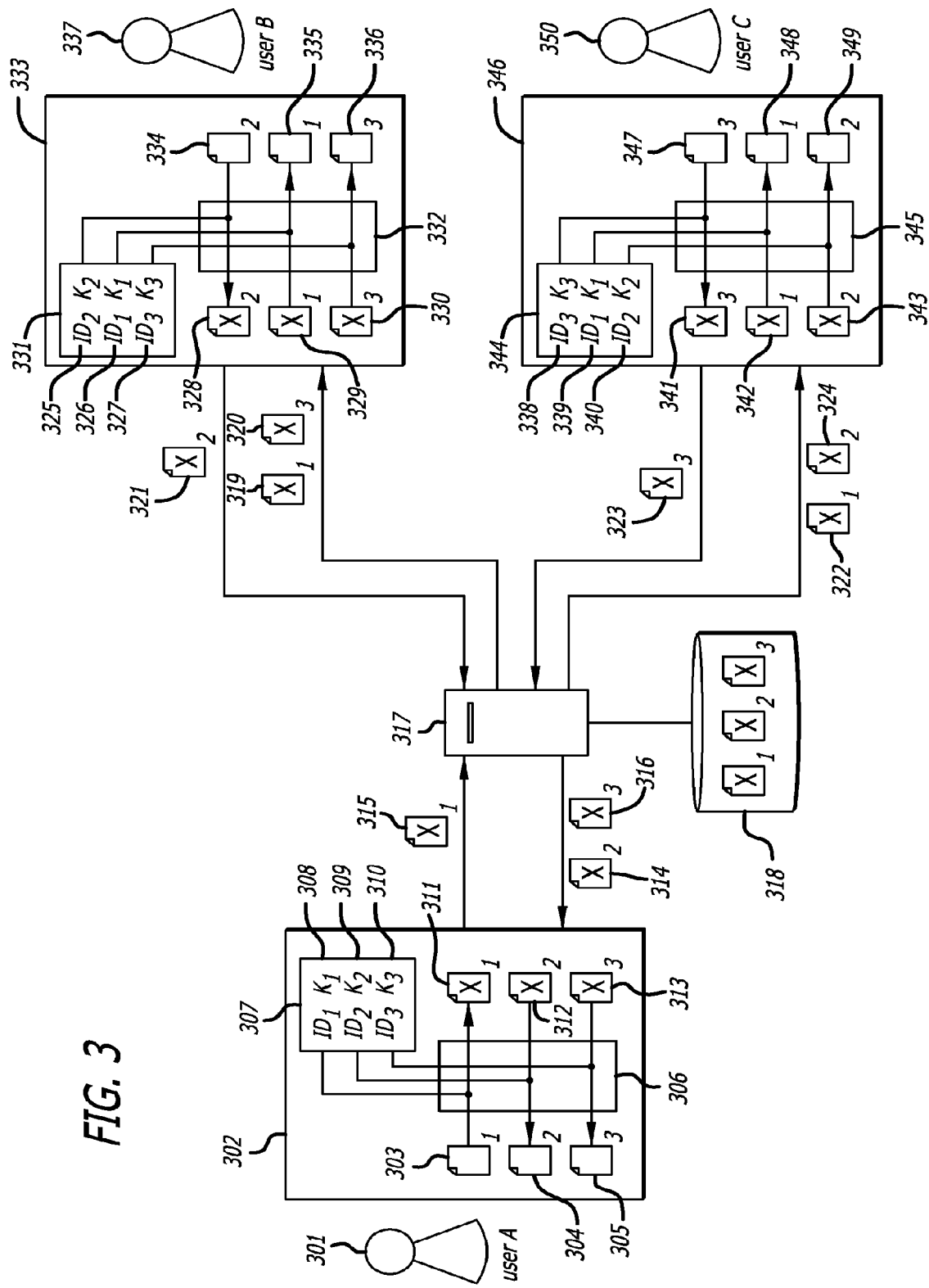
FIG. 3 illustrates the private sharing of data between three users of a private DSS.

One aspect of the "private" DSS architecture disclosed herein that can be distinguished from other DSS's is the fact that in the present private DSS design the user data is encrypted at all times except when being viewed by the user, or by the user's designated contacts and/or friends. Unlike other DSS's in which a user's data can be viewed, analyzed and/or exploited by the owners of the DSS, or its employees, in this novel private DSS only the users themselves possess the decryption keys needed to decrypt their data.

One embodiment of the private DSS architecture taught herein has two primary components: (1) a client program or set of programs which operate on each user's computing device, and (2) a set of computers, servers, and/or programs which constitute the "server" of the DSS.

In an embodiment, the portion of the private DSS which operates locally, on a user's computing device, will henceforth be referred to as the "DSS client." Following a successful system log in (achieved through the submission of a valid username and password) the DSS client is responsible for receiving from a user that user's primary encryption key (or passphrase).

The DSS client also mediates the exchange of user decryption keys between two users, when those users elect to become contacts or friends of one another, i.e. when they elect to share their data.

The DSS client also decrypts all encrypted user data and contact data which it receives from the computers, servers, and/or programs which form the server of the DSS, which are henceforth referred to only as the "DSS server." It then composes the decrypted graphics, text and/or other types of media, within a user interface, on a user's computing device, thereby allowing the user to view, read, edit and/or otherwise interact with those that data and/or media.

The DSS client also allows users to create some, or all, of the types of media which it is capable of sharing between users, or otherwise processing.

And, the DSS client also encrypts new data which the user creates, edits, uploads, or otherwise introduces to the system. The DSS client then transmits these new and encrypted packets of user data to the DSS server for storage, dissemination to contacts, and/or other types of processing.

In an embodiment, the "DSS server" is that set of computers, servers, and/or programs which form the server of the DSS. In an embodiment, the DSS server is responsible for validating the login usernames and passwords of users. It is responsible for processing the encrypted user data, e.g. storage, transmission, etc. It is responsible for exchanging encrypted user decryption keys between users when those users elect to become contacts and share data.

The DSS server is responsible for, among other things, the storage and transmission of encrypted user data. This portion of the DSS determines which packets of encrypted PID will be sent to each user's computing device. For instance, the DSS server identifies those packets of encrypted user data which were created and/or uploaded by any particular user, and therefore "belong" to him. All of these proprietary packets of encrypted user data are available to the user who added them to the DSS.

The DSS server can also determine which packets of user data belonging to a user's contacts and/or friends should be sent to that user's computing device. In an embodiment, each packet of shared user data is associated with a list of contacts and/or friends with which it is to be shared. In an embodiment, all packets of a user's data are not necessarily shared with all of a user's contacts and/or friends.

The DSS server will also determine the relevance of each packet of user data with respect to the type of media, e.g. the media-specific "page" or "section" of the "user interface" being viewed by a user on his local computing device by means of his DSS client. The relevance of each packet of user data might include not only the type of media, but also its date of creation and/or uploading, e.g. more recent media is often deemed to be more relevant to a user. The relevance of a packet of user data might also be affected by whether or not it is related to some other piece of user data, such as a comment on a photo. The relevance of any particular packet of user data might also be related to other attributes of that packet of data, as well as other attributes, characteristics, or user preferences, related to the context established by the DSS client and the other packets of user data to be displayed.

In an embodiment, users define their own encryption/decryption key. This is the symmetrical encryption key used to encrypt and decrypt all, or most, of their data. In an embodiment, a user's encryption key is an alphanumeric character string. This can also be referred to as a "passphrase."

Each user of an embodiment herein defines and remembers three strings of characters. One is the user's login "username," which can be the character string that is used as the identifier of the user's account within the private DSS. Each username must be unique with respect to any particular private DSS. Another is the user's login "password," which can be a character string used to verify the user's identity and his right to access the user data associated with the account designated by the specified username. And, the last is the user's encryption key. Pursuant to an embodiment herein, this can be a character string which will be used as the key with which all, or most, of the user's data will be encrypted and decrypted (by means of its utilization in conjunction with computer code implementing a particular symmetric encryption/decryption algorithm). The user enters this key at the start of each session, that is, each time the user's DSS client is initialized.

In an embodiment, two users exchange their decryption keys. The DSS client of each user can store the decryption key of the user's "friend" and/or "contact" in a "key locker." A key locker is a file and/or data structure containing the identifiers and values of the decryption keys of each of the user's friends and/or contacts (in a one-to-one correspondence).

Each time a user adds a new key_id:key_value pair to his key locker the DSS client encrypts the augmented key locker and transmits that encrypted key locker to the DSS server for storage. Then, at the start of each session of the user's DSS client, the user's key locker will be retrieved from the DSS server by his DSS client and decrypted with the user's decryption key. This decrypted key locker will then allow the user to decrypt all of the encrypted user data sent to the user's DSS client by the DSS server.

A key locker may contain pairs of values as stated above, in which one value is an identifier of a key and the other value is the key. However, a key locker may also store triplets of values, in such a triplet an identifier may be associated with both an encryption key and the corresponding decryption key. In fact, in different embodiments, there may be advantages to having any number of values associated with any particular identifier in a key locker. For instance, when a particular encryption key, and perhaps the corresponding decryption key (if the encryption key is not also the key to be used for any corresponding decryption), is to be used to ensure that specific packets of data are to be shared with a specific subset of a user's friends and/or contacts, then the key locker may contain an identifier to the corresponding distribution list (i.e. subset of friends and/or contacts) in addition to the key identifier and key(s).

Disclosed herein is a private DSS in which users are able to share their data with their contacts and/or friends free from the fear, the anxiety and/or the consequences of having their data accessed and/or exploited by third parties, including the owners and/or operators of the DSS. This disclosure further supports specialized embodiments and/or implementations, especially those which offer specialized types or modes of sharing. This private DSS architecture also supports specialized programs which involve the sharing of data for which the security and privacy of that data is of paramount importance.

A downside of providing people with a secure and private forum in which to store media, and/or exchange media with their friends is that some people will endeavor to use that privacy to store media, and/or to engage in activities, which are abusive and/or otherwise contrary to the law. Methods of detecting such abusive behavior are discussed later in this disclosure.

Unencrypted DSS's, as well as encrypted DSS's in which the owners of the DSS have the ability to decrypt the data of their users, are able to exploit their ability to view and analyze the data of their users in order to help them to monetize their DSS. So, an obvious drawback of providing users with a secure and private DSS, in which the owners and/or operators of the DSS cannot access, view, analyze, or otherwise exploit the data of those users, is that the monetization of the DSS can be more difficult.

Methods of monetizing private DSS's implemented in accordance with the teachings of this disclosure are discussed later in this disclosure.

II. Detailed Discussion of Embodiments Depicted in Drawing Figures

User's Computing Device Connected to a DSS Server

FIG. 1 illustrates a possible connection scheme between the DSS client that a user would utilize in order to access a DSS and a server of the DSS. A user's computing device 101 is connected to the Internet, or to some other electronic, digital or analog, data-sharing network. A program on the user's computer 101 (e.g. a browser program, a "stand-alone" program, etc.) exchanges messages and data with a DSS server by sending 102 properly addressed messages and/or data into the network 103. Those user messages and/or data arrive, via the network 103 at a DSS server 105. The DSS server receives data transmitted by the user's computer 101, and responds to requests for data by sending, when appropriate, messages and/or data back to the user's computer 101 via the Internet 103.

The user's computer 101 only transmits user data to a private DSS server following its encryption with the user's unique encryption key. The server 105 in a private DSS only processes, transmits and/or stores encrypted user data, although some unencrypted attributes like data type, creation date, user ID, etc. may be associated with packets of encrypted user data. In this way, transmission of user data via the network, and/or the processing, storage and/or transmission of user data by a DSS server, cannot expose the user data to unauthorized disclosure, analysis, manipulation and/or exploitation.

Structure of a Private DSS

FIG. 2 illustrates a possible structure of a private DSS of a type of this disclosure. A group of users 201, 202, 203 creates accounts within the DSS 213. These users interact with the DSS 213 through local DSS client programs ("DSS_CP's") 205, 206, 207 running on their respective computing devices 208, 209, 210. These DSS_CP's utilize the hardware and software resources of the users' computing devices 208, 209, 210 to communicate with, and exchange data with, the DSS server(s) 204. The DSS_CP's 205, 206, 207 only transmit encrypted versions of any user data transmitted into the Internet or other data sharing network 211. And, only encrypted user data is received by the DSS server(s) 204 and/or stored on the storage device(s) of the DSS 212. The full central portion of an exemplary private DSS, i.e., the "DSS server" 213, includes, but is not limited to, some server(s) 204 and some storage device(s) and/or components 212.

When any particular user wishes to view the messages, photos and/or other data created and/or uploaded by his contacts and/or friends he is able to do so via his local DSS_CP which, as a result of its possession of copies of the decryption keys of each of his friends, is able to decrypt the encrypted content of those friends and present it to him in a clear, intelligible and understandable manner, such as by means of the audio and/or visual output devices associated with his computing device.

Sharing Data Between Three or More Users

FIG. 3 illustrates the operation and utility of an embodiment of a private DSS. Three users ("User A" 301, "User B" 337 and "User C" 350) have agreed to share data within a private DSS. For this reason, and as will be explained further elsewhere in this disclosure, these three users have each shared with the other a copy of their decryption key, i.e. "$K_1$", "$K_2$" and "$K_3$", respectively. Each of these keys is associated with an identifier, i.e. "$ID_1$", "$ID_2$" and "$ID_3$", respectively. The encryption and/or decryption keys available to the DSS client of any particular user are stored in a data structure called a "key locker." The key locker 307 of User A 301 is a data object within the DSS client 302 of User A 301.

User A has defined his encryption/decryption key, i.e. "K1". Within the DSS, only User A should know the value of his encryption/decryption key. When the DSS client 302 of User A was initializing, User A entered his encryption key K1 into the client, after which the client remembered his key. During initialization, User A's DSS client retrieved from the DSS server 317 an encrypted copy of his key locker. User A's DSS client 302 then used the decryption key which User A entered, i.e. K1, to decrypt that key locker. User A's key locker, because of his prior agreement to share data with User's B and C, had already received a copy of the decryption keys of User's B and C from those other users. User A's client also adds the encryption/decryption key, K1 (308), which User A specified during the client initialization to User A's key locker 307 so that all keys needed for encryption and/or decryption were stored in a common data structure.

When User A creates or uploads a new document, photo, video, etc. 303 in to his DSS client 302, and specifies that that file is to be shared with his two contacts, i.e. User's B and C, then that data file 303 is then encrypted by the encryption program 306 within User A's DSS client 302, using User A's encryption key, i.e. "K1" 308. After encrypting the data file 311, User A's DSS client transmits the encrypted data file 315 to the DSS server 317. The DSS server 317 then determines that the encrypted data packet 315 is to be forwarded to User's B and C.

The encrypted data packet 319 of User A is transmitted to User B 337 and is received 329 by User B's DSS client 333. That client then determines (by inspecting some unencrypted attributes associated with the data packet, such as the ID of the author or the ID of the encryption key used) that the file is to be decrypted using the decryption key associated with the identifier "ID1". The client retrieves this decryption key, i.e. "K1" 326, from the key locker 331 of the client 333. The decryption program 332 within the client 333 uses the key K1 to decrypt the file, resulting in a copy of the original, unencrypted file 335, which User B is then able to read, view and/or otherwise experience.

Likewise, the client 346 of User C 350 receives a copy of the encrypted file 342 transmitted 322 by the DSS server 317. The client 346 also uses the key K1 339, which it obtains from its own key locker 344, in conjunction with its decryption program 345 to decrypt the encrypted file, resulting in a copy of the original, unencrypted file 348, which User C is then able to read, view and/or experience.

Upon receipt of the encrypted data packet 315 transmitted by the client 302 of User A 301, the DSS server 317 saves a copy of that encrypted data packet within its storage device 318.

User B 337 also elects to share a file 334 with User's A and C. User B's client 333 retrieves User B's encryption key 325 from the client's key locker 331, and uses its encryption program 332 along with that key to encrypt the data file 328. The client 333 then transmits the encrypted data packet 321 to the DSS server 317. The DSS server then stores a copy of the encrypted data packet in its storage device 318 and forwards a copy of the file 314, 324 to the clients 302, 346 of Users A and C 301, 350.

The clients 302, 346 of Users A and C use their copies of User B's decryption key 309, 340, along with their decryption programs 306, 345 to produce decrypted copies 304, 349 of User B's original file, which they are then able to experience.

User C 350 also elects to share a file 337 with User's A and B. User C's client 346 retrieves User C's encryption key 338 from the client's key locker 344, and uses its encryption program 345 along with that key to encrypt the data file 341. The client 346 then transmits the encrypted data packet 323 to the DSS server 317. The DSS server then stores a copy of the encrypted data packet in its storage device 318 and forwards a copy of the file 316, 320 to the clients 302, 333 of Users A and B 301, 337.

The clients 302, 333 of Users A and B use their copies of User C's decryption key 310, 327, along with their decryption programs 306, 332 to produce decrypted copies 305, 336 of User C's original file, which they are then able to experience.

The only place where unencrypted copies of the files shared by all three users are found is within the respective clients of those users. The transmitted files, and the stored files, are all encrypted, and the DSS server does not have knowledge of, nor access to, the decryption keys required to reveal the user data concealed within those data packets.

User Interaction with the Private DSS

Figure 4:
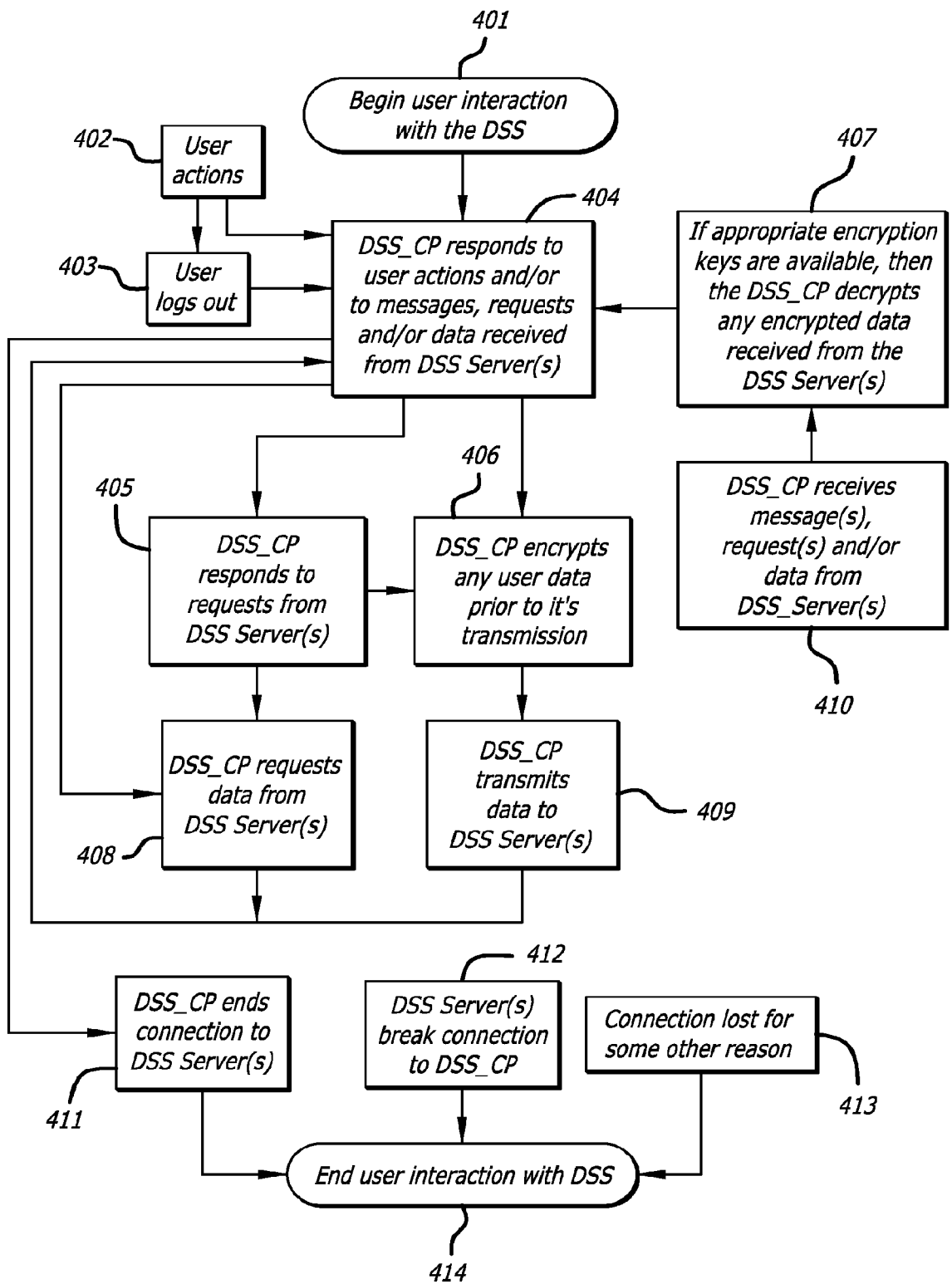
FIG. 4 illustrates a scheme by which a DSS client program facilitates a user's interactions with the server(s) of a private DSS.

FIG. 4 illustrates the actions and events which are typical of a user's interaction with the private DSS specified in an embodiment. User interaction begins 401 following the initialization of the DSS client on the user's computing device 101. Following initialization, the DSS client program (i.e. the "DSS_CP") operating on the user's computing device mediates 404 the user's interaction with the DSS server(s) by responding 404 to his interactions 402 with the DSS_CP, as well as responds 404 to messages, requests and data received 410 from the DSS server(s). For the most part, the DSS_CP performs four primary tasks: (1) it requests needed data, including encrypted user PID, from the DSS server(s) 408; (2) it decrypts encrypted (user) data received 410 from the DSS server(s) if it has access to the appropriate decryption key(s) 407; (3) it encrypts any user data 406 prior to its transmission 409 to the DSS server(s); and (4) it responds to user actions by altering its user interface and/or the data (e.g. messages from friends, photos, etc.) that it displays and/or by facilitating the user's creation and/or uploading of new content to the DSS 409. The DSS_CP continues performing these functions until the user logs out 403 of the DSS, at which point the DSS_CP ends its connection 411 to the DSS server(s). The DSS_CP may also end its operations 414 following a break in its connection 412 with the DSS server(s) and/or after losing that connection 413 for some other reason.

Functions of the DSS Client Program

The DSS client program ("DSS_CP") performs a number of functions important to the operation of a private DSS of the type herein. Primary functions of the DSS_CP are to: present the user with the field into which to input his encryption key and/or decryption key; decrypt encrypted user data using the user's decryption key, a system decryption key, and/or the decryption key of a "contact" and/or "friend;" encrypt user content using the respective user's encryption key; request user data and/or the data of contacts and/or friends, as needed; compose various presentations of data, most notably of user data (e.g. comment history, photos, etc.); provide the user with tools to generate new content (e.g. text editor, etc.); allow the user to upload new, or newly-created, content to the DSS and/or to share new content with friends and/or contacts; and transmit encrypted versions of new user data to the DSS server(s) for storage and/or transmission to and sharing with friends and/or contacts.

With respect to the operation of a secure data-sharing community (such as an online social network) implemented with a private DSS of the type disclosed herein, the DSS_CP can execute various types of operations. These include: receiving a user's encrypted key locker from the DSS server; decrypting a user's encrypted key locker using the user's decryption key (thereby revealing, and making accessible, the decryption keys of the user's contacts and/or friends); requesting a subset of the user's encrypted data from the DSS server; requesting a subset of the encrypted data of contacts and/or friends from the DSS server; decrypting user and contact data; encrypting new or modified user content with the respective users' encryption key; transmitting encrypted user data to the DSS server; composing an appropriate user interface populated with appropriate user/friend/contact data; responding to user interactions with the user interface in an appropriate manner; facilitating a user's creation of new content; facilitating a user's uploading of new, or newly-created, content to the DSS; facilitating a user's navigation through, and examination of, the user's and/or the user's contacts' data; and facilitating a user's communication with contacts and/or friends.

The DSS_CP can also provide the functionality and execute the operational steps required to provide the user with a data archive and any of the other features and programs included within the scope herein. This can include facilitating a user's access to, examination of and/or editing of archived data, and facilitating a user's creation, uploading and storing of archival data.

Importation of User's "Key Locker"

Figure 5:
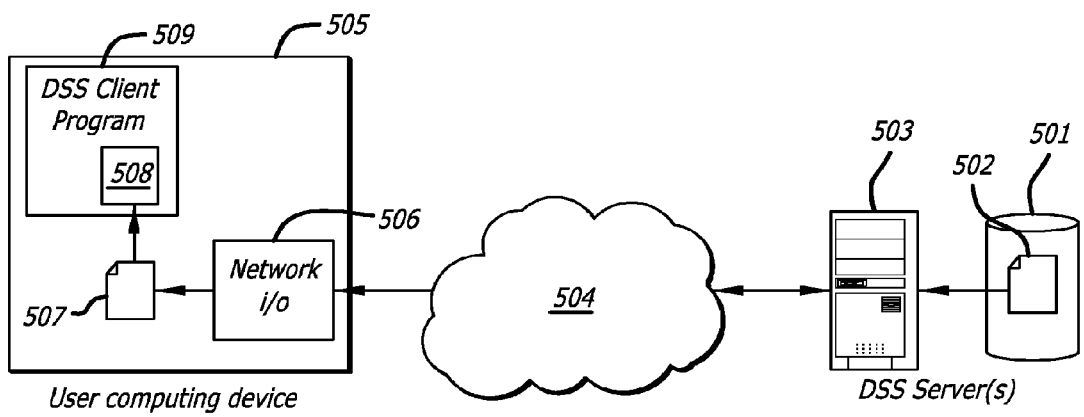
FIG. 5 illustrates an importation of a DSS "key locker," that is, a data structure containing a list of encryption keys needed to decrypt the encrypted data shared with the user by his contacts, in to the DSS client program operating on a user's computing device.

FIG. 5 illustrates a method by which a private-DSS "key locker" 508 can be imported into a DSS_CP 509 operating on a user's computing device 505. An encrypted version of a user's key locker 502 is stored within the DSS server(s) 503 and/or storage device(s) 501 (i.e. the "DSS system"). The user's key locker 502 is encrypted with the user's encryption key which is known only to the user and is neither stored in nor available to the DSS system 501 and 503.

After successfully logging in to the DSS system 501 and 503, a user's DSS client program ("DSS_CP") 509 issues a request to the DSS server for that user's encrypted data from the DSS system. The request will typically be transmitted through the data sharing network 504, e.g. the Internet, by the network I/O subsystem 506 of the user's computing device 505. After receiving the request for user data from the DSS_CP 509, the DSS system retrieves the user's encrypted data from storage 501, including but not limited to the user's encrypted key locker 502. And, after retrieving the encrypted key locker, the DSS system sends that encrypted file to the DSS_CP by means of the data sharing network 504.

After receiving the user's encrypted key locker 507, the DSS_CP 509 can use an appropriate set of encryption keys, including but not limited to the user's encryption key, to decrypt the user's key locker and load it into memory 508 associated with the DSS_CP. An example of this "memory" is the RAM allocated to the DSS_CP when it is launched on the user's computing device.

Three States of a User's Key Locker

Figure 6:
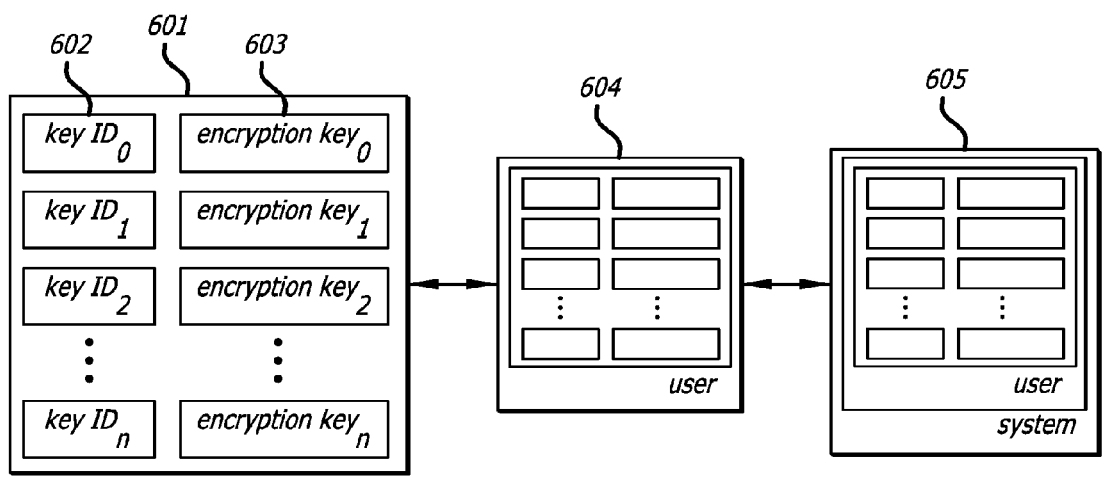
FIG. 6 illustrates a structure, and various stages of encryption, that can characterize a DSS key locker during the execution and operation of a private DSS.

FIG. 6 illustrates the structure, and various stages of encryption, that can characterize a DSS key locker during the execution and operation of a private DSS of a type of this disclosure.

A user's key locker 601 can contain a list of those encryption keys 603 and their associated key-identifiers 602 (which in an embodiment utilizing only a single decryption key per user can instead be the user-identifier) necessary to decrypt the encrypted versions of the data generated by that user's contacts. In an embodiment, a key locker contains a list in which each element in the list is a pair of data values. The first value 602 in each pair of values can be the identifier of a particular user, user contact and/or key. The second value 603 in each pair of values can be the encryption key of the user and/or key specified by the associated identifier 602.

In an embodiment, the key locker 601 exists in a "plain," intelligible unencrypted form only within the DSS client program ("DSS_CP") in which the user to whom the key locker belongs has successfully logged in to the DSS system, and in to which that user has entered his correct encryption key.

In an embodiment, following the addition of one or more new contact encryption keys to a user's key locker 601 and/or the deletion of one or more contact encryption keys from a user's key locker, the DSS_CP encrypts the modified key locker with the user's encryption key 604. It can then encrypt that encrypted version of the key locker 604 with a second encryption key known only to the DSS_CP and the DSS system. This results in a doubly-encrypted version of the user's key locker 605 which neither the user nor the DSS system can decrypt without the encryption key of the other. This doubly-encrypted user key locker 605 is then transmitted to the DSS system for storage along with the user's other encrypted data (replacing the earlier, now-obsolete copy of the user's encrypted key locker).

After a user successfully logs in to a private DSS, the DSS_CP operating on that user's computing device requests from the corresponding DSS server that some portion of the user's encrypted data, including, but not limited to, the user's key locker, be transmitted to the DSS_CP. The DSS server responds by sending the doubly-encrypted version of the user's key locker 605 to the DSS_CP. Upon receipt, the DSS_CP uses a user-unique encryption key supplied by the DSS system to the DSS_CP to decrypt the doubly-encrypted key locker, resulting in a version of the key locker 604 still obfuscated by encryption with the user's encryption key. The DSS_CP then decrypts this semi-decrypted file 604 with the encryption key that the user has entered in to the DSS_CP during the log-in process and stores the result within memory associated with the DSS_CP.

A key locker can contain a list of id: key pairs in which each id is unique within the corresponding DSS and the value corresponding to each id can be an encryption key, a decryption key, or a symmetric encryption key (i.e. a key used for both encryption and the corresponding and complementary decryption). The value can also be, identify and/or specify a program, or a portion of a program, publically-known or custom, which implements a specific encryption and/or decryption algorithm, e.g. a customized "secret" encryption algorithm or its complementary decryption algorithm. The value can also represent some other specific means of obfuscating and/or de-obfuscating data.

One key-locker id might be used to identify an encryption key and/or algorithmic program, and another id used to identify the corresponding and complementary decryption key and/or algorithmic program.

If an embodiment uses key lockers solely to determine the means to de-obfuscate obfuscated data associated with a particular de-obfuscation identifier, then such a key locker need only specify decryption keys and/or de-obfuscation algorithmic programs. However, if an embodiment allows users to specify various distribution lists with which to control and limit the distribution and sharing of particular packets of data, and if the embodiment further allows each of those distribution lists to be associated with a unique obfuscation key and/or algorithmic program, then the key lockers associated with such an embodiment may be used to specify not only de-obfuscation key and/or algorithmic program required to restore and/or de-obfuscate any particular data packet, but also to specify the obfuscation key and/or algorithmic program to be utilized to obfuscate the data packets to be distributed according to any particular distribution list. Thus, such a key locker's identifiers might specify either a means of obfuscation or a means of de-obfuscation. An alternative also within the scope of this disclosure is that the key locker supports triplets of values, in which a particular identifier can be associated with both a means of obfuscation as well as a corresponding and complementary means of de-obfuscation.

Interaction of the DSS Client and Server

Figure 7:
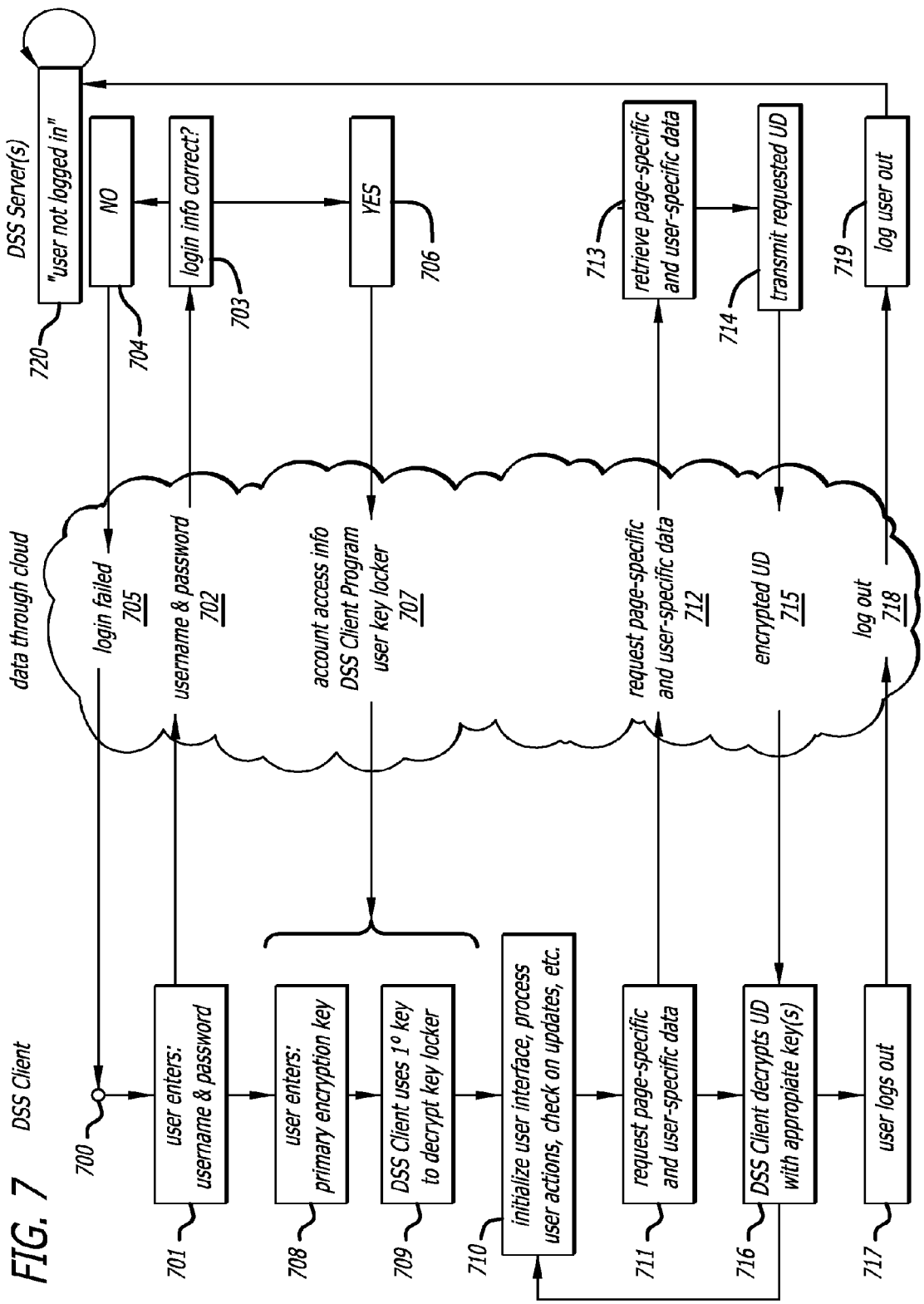
FIG. 7 illustrates a pattern of interactions which can characterize a user's interaction with a private DSS.

FIG. 7 is a simplified illustration of a basic data flow in a private DSS implemented in accordance with an embodiment herein. This illustration is provided as an introduction to the operation of an embodiment of a DSS herein. Actual implementations, even of an embodiment of it, can vary substantially from the steps illustrated in this figure. And, all such actual "practical" embodiments of objects are included within the scope of this disclosure.

When a user initiates the operation of a DSS client 700, the DSS client (or a login program) prompts the user to enter his username and login password 701. The DSS client (or login program) then sends the user-supplied username and password to the DSS server 702 via a data distribution network. The DSS server verifies the submitted username and password 703.

If the submitted password does not match the value stored in the DSS server with respect to the specified username, or, if no account with the specified username is found, then the DSS server rejects the login attempt 704. The DSS server transmits to the DSS client (or login program) a notice that the login failed 705. The DSS client (or login program) then again prompts the user for the input of a valid username and password 701.

If the submitted username and password are successfully validated 706, then the DSS server uploads to the user's computing device the DSS client, if it is not already in operation, replacing in the process the login program. It then transmits to the DSS client (a) the information needed to access the account specified by the submitted username; (b) any updates or components to the DSS client; and (c) the user's encrypted "key locker" 707 (the file containing the decryption keys and corresponding identifiers required to decrypt the data associated with each of the user's contacts).

The DSS client prompts the user for his encryption key (and/or decryption key) 708, and, upon receipt of the user's key locker from the DSS server 707, the DSS client decrypts the user's key locker 709.

After this process of initialization, the DSS client begins a cyclic pattern of interaction with the DSS server. The DSS client requests 711 from the DSS server 712 any encrypted data from the user and/or contacts appropriate to the context of the DSS client's user interface. Upon receipt of the encrypted user data 715, the DSS client uses the appropriate decryption key(s) to decrypt that data 716. The DSS client, for example, then makes this decrypted user data available to the user via the user interface.

The DSS client responds to any new data created and/or uploaded by the user by encrypting that data and submitting the encrypted version(s) to the DSS server for further processing. The DSS client responds to any new requests by the user for access to contact data by requesting any available encrypted contact data from the DSS server. Upon receipt of that encrypted contact data, the DSS server uses the contact's decryption key (stored in the user's key locker) to decrypt the data. When contacts of the user create, upload and/or modify any of their data, the DSS server passes that encrypted user data to the user's DSS client. And, again, the DSS client retrieves the needed decryption key(s) from the user's key locker and decrypts the encrypted contact data.

When the user is done interacting with the DSS and logs out of the DSS client 717, the DSS client notifies the DSS server 718 and the DSS server then terminates 719 the user's session with the DSS server 720.

Exchange of Keys Between Two Users of Private DSS

Figure 8:
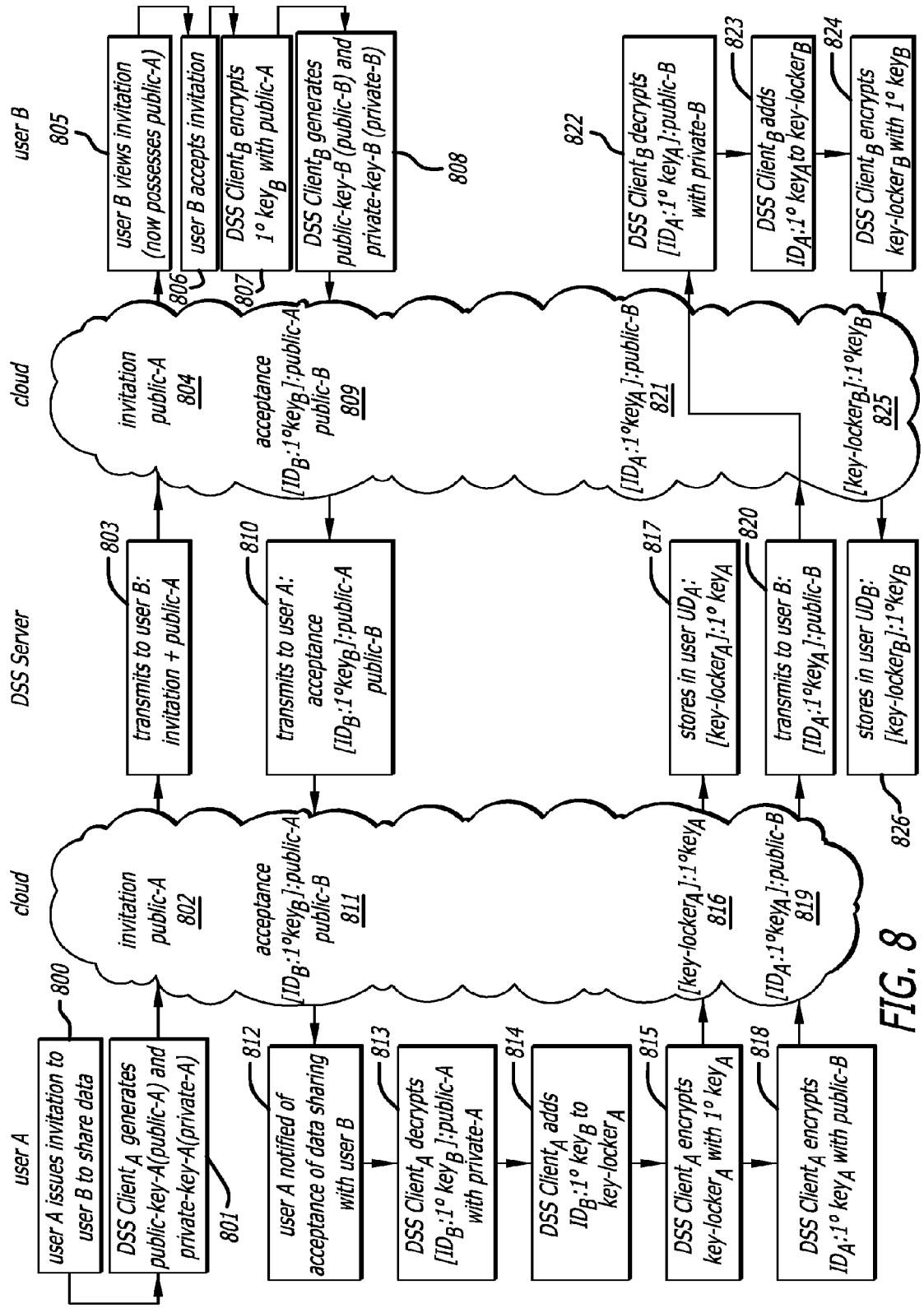
FIG. 8 illustrates a method by which two users of a private DSS can exchange their decryption keys in a manner which does not allow the system facilitating that exchange to have access to, nor knowledge of, the actual values of those decryption keys.

FIG. 8 illustrates a process herein by which two users, who have agreed to share their data and thereby to become "contacts" or "friends," have their decryption keys exchanged for them by their respective DSS clients.

When "User A" invites "User B" to become a contact 800, in addition to issuing a formal invitation to User B, the DSS client of User A generates a complementary pair of a "public encryption key" and a "private decryption key" in accordance with a suitable public-key cryptography algorithm 801. User A's DSS client then transmits the invitation and the associated public encryption key to User B 805, via the DSS server 802, 803 and 804.

Upon receipt of the invitation 805 and corresponding public encryption key, User B decides whether or not to accept User A's invitation to share data. If User B rejects the invitation, then nothing happens, or maybe User A is notified of the rejection. On the other hand, if User B accepts the invitation 806, User B's DSS client encrypts User B's decryption key (here referred to as User B's "primary" decryption key meaning that in this case User B has elected to share with User A the decryption key required to decrypt data encrypted with the encryption key which User B enters into his DSS client at the time of its initialization) with the public encryption key that it received from User A's DSS client along with the invitation 807. The DSS client of User B now generates its own "public encryption key" and a "private encryption key" in accordance with a suitable public-key cryptography algorithm 808. After this, User B's DSS client transmits the "notice of acceptance," User B's encrypted primary decryption key, and User B's public encryption key to User A 812 via the DSS server 809, 810, 811.

Upon receipt of the notice of acceptance, User A is informed of User B's decision 812. User B's encrypted primary decryption key is decrypted using the private decryption key that the DSS client of User A generated when, and retained after, it generated the public encryption key that it sent to User B 813.

User A's DSS client adds the decrypted primary decryption key of User B to User A's key locker 814. User A's DSS client then generates an encrypted version of this modified key locker with its (User A's) primary encryption key 815 and sends that encrypted key locker to the DSS server 816, which the DSS server uses to replace User A's former encrypted key locker 817.

In addition to encrypting a user's key locker with the user's primary encryption key 815 and 824, the DSS client can also encrypt it with a user-unique system-supplied "system key locker encryption key" (e.g., $Key_{SYS\_A}$" 815 and "$Key_{SY\_B}$" 824). If this type of double encryption is used to more fully protect the integrity of a user's key locker, then the doubly-encrypted key locker is transmitted to the DSS server and stored therein 817 and 826.

However, at this point, User B's DSS client still does not have a copy of User A's primary decryption key. And, User B's DSS client will need a copy of that key if it is to decrypt User A's encrypted data. To remedy this, User A's DSS client uses the public encryption key generated and provided to it by User B's DSS client, to encrypt User A's primary decryption key 818 (i.e. the decryption key required to decrypt data encrypted with the encryption key which User B enters into his DSS client at the time of its initialization). User A's DSS client then transmits this encrypted primary decryption key to User B's DSS client 822 via the DSS server 819, 820, 821.

Upon receipt of this encrypted User-A primary decryption key, User B's DSS client uses the private decryption key that it generated when, and retained after, it generated the public encryption key that it sent to User A to decrypt User A's primary decryption key 822.

User B's DSS client then adds User A's primary decryption key to User B's key locker 823 and generates an encrypted version of this modified key locker 824 using User B's primary encryption key. User B's DSS client then transmits this encrypted key locker to the DSS server 825. Upon receipt, the DSS server replaces the old version of User B's encrypted key locker with the new one 826.

Now, both User A and User B (or, more accurately, the DSS clients of Users A and B) possess each other's primary decryption keys. And, importantly, the DSS server at no time had access to the plain (i.e. the unencrypted) version of either user's primary decryption key.

Exchange of Messages within a DSS

Figure 9:
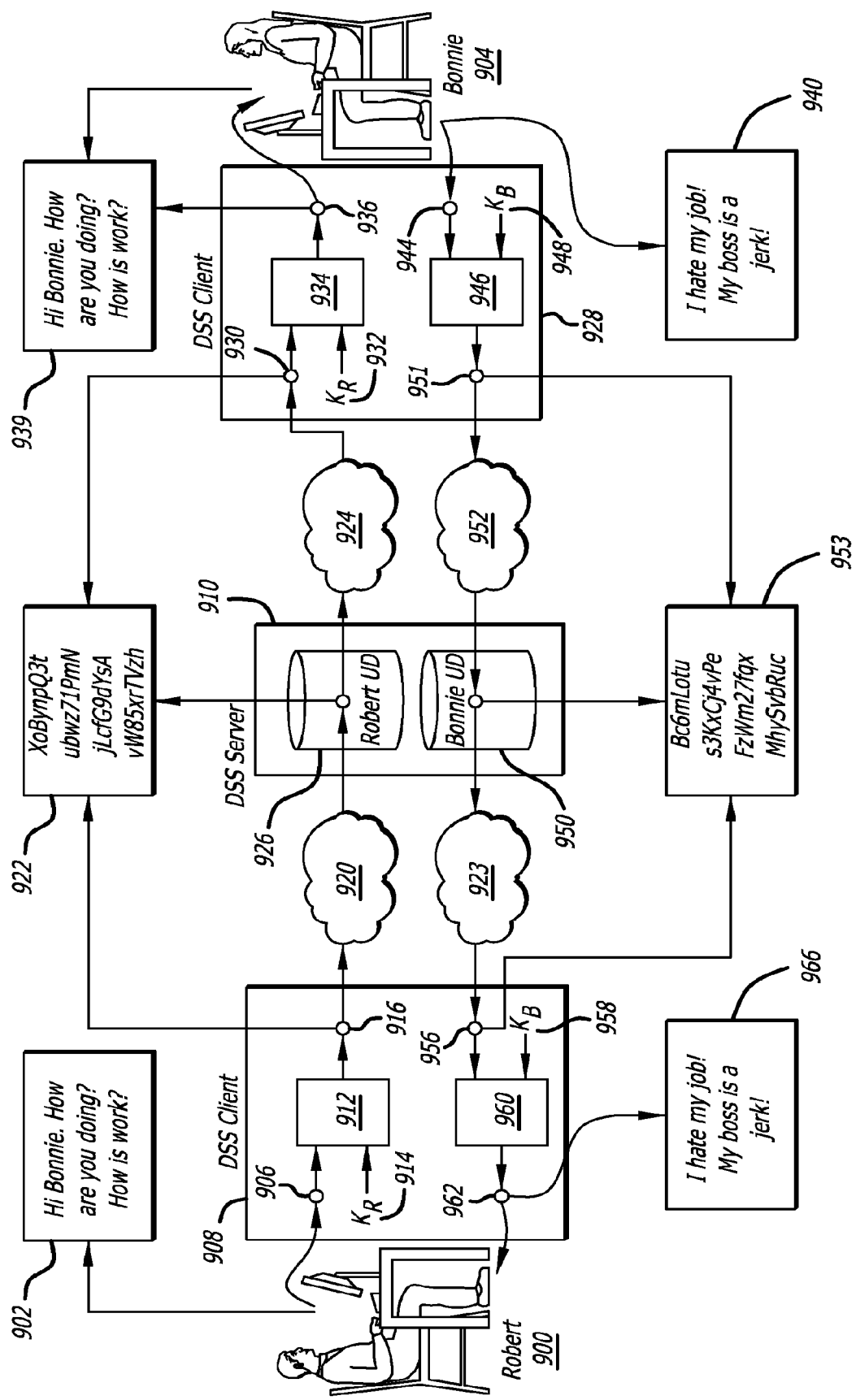
FIG. 9 illustrates an exchange of messages within a private DSS occurring between two users of the DSS.

FIG. 9 illustrates a process by which two users, who are friends within the context of a private DSS (e.g. a private OSN), can securely and privately exchange text messages.

Referring thereto, "Robert" 900 composes a text message 902 to his friend "Bonnie" 904. That text message 906 is composed within the DSS client 908 running on Robert's computing device. After it is completed and prior to its transmission to the DSS server 910, the encryption module 912 within Robert's DSS client 908 encrypts Robert's message 906 using Robert's encryption key 914, denoted as "$K_R$" in this drawing figure. The encrypted version of Robert's message 916 is then sent to the DSS server 918 via the associated data distribution network (e.g. via the Internet) 920.

An "encryption module" can be a specialized portion of code within, or accessible to (e.g., as a "DLL" or "library"), the DSS client which is able to encrypt and/or decrypt data according to one or more algorithms. In this case, because the same key (e.g. "$K_R$") is used to both encrypt and decrypt data, the algorithm is a "symmetric-key encryption/decryption algorithm." And, typically, one specialized portion of code is used to encrypt data, and another specialized portion of code is used to decrypt data, with respect to such an encryption algorithm.

Robert's message 902 is not intelligible following its encryption 922, and the encrypted version of his message is the only version transmitted through the data distribution network 920 and stored within the DSS server 910. At no time can the owners and/or operators of the DSS view, analyze, sell or otherwise exploit the information in Robert's encrypted message 926 to Bonnie 904.

When the DSS server 910 receives the encrypted version of Robert's message 926 it stores that encrypted message in the set of encrypted data which it stores in association with, and on behalf of, Robert's account within the DSS. The DSS server 910 determines that Robert's latest data 926 is to be shared with Bonnie 904 due to the "data access list" which Robert's DSS client 908 associated with that packet of Robert's data 926. The DSS server 910 then transmits the encrypted packet of data 926 to Bonnie's DSS client 928 via the data distribution network 924.

When Bonnie's DSS client 928 receives the encrypted data packet 930 from Robert's DSS client 908 it determines that its author is Robert 900 due to an unencrypted attribute associated with the encrypted data packet 930. Bonnie's DSS client 928 retrieves Robert's decryption key 932 (which, in this case, is the same as Robert's encryption key), denoted in the illustration as "$K_R$," from Bonnie's key locker. It then sends the encrypted data 930 received from Robert's DSS client 908, along with Robert's primary decryption key 932, to its decryption module 934 so that Robert's encrypted message 930 can be decrypted.

The original text message authored by Robert 936 is restored by the decryption module 934 of Bonnie's DSS client 928. Bonnie 904 is then able to view and read Robert's message 939.

Bonnie 904 then composes a text message 940 in response to Robert's message 939. Bonnie's text message 944 is composed within the DSS client 928 running on her computing device. After her response 944 is completed, and prior to its transmission to the DSS server 910, the encryption module 946 within Bonnie's DSS client 928 encrypts Bonnie's message 944 using Bonnie's encryption key 948, denoted as "$K_B$" in this illustration. The encrypted version of Bonnie's message 950 is then sent to the DSS server 910 via the data-distribution network 952.

Bonnie's message 940 is not intelligible following its encryption 952. And, the encrypted version of her message is the only version transmitted through the data distribution network 952 and stored within the DSS server 910. At no time can the owners and/or operators of the DSS view, analyze, sell, or otherwise exploit the information in Bonnie's encrypted message 950 to Robert 900.

When the DSS server 910 receives the encrypted version of Bonnie's message 950 it stores that encrypted data packet in the set of encrypted data which it stores in association with, and on behalf of, Bonnie's account within the DSS. The DSS server determines that Bonnie's latest encrypted data packet 950 is to be shared with Robert 900 due to the "data access list," which Bonnie's DSS client 928 associated with that element of Bonnie's data packet 950. The DSS server 910 then transmits the encrypted data packet 950 from Bonnie 904 to Robert's DSS client 908 via the data distribution network 923.

When Robert's DSS client 908 receives the encrypted data packet 956 from Bonnie's DSS client 928 it determines that its author is Bonnie 904 due to an unencrypted attribute associated with the encrypted data packet 956. Robert's DSS client 908 retrieves Bonnie's decryption key 958, denoted in the illustration as "$K_B$," from Robert's key locker. It then sends the encrypted data 956 received from Bonnie's DSS client 928, along with Bonnie's decryption key 958, to its decryption module 960 so that Bonnie's encrypted message 956 can be decrypted.

The original text message 962 authored by Bonnie 904, in response to the text message that she received from Robert 900, is restored by the decryption module 960 of Robert's DSS client 908. Robert is then able to view and read Bonnie's response 966.

Figure 10:
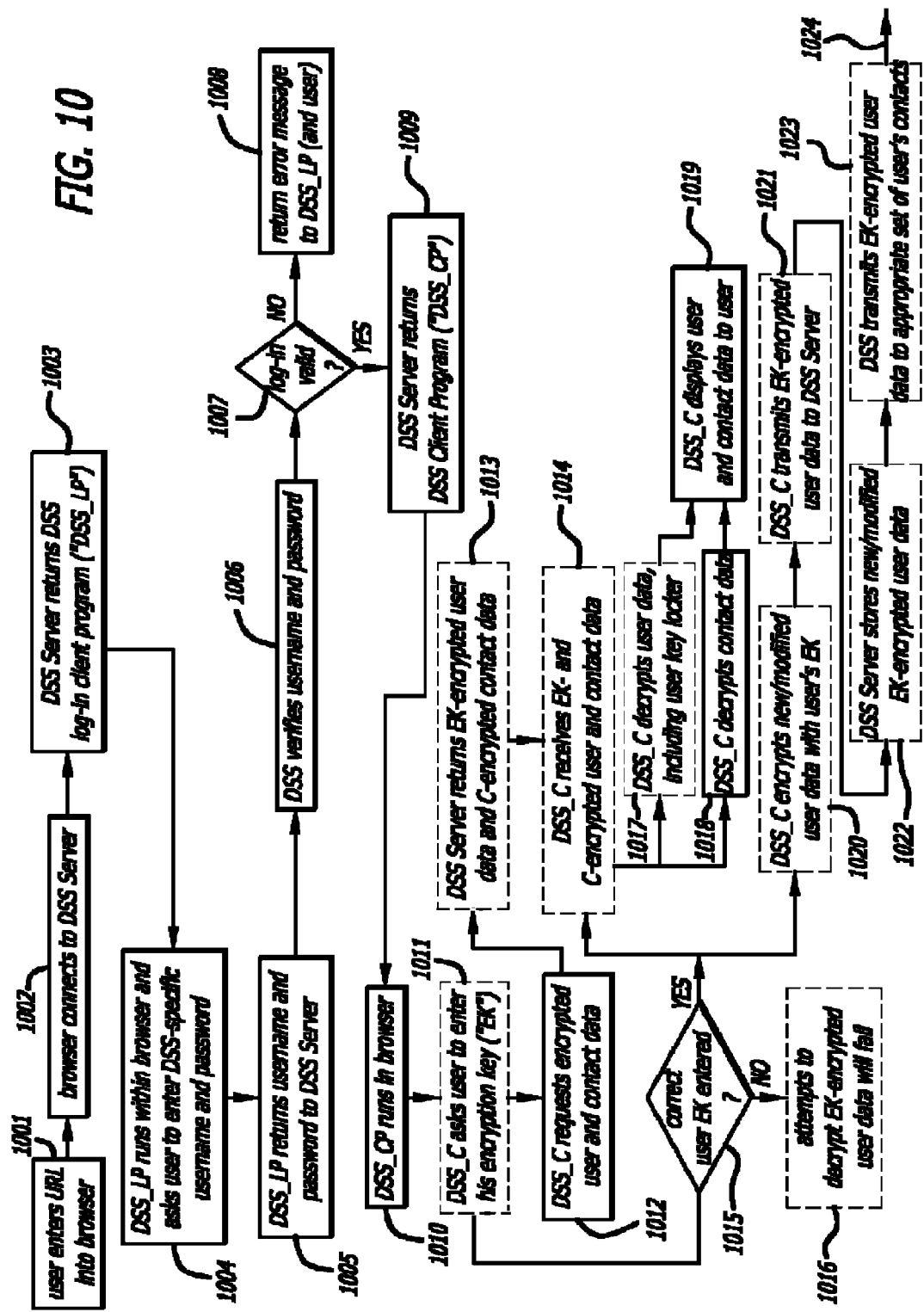
FIG. 10 illustrates basic actions and steps that can characterize the operation of a private DSS and identifies some of the steps not found in the operation of traditional DSS's.

Some Differences Between Present Disclosure and Traditional Data Sharing Systems FIG. 10 illustrates some of the basic steps involved in the functioning of a private DSS implemented in a manner consistent with an embodiment herein. As would be apparent to those skilled in the art the relative order of some steps can be changed without diminishing the beneficial attributes. Also, some of the steps have been omitted, and others overly simplified, for the sake of clarity, as can be understood by those skilled in the art.

The steps that are partially or entirely different than the steps which might be involved in the functioning of a traditional DSS are outlined in dashes instead of solid lines in this figure for explanatory purposes.

A user can initiate his interaction with the DSS by entering the URL of the DSS server 1001 into the browser running on his computing device. The browser then interacts with the operating system, other software programs and/or the hardware of the computing device, to connect to the DSS server 1002 through the data distribution network to which the computing device and DSS server are mutually connected.

The DSS server returns to the user's browser a DSS log-in client program (i.e. "DSS_LP"). The DSS_LP runs within the browser and asks the user to enter his DSS-specific username and password 1004. After the user finishes entering the username and password the DSS_LP returns these values to the DSS server 1005.

The DSS server verifies the username and password entered by the user 1006. If they are not valid 1007 then the DSS server returns an error flag to the DSS_LP 1008, and the DSS_LP informs the user of the failure. If they are valid 1007, then the DSS server returns to the user's browser a DSS client program (i.e. "DSS_CP") 1009. The DSS_CP runs in the user's browser and asks the user to enter his encryption key ("EK").

The user's entry of an encryption key into the DSS-specific browser program, in addition to a username and password, are novel and unique.

At the same time that the DSS_CP asks the user for his encryption key, it also requests from the DSS server the data needed to assemble the user interface of the DSS_CP 1013.

This data includes, but is not limited to, data generated by the user, and encrypted with his encryption key ("EK-encrypted data"), as well as data generated by the user's "contacts" (i.e. other users of the DSS who have agreed to share the user's information, and to share their information with the user), and encrypted with the encryption keys of each of those contacts ("C-encrypted data"), respectively.

The DSS server returns the user's EK-encrypted data, which includes, but is not limited to, the user's EK-encrypted "key locker." The user's key locker is a list of "identifier: key" pairs, including in each data pair the identifier of an encryption and/or decryption key with the identifier being unique within the DSS, as well as the corresponding encryption and/or decryption key. The DSS client (i.e. "DSS_C") receives the EK- and C-encrypted data from the DSS server 1014.

The DSS_C then attempts to decrypt the user's key locker 1017 using the encryption key provided by the user 1011. If that encryption key is correct 1015, the DSS_C decrypts the user's key locker, which contains the decryption keys needed to decrypt the encrypted data generated by each of the user's contacts within the DSS. The DSS_C then decrypts the remaining EK-encrypted user data 1017 as well as the C-encrypted contact data 1018.

On the other hand, if that encryption key is not correct, then the data resulting from an attempt to decrypt the key locker (or any other EK-encrypted data of the user) will fail, and will not result in any intelligible or useful information. The failure to decrypt the user's key locker also prevents the DSS_CP from gaining access to the collection of decryption keys required to decrypt any of the C-encrypted contact data.

Following the decryption of all of the user and contact encrypted data, the DSS_C can create a complete user interface for the user, allowing the user to view, read and otherwise experience all of his own data and/or media, as well as the data and/or media generated by his contacts. The user interface can include a section in which comments and status updates of the user and/or his contacts (e.g. friends) are displayed; a section in which the user's photos and/or videos, and/or those of his contacts, are displayed; controls which allow the user to generate new comments and/or status updates; controls which allow the user to upload photos, videos, documents, and other data in to the DSS for storage in the user's personal archive and/or for distribution to some or all of the user's contacts; controls allowing a user to switch between "personas," i.e. to adjust the subset of contacts for which data is to displayed in the user's DSS client user interface; controls allowing a user to specify which contact or subset of contacts is to be permitted to receive and/or experience any particular collection of the user's data; etc.

The user interface also allows the user to modify or delete his own existing data and/or media, as well as create or upload new data and/or media. If the user modifies (including deleting) his own data and/or media, or creates or uploads new data and/or media, then the DSS_C encrypts that new and/or modified content with the user's encryption key 1020 and transmits it to the DSS server 1021, after which the DSS server stores the encrypted new and/or modified user content 1022 and, if appropriate, transmits some or all of that new and/or modified user content to the appropriate subset (if not all) of the user's contacts 1023, 1024. The DSS_C is prompted to transmit the encrypted content to the DSS server typically, but not exclusively, when the user clicks a button or link to complete a submission, upload, etc. This triggers the DSS_C to encrypt the data and then to transmit it to the DSS server.

Portion(s) of System Architecture in which Only Obfuscated User Data is Found

Figure 11:
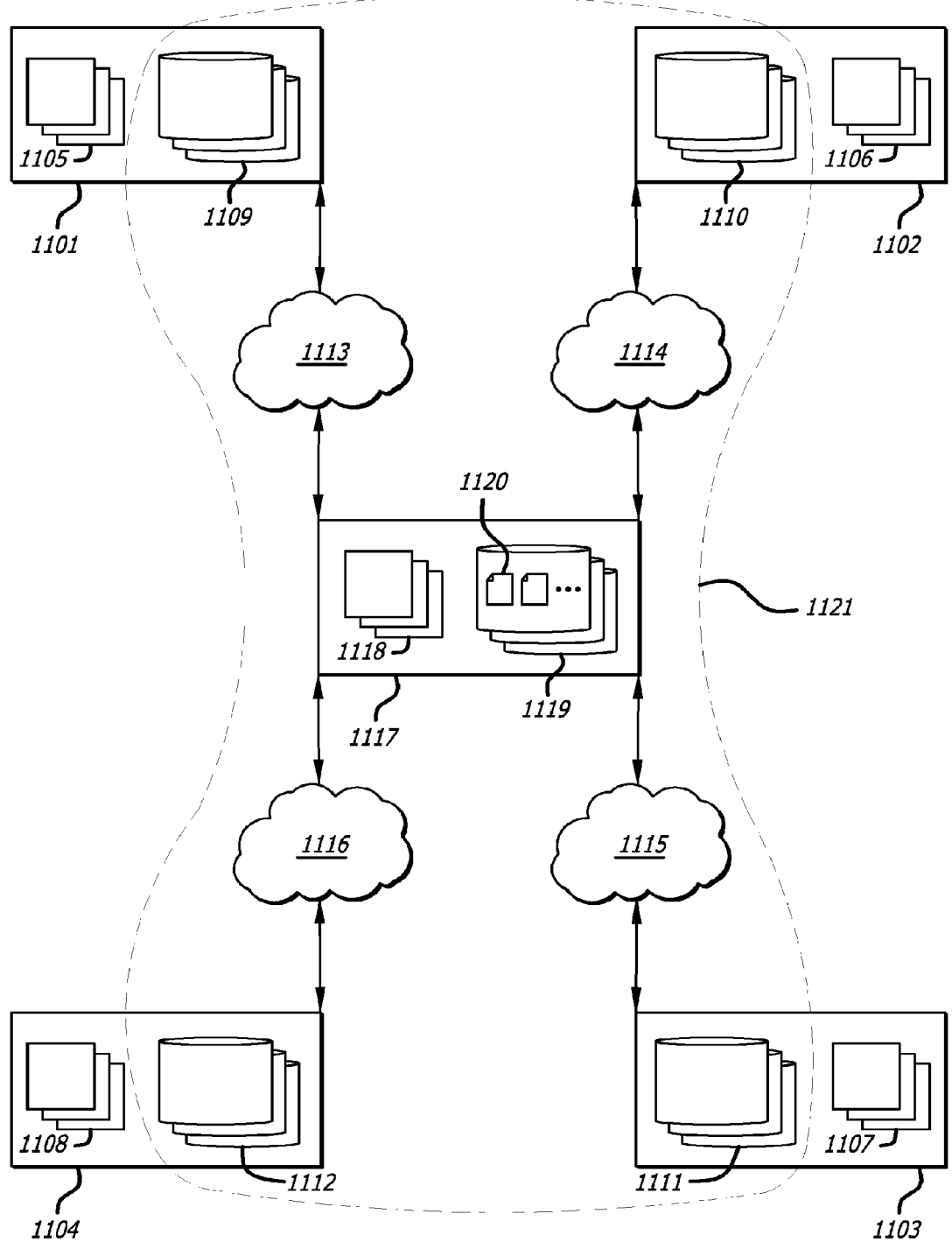
FIG. 11 illustrates the portion of a private DSS which processes, stores and/or transmits only encrypted user data.

FIG. 11 illustrates a simplified architecture of a private DSS herein. Units 1101, 1102, 1103, 1104 represent user-specific computing devices, containing storage modules 1109, 1110, 1111, 1112, which are connected to a centralized DSS system 1117 containing various programs 1118 and storage devices 1119, through a data-distribution network, like the Internet, 1113, 1114, 1115, 1116. The DSS_CP's 1105, 1106, 1107, 1108 operating within the user computing devices 1101, 1102, 1103, 1104 may contain, and/or be composed of, a plurality of cooperating software programs, or they may be "stand-alone" programs.

Within the dashed boundary 1121, user content is stored and transmitted exclusively in an obfuscated format. Specifically, in an embodiment, any user data is encrypted with an encryption key of the respective user. This includes not only storage 1119 within the DSS system 1117 but also within any storage modules and/or devices 1109, 1110, 1111, 1112 associated with the individual user computing devices 1101, 1102, 1103, 1104 in which the DSS_CP's operate.

The only location where the raw, intelligible, understandable, unencrypted user data can be found is within the DSS_CP's 1105, 1106, 1107, 1108 and any memory (e.g. portions of the RAM of the respective computing devices) which are directly allocated by and dedicated to the operation of the DSS_CP's.

Alternative DSS Embodiments

Figure 12:
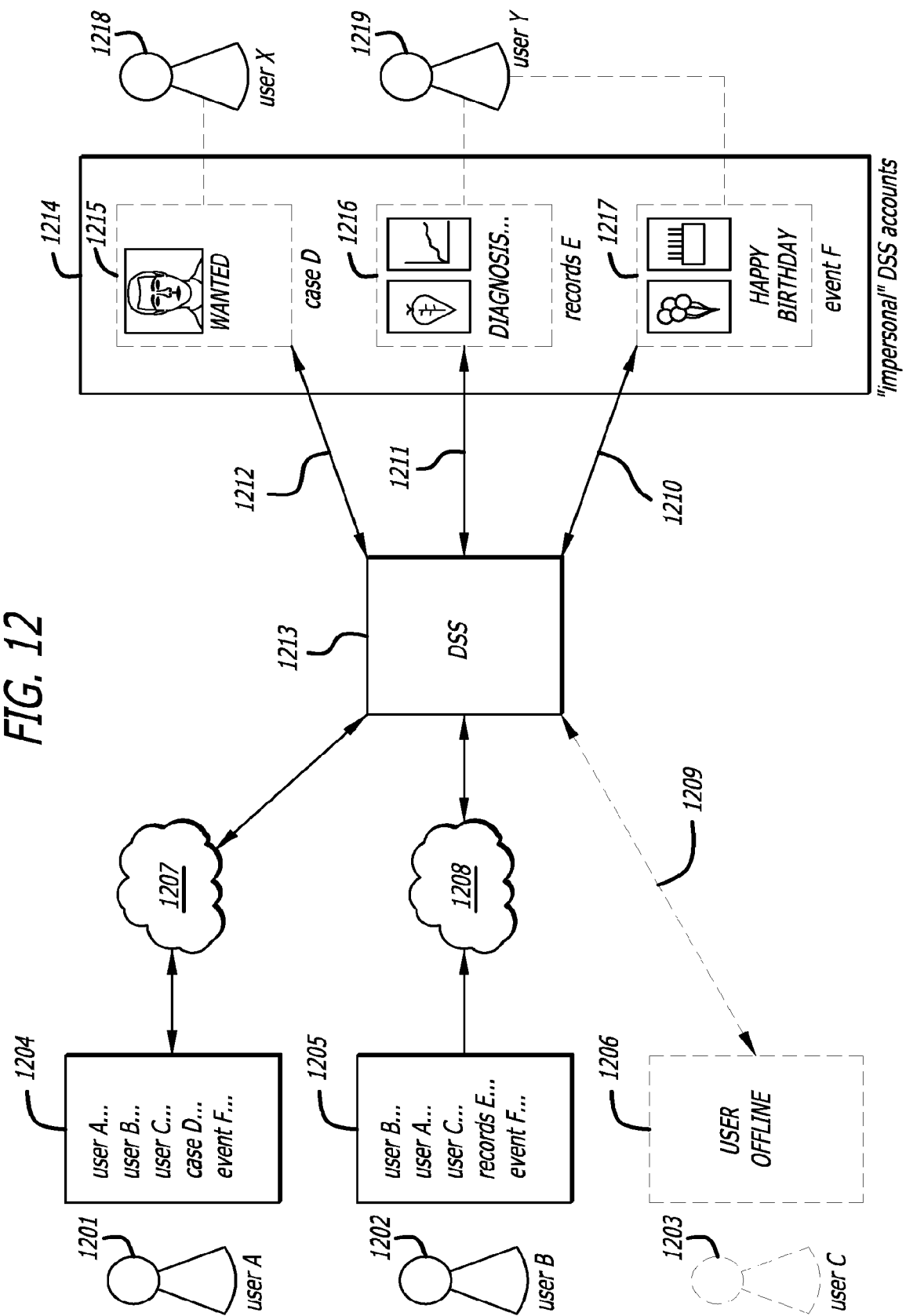
FIG. 12 illustrates possible alternative embodiments and/or applications of a private DSS, capable of providing a structured management of data and an optimal degree of control of user access to that data.

FIG. 12 illustrates an alternative private DSS pursuant to this disclosure. Referring thereto User A 1201 and User B 1202 are able to view their own data, as well as the data generated by their contacts, with the respective user interfaces 1204 and 1205 generated by the respective DSS clients (i.e. "DSS_C's") operating within their respective computing devices. User A 1201 can see his own data, e.g. "User A . . . ", as well as the data generated by his contacts, e.g. "User B . . . " and "User C . . . ", displayed in the user interface 1204 generated by his DSS_C. User A can also view the data generated by his contact User C 1203 even though User C is offline. This is because User C's obfuscated data is stored within the centralized DSS system 1213 and is therefore available for viewing whether or not User C is actually connected to the centralized DSS system at any particular moment.

The user interface 1204 of User A (1201) can display the data associated with "Case D" (which can represent data associated with a particular criminal investigation, detective story, lawsuit, etc.) even though Case D 1215 is not an actual user of the DSS. Instead, Case D can be a collection of data assembled and edited by others that exists as a virtual user within the DSS. Case D is a full user account, or one "persona" defined within a full user account, under the control of the user who "owns" that account. User A 1201 is able to "friend" (i.e. share data with) Case D 1215 just as he would any other user of the DSS. In this case, however, an "owner" of Case D would serve as the "gatekeeper" or "owner" of the Case D account. That owner would decide whether or not to allow User A to share data with Case D.

The owner of an account within a DSS can, in one embodiment, allow other users to add, delete and/or edit data within his account. One method by which this can be accomplished is through the sharing, by the DSS client of Case D of a public encryption key, and the retention of the corresponding private decryption key, specific to User A, which User A can then use to encrypt any data which User A wished to have added to Case D, or any of Case D's data which User A wished to modify and see updated. Following the receipt and decryption of the public-key-encrypted data from User A, with the corresponding and complementary private decryption key, the owner(s) of the Case D account would then have the option to review and approve (or reject) the data submitted by User A. If the data is accepted, then the DSS client of the owner(s) of Case D can encrypt that data with the Case-D encryption key and transmit it to the DSS server for storage and/or transmission to Case D's contacts.

This type of "contact-editable" user account within a private DSS is suitable for use as the basis for the secure, private and user-authenticated creation and maintenance of "wiki-like" shared documents and/or collections of data.

In such an alternate embodiment of the private DSS, the human users sharing data with Case D can (optionally) be authorized by Case D's owner to edit, delete or add to the content of Case D. In addition, in an embodiment of this alternate embodiment, the private DSS would maintain, and make available to, the owner of Case D an "audit trail" of all changes to the content associated with the Case D account. (See FIG. 22.)

The owner of Case D can also terminate any data sharing relationships within the DSS as needed, thus dynamically controlling access to the data within the Case D account.

While Case D represents a collection of data that might be associated with a law enforcement investigation, the virtual account "Records E" might be associated with a particular person's medical records, and the virtual account "Event F" might be associated with the planning of a particular event. The accounts (or personas within accounts) Case D, Records E and Event F are examples of the types of data that might be associated with virtual accounts within a private DSS of a type of this disclosure. However, there is essentially no limit to the types of data that might be associated with these types of virtual private DSS accounts, or of the motivations for which such accounts might be created.

These types of virtual accounts allow the private DSS to be used as a system to control access to shared sets of subject-specific data in a dynamic manner with access able to be specified with respect to individual data packets (through the use of customized and/or data-packet specific distribution lists). The "virtual" user accounts "Records E" 1216 and "Event F" 1217 can have a common gatekeeper, such as User Y 1219. In a primary embodiment, the user of a DSS can have multiple independent accounts and/or a user account in which are defined "multiple personas" (see FIG. 21).

Figure 13:
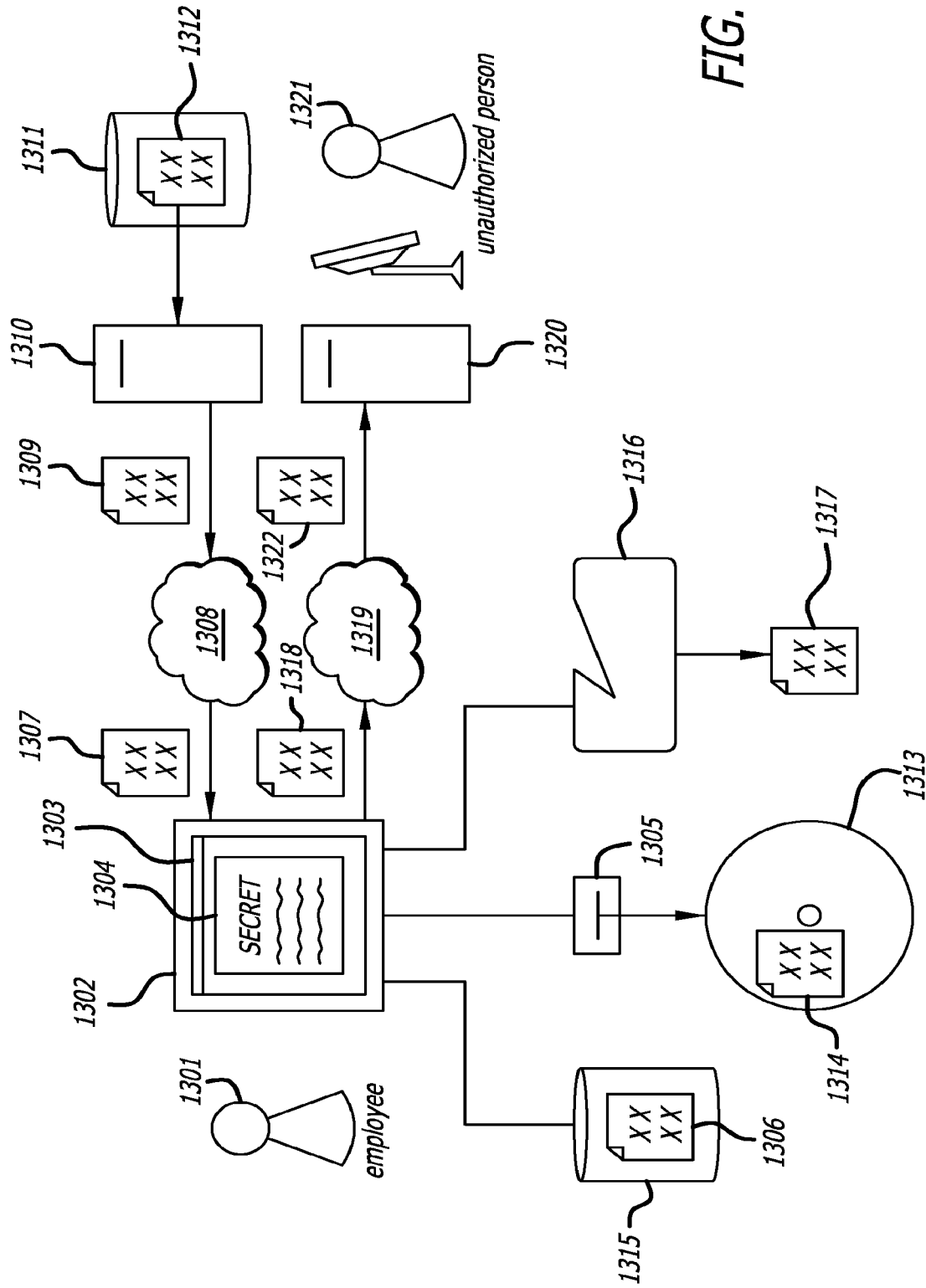
FIG. 13 illustrates the utility of this private DSS with respect to protecting sensitive data.

Benefits of DSS to Businesses, Government Agencies, Healthcare Providers and/or Other Organizations Responsible for Ensuring the Security of Sensitive Data FIG. 13 illustrates one of the advantages provided by a private DSS herein with respect to preventing the unauthorized copying and/or dissemination of sensitive information. As discussed earlier, a private DSS herein can treat collections of related (and presumably sensitive) data as virtual users or personas within the DSS (see, e.g., FIG. 12). This allows human users of the system to be provided with access to that data as needed, and to be denied access when the need for access is no longer deemed necessary by the gatekeeper(s) of each respective virtual user account or persona.

However, as some organizations have recently discovered providing employees with direct access to sensitive documents and/or data can be problematic. For example, a soldier with access to a database of U.S. State Department emails recently made digital copies of some of those emails and provided them to a third party who eventually made them public. This caused extensive public-relations problems as well as likely deaths of some confidential informants.

Within a private DSS of a type herein such emails can be stored on the DSS server(s) 1310 and related storage device(s) 1311 in an encrypted and unintelligible form 1312. When requested by a user/employee 1301, a copy of the encrypted document 1309 is transmitted to the user's computing device 1302 by means of the data-distribution network 1308 after which it is decrypted by the user's DSS client 1303 ("DSS_C"). The user's computing device 1302 and/or his DSS_C 1303 can store that document 1306 in an appropriate storage medium on the user's computing device. However, that locally stored copy 1306 will also be encrypted.

The DSS_C can decrypt the document using the appropriate "contact" decryption key stored within its key locker and subsequently display a readable version 1304 of the document to the user. ("Display" can mean to present an image of the information which a human is able to visually understand, examine and experience.) Any attempt by the user 1301 to print a copy 1317 of the locally-stored copy of the document 1306 by means of a printing device 1316 attached to his computing device will only print the encrypted version of the document. This is because any locally-stored copy of a DSS document will only contain an encrypted version of the data (unless the owner or gatekeeper of the data has opted to allow an unencrypted version of the data to be stored on the user's computing device). Similarly, any attempt by the user 1301 to transmit a digital copy 1318 of the locally-stored copy of the document 1306 by means of some data distribution network 1319 (e.g. the Internet) to which his computing device 1302 is connected, to the computing device 1320 of some unauthorized recipient 1321, will only transmit the encrypted version of the document.

Since neither the user/employee 1301 nor any unauthorized recipient(s) 1321 of such sensitive information possesses nor has access to the decryption key associated with the "virtual user" that owns the document within the private DSS, the user 1301 as well as any unauthorized recipient(s) 1321 will also lack the means to obtain a decrypted version of this document suitable for distribution, viewing and/or analysis outside the DSS.

The user can still likely capture a "screen shot" of the display (e.g. with some utility available within the operating system of the user's computing device, or with a digital camera), or, at a minimum, he will likely be able to write down information on a piece of paper and then distribute a copy of such an indirectly-captured copy of the data. However, such a procedure would likely be conspicuous to other people in the area and would also likely be much more time-consuming than simply making a digital copy of the original data file(s).

The use of a private DSS of a type disclosed herein to control access to sensitive data within an organization benefits such organizations by making the copying and dissemination of sensitive data more difficult to perpetrate, more likely to be detected by others, more time-consuming and less likely to succeed.

Any sensitive organizational data accessible within the private DSS by means of the associated "virtual user" account will be stored 1306 (if at all) on a user's computing device in an encrypted format for which the user will neither possess nor have access to the encryption required for its decryption. The only place where such sensitive data will exist in a "plain" unencrypted format will be within the memory (presumably RAM) within which the DSS client program stores its program-specific data and with which the DSS_C assembles and displays its user interface.

Any copies of sensitive organizational data stored by the DSS_C within a portion of the "peripheral" memory of a user's computing device (i.e. memory like a hard disk or USB that is accessible by the user of such a computing device) will be encrypted and cannot be decrypted by the user. Therefore, if the user makes any copies of such sensitive data 1314 such as to a CD 1313 from data stored by the DSS_C within a portion of a computing device's peripheral memory, those copies will also be encrypted and will not be intelligible to the user or to any third parties to whom they are given.

Loading a DSS_CP into a User's Browser

FIGS. 14A-D illustrate some of the methods by which a DSS client program (i.e. "DSS_CP") can be loaded on to a user's computing device to enable that user (or some other user(s)) to interact with the private DSS system (such as its servers and/or storage devices).

Figure 14A:
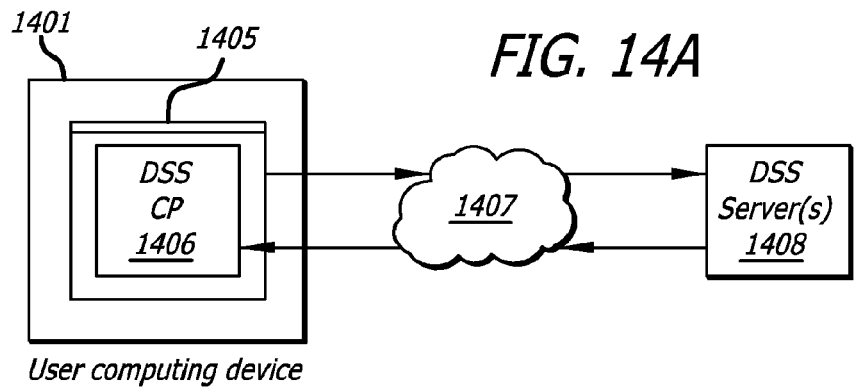
FIGS. 14A-D illustrate methods by which a DSS client program can be loaded on to a user's computing device.

FIG. 14A illustrates a method by which a DSS_CP can be imported into a user's browser. A browser program 1405 running on a user's computing device 1401 can connect to a DSS server 1408, through a data distribution network 1407 like the Internet, if the user enters the proper URL into the appropriate browser input. The DSS server can then return a DSS_CP to the connected browser, and the DSS_CP 1406 can operate within the browser 1405.

Loading a DSS_CP on to a User's Computing Device

Figure 14B:
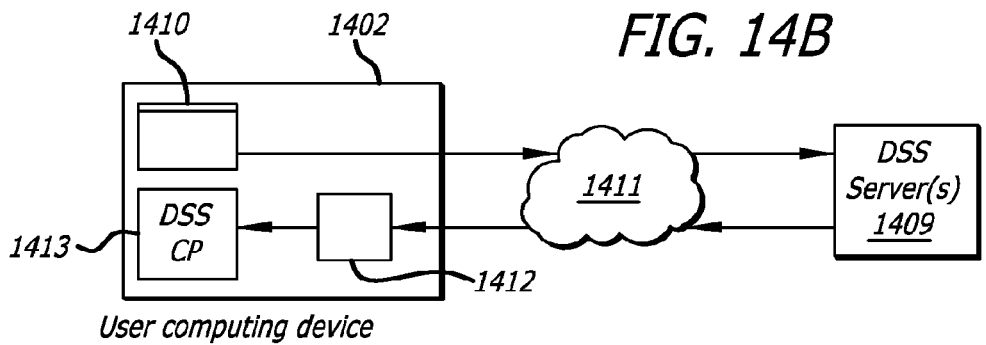

FIG. 14B illustrates a method by which a DSS_CP can be loaded directly on to a user's computing device 1402. A browser program 1410 running on a user's computing device 1402 can connect to a DSS server 1409, through a data distribution network 1411 like the Internet, if the user enters the proper URL into the appropriate browser input. The DSS server can then return an installer program, or a link to such an installer program, which the user can choose to download. After the installer 1412 is downloaded, the user can execute that installer resulting in the installation of a "stand-alone" DSS_CP 1413 capable of running without a browser on the user's computing device 1402. Such a stand-alone DSS_CP can likely incorporate more functionality than a typical browser-based program and it can likely facilitate a user's utilization of a private DSS which used an uncommon, or poorly supported, data distribution network, e.g., a proprietary network based on the transmission and distribution of data through the electrical wiring of a house or other building.

Installation of DSS_CP from a Data-Storage Module

Figure 14C:
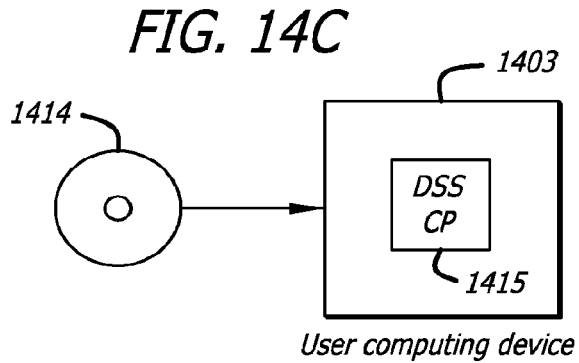

FIG. 14C illustrates a method by which a DSS_CP can be loaded on to a user's computing device 1403 from a copy of the program, or an installer of the program, stored on a data-storage module 1414. A user can purchase, or otherwise obtain, a data storage module (e.g. a CD or DVD) 1414. Upon connecting, or inserting, this data storage module in to the user's computing device 1403, the user's computing device can read the data stored within that module. And, that data can include a DSS_CP 1415, or the installation program for such a DSS_CP, which the user can then add to the suite of programs available within his computing device.

Pre-Installing a DSS_CP on a User's Computing Device

Figure 14D:
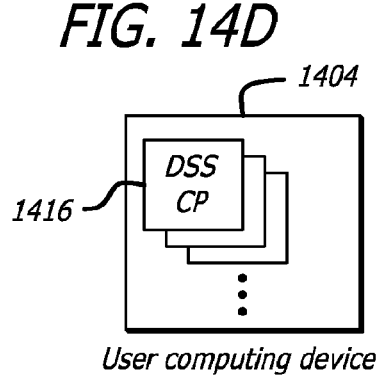

FIG. 14D illustrates how a DSS_CP can be pre-installed on a user's computing device at the time that the user purchases or otherwise obtains that device. A user can purchase a computing device 1404 which contains a DSS_CP 1416 pre-installed within the computing device.

DSS Implemented by a "Centralized" System Architecture

Figure 15A:
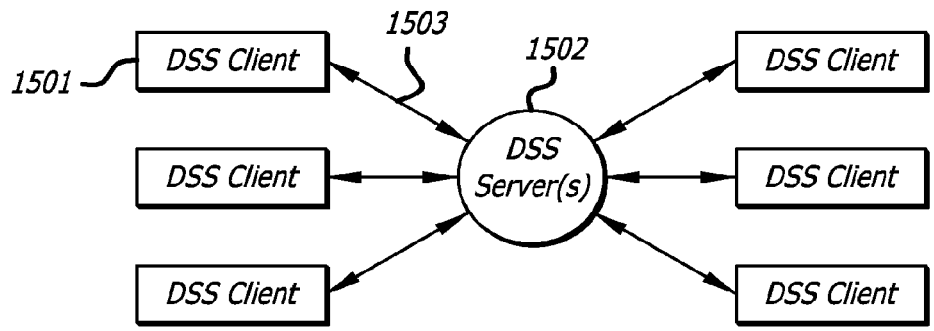
FIGS. 15A-C illustrate alternate architectures for a private DSS of this disclosure.

FIG. 15A illustrates a private DSS implemented by means of a "centralized" system architecture. In this type of architecture, a single DSS server 1502, or an interconnected (e.g. by means of a LAN) collection (cluster) of DSS servers 1502, processes, stores and transmits encrypted user data. And individual DSS client programs 1501 ("DSS_CP's") communicate directly with the centralized DSS server 1502 and typically do not communicate directly with other DSS_CP's. Communication between the centralized DSS server 1502 and the individual DSS_CP's 1501 occurs through a common data distribution network 1503, such as through the Internet.

DSS Implemented by a "Peer-to-Peer" System Architecture

Figure 15B:
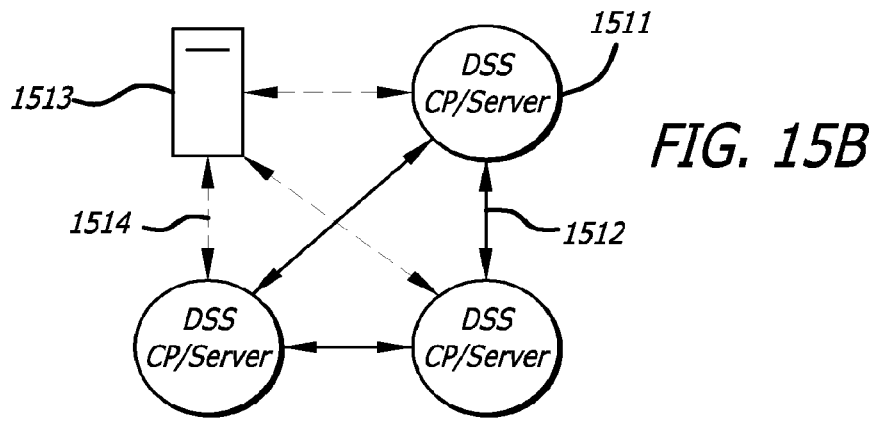

FIG. 15B illustrates a private DSS implemented by means of a "peer-to-peer" system architecture. In this type of architecture, each DSS client program 1511 ("DSS_CP/Server") is also a DSS server and the collection of these DSS_CP/Servers are connected to each other 1512. The processing, storage and transmission of encrypted user data is handled by the same collection of computing devices which host the DSS_CP/Server's used by the users to interact with and manipulate their user data, and the user data of their contacts. This architecture has advantages over centralized architectures in that the loss of any individual computing device (and its hosted DSS_CP/Server) does not stop the DSS from functioning (although it may result in the loss of some user data).

In this peer-to-peer alternative system architecture it would be likely that an individual user's computing device would be the primary location for the storage of that user's encrypted data. However, it is also likely that in this architecture encrypted user data would also be stored by the computing devices of one or more of that user's contacts, thereby providing some redundancy of storage and thereby helping to ensure that the user's data is always available within the DSS (even when one or more individual computing devices storing that data are offline).

In this peer-to-peer alternative system architecture it is likely beneficial to have at least one server 1513 dedicated to providing software updates and to providing a centralized connection point from which individual user computing devices can learn of the locations of other "peers" within the data distribution network to which they may directly connect 1514 in order to join the DSS network.

DSS Implemented by a "Distributed" System Architecture

Figure 15C:
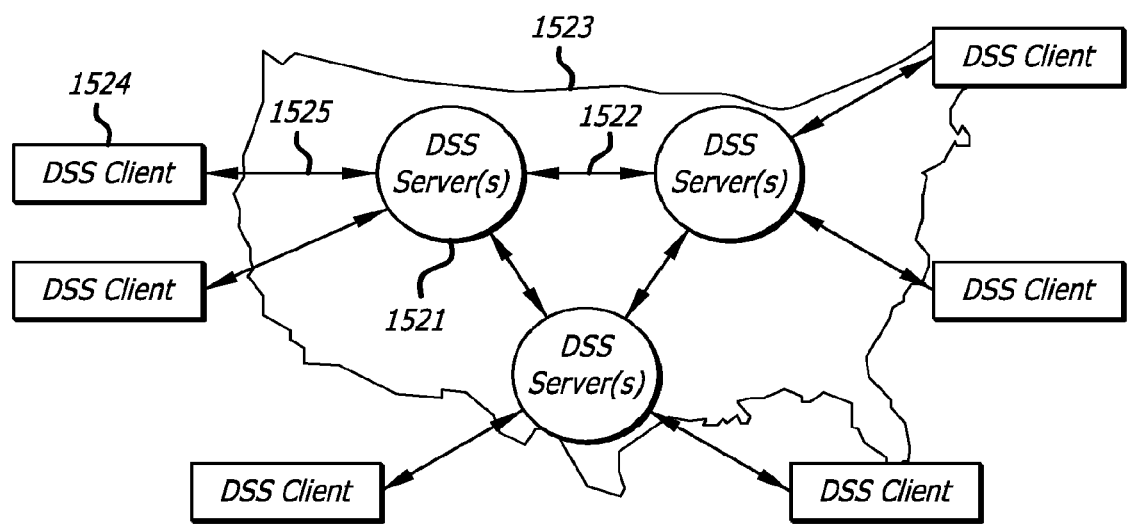

FIG. 15C illustrates a private DSS implemented by means of a "distributed" system architecture. In this type of architecture, multiple DSS servers 1521, connected to one another by means of the same data distribution network 1522, 1525 that connects the DSS clients ("DSS_C's") to those DSS servers and which transmits encrypted user data. Such a distributed network of DSS servers can be separated by large distances (e.g. across the United States 1523), or the servers can be in relatively close proximity to one another. Typically, in this scenario, individual user DSS_CP's will initially connect to a single DSS server and then be redirected to connect with the DSS server which is geographically closest to that user.

The system architectures illustrated in FIGS. 15A-15C are examples of the many possible system architectures which would be capable of serving as a foundation upon which a private DSS of this disclosure can be implemented. The scope herein includes all possible system architectures and variations of implementation which are capable of hosting and realizing a DSS of the types disclosed herein.

Restoration or Resetting of a Forgotten Password

Figure 16:
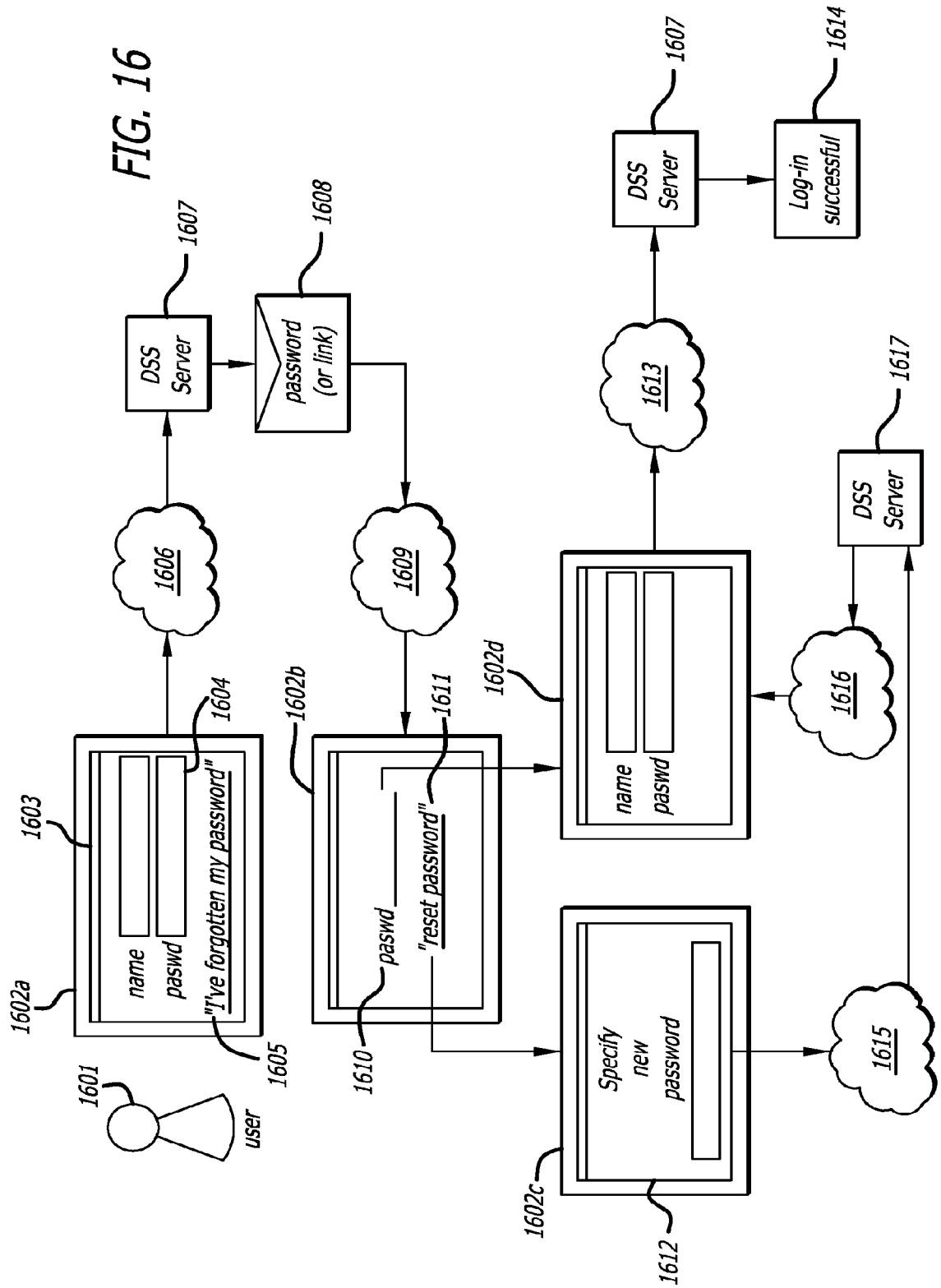
FIG. 16 illustrates a method by which a DSS can restore to a user that user's password should the user lose and/or forget his password.

FIG. 16 illustrates a couple of possible methods by which a forgotten (or lost) login password (i.e. a forgotten password and not a forgotten encryption key) can be restored to a user. A user 1601 attempts to log in to a private DSS of the type herein and discovers that he has forgotten the password required to complete the logging-in process and is therefore unable to fill in the appropriate password in the appropriate input field 1604 of the login screen within his browser 1603. So, the user instead clicks on a link labeled, for example, "I've forgotten my password" 1605.

Clicking link 1605 results in the log-in program running in the user's browser 1603, sending a message to the DSS server 1607. In response to this message, the DSS server 1607 sends an email 1608 containing the password, and/or a link which will allow the user to reset his password, to the email address associated with the DSS user account associated with the specified username.

When the user receives and reads the email, he will find his password 1610 which will allow him to return to the log-in screen 1603 and complete the logging-in process 1614. The user might also, or alternately, find a link 1611 in the email. Upon clicking the link, the user will be directed to a web page 1612 allowing the user to specify a new password for his DSS account. After specifying a new password, the web page 1612 will transmit that new password to the DSS server 1607 via the data distribution network 1613. The DSS server may then redirect the user to the login page 1603 again, at which time the user can utilize the newly-specified password to gain access to his account 1614.

Similar methods to these may be used to restore a user's forgotten login username, e.g. by the user specifying the email address used by the system to send him notifications, and by the DSS subsequently sending a reminder or other helpful email to that email address.

Figure 17A:
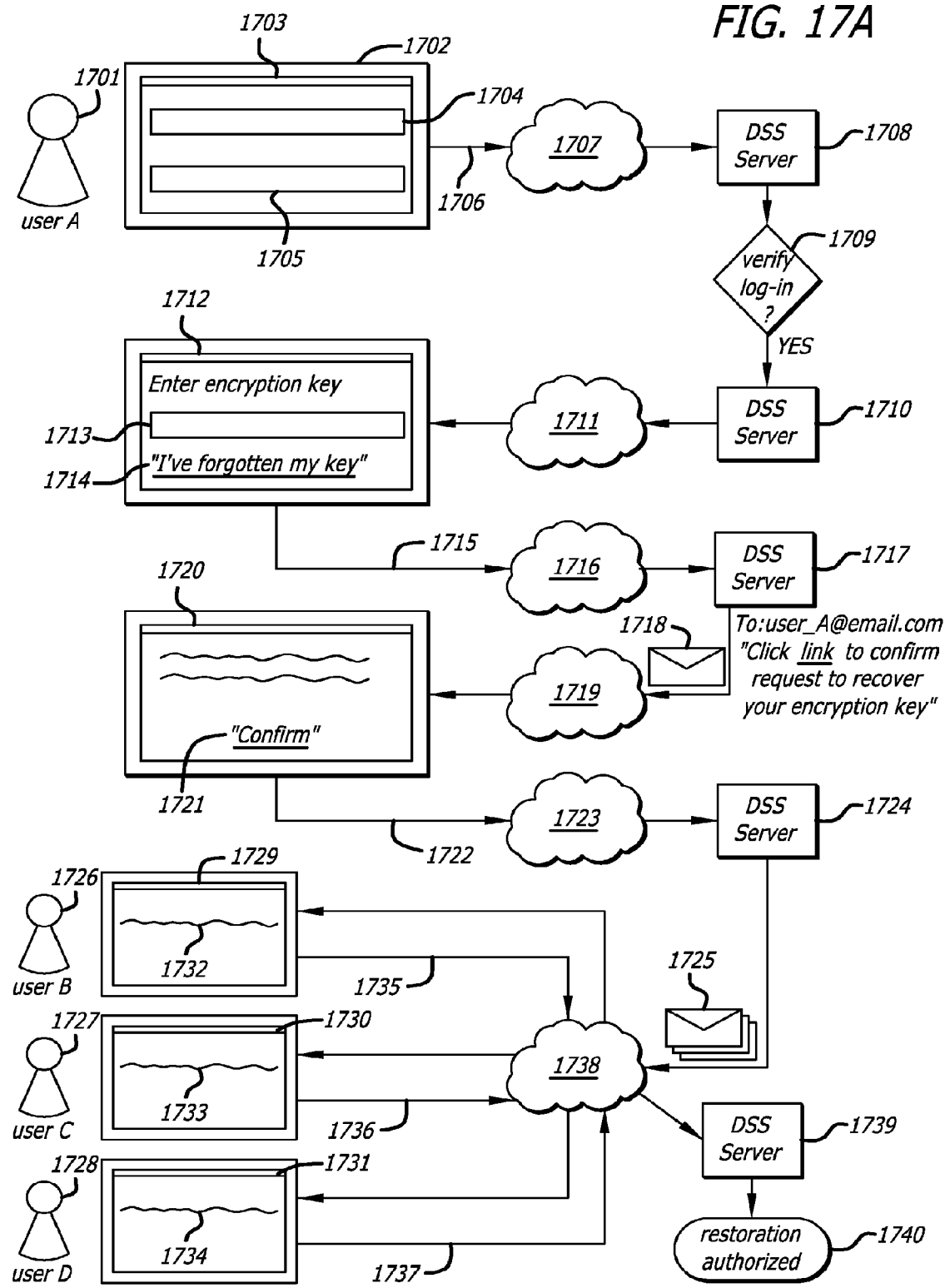
FIGS. 17A-B illustrate a method by which the user of a private DSS can recover a lost or forgotten encryption key and/or decryption key.

Verification by DSS that Restoration of a User's Forgotten Encryption Key is Authorized and Appropriate FIG. 17A illustrates how a private DSS of a type herein can verify that it is appropriate to restore a user's forgotten encryption key to him.

Figure 17B:
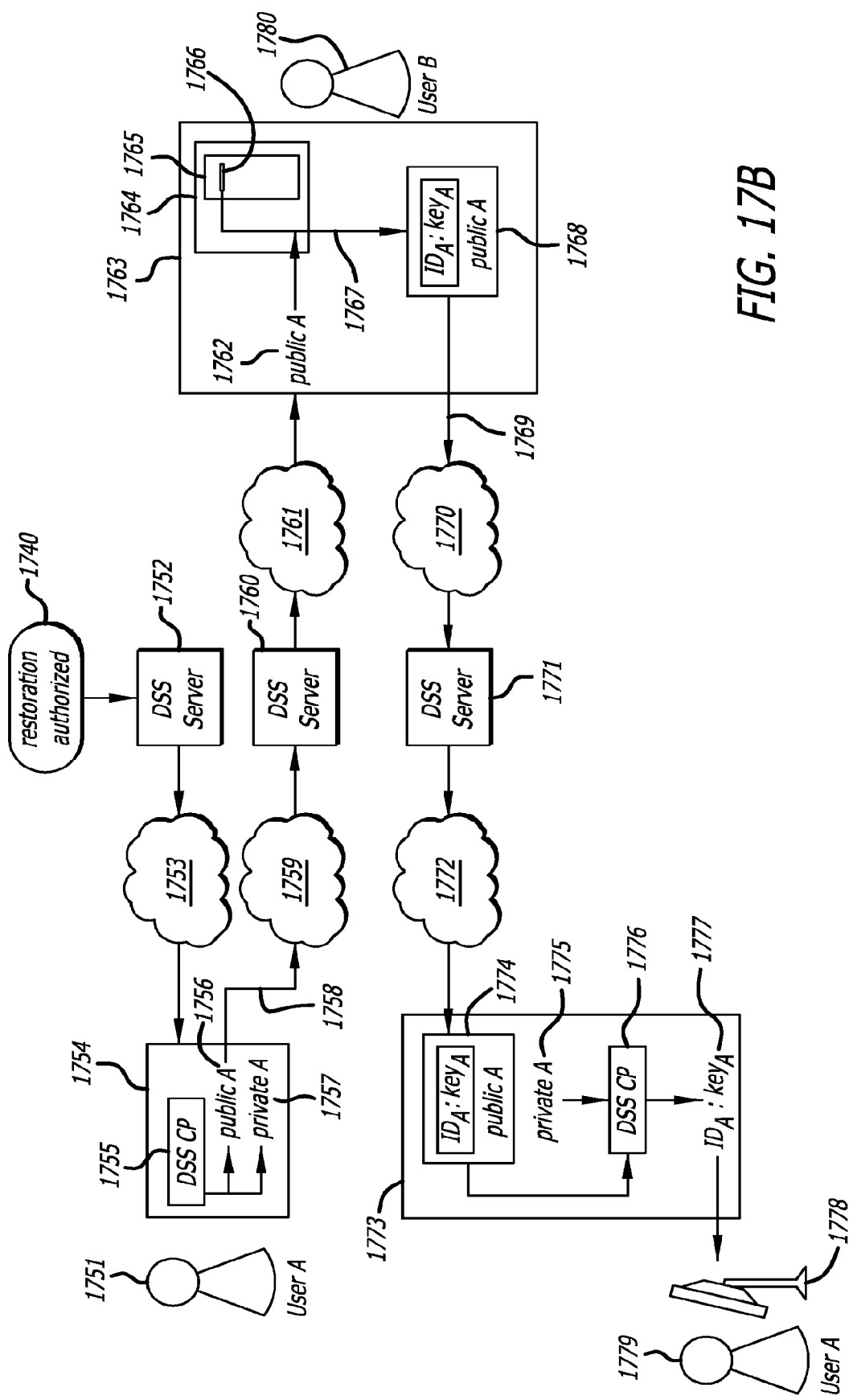

In an embodiment in which a user's encryption and decryption keys were different, the method illustrated in FIG. 17A and FIG. 17B would be modified to include the restoration of both keys.

If a user, "User A" 1701, logs in to a private DSS herein by entering his username into the appropriate input field 1704 on the home page of the DSS, as it is displayed on a browser 1703 operating on his computing device 1702, and by entering his password into the appropriate input field 1705, then the login information is sent 1706 to the DSS server 1708 via a data distribution network 1707, e.g. the Internet. The DSS server then verifies 1709 the submitted username and password with respect to its internal account information. If the login information is successfully verified 1710, then the DSS server 1710 returns a DSS client program ("DSS_CP") to the browser 1712 running in the user's computing device. The DSS_CP will offer an input field 1713 into which the user can enter his encryption key. However, if User A has forgotten his encryption key, then he may click on a link 1714 also offered by the DSS_CP (such as a link labeled "I've forgotten my encryption key") which will trigger a "key restoration" process.

Upon clicking on the "forgotten key" link 1714 of the DSS_CP, the DSS_CP sends 1715 a corresponding message to the DSS server 1717. In response to this message, the DSS server 1717 sends an email 1718 to the email address associated with the account to which User A has logged in. When User A views this email in his browser 1720 he will find a link 1721 on which he can click to confirm that his request to restore his encryption key is genuine (i.e. presumably only the authentic user will have access to the email address specified by the authentic user at the time of the account's creation). Upon clicking on that link 1721, the DSS_CP running in the user's browser 1720 notifies 1722 the DSS server 1724.

At this point, the DSS server 1724 further verifies the request by sending one or more (the exact number can be an optional design consideration) emails 1725 which ask the registered "contacts" of User A to verify the appropriateness and legitimacy of User A's request to have his encryption key restored. Perhaps one or more of these users will call User A on the phone to verify that he has in fact forgotten his encryption key and that the attempted restoration is legitimate. The one or more contacts 1726, 1727, 1728 will receive and view within their browsers, e.g. 1729, the emails. Each email can include a link 1732, 1733, 1734, respectively, on which the user may click to verify the authenticity and appropriateness of User A's restoration request.

Upon each user's assent, a corresponding message 1735, 1736, 1737, respectively, is returned to the DSS server 1739 via a data distribution network 1738, and, if the requisite number of affirmative responses is received and/or no refusals are received, then the restoration request will be approved 1740 within the logic of the DSS server 1739.

Restoration by a DSS of a Forgotten Encryption Key to a User

FIG. 17B shows that after a "key restoration request" has been approved 1740, the DSS server 1752 instructs the DSS_CP 1755 of User A 1751 to generate a complementary pair of a public encryption key 1756 and a private decryption key 1757. The DSS_CP then transmits 1758 the public encryption key ("public A") 1756 to the DSS server 1760 which then sends it to the DSS_CP 1764 of User B 1780 along with instructions telling User B's DSS_CP 1764 to return an encrypted copy of User A's encryption key ("key A") (along with its corresponding key identifier ("$ID_A$")). User B's DSS_CP retrieves User A's encryption key 1766 from User B's key locker 1765. User B's DSS_CP 1764 then encrypts 1767 User A's encryption key using the public encryption key 1762 received from the DSS server 1760. User B's DSS_CP 1764 then transmits 1769 the encrypted key of User A 1768 back to the DSS server 1771, which will pass the encrypted key on to the DSS_CP 1776 of User A 1779.

Upon receipt of the encrypted key 1774, the DSS_CP 1776 of User A uses the private decryption key 1775 ("private A") that was created to be the complement of the public encryption key 1756 to decrypt the encrypted key resulting in the restoration of the copy of the original encryption key 1777 ("key A") stored in the key locker of User B. User A's DSS_CP then informs User A 1779 of the value of this key 1777, such as by displaying its value 1778 to User A.

Some of the Types of Data Partitions that a DSS can Provide to a User

Figure 18:
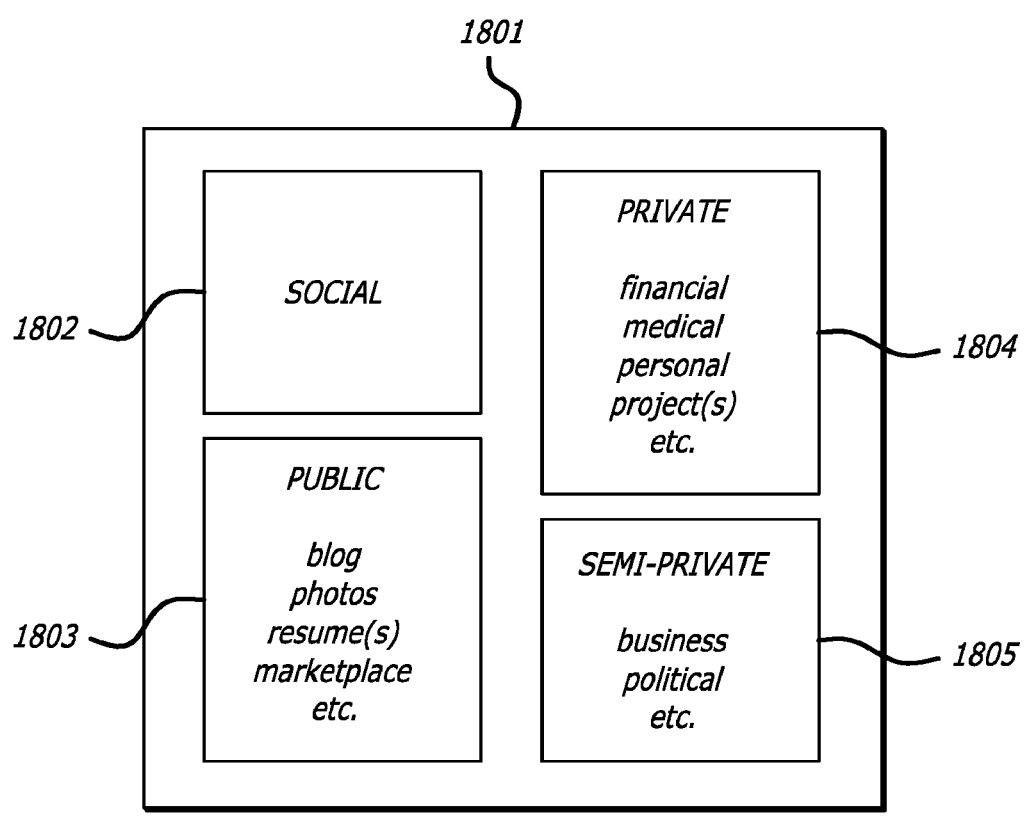
FIG. 18 illustrates some of the types of data partitions that a DSS can provide to a user.

FIG. 18 illustrates some of the types of data partitions 1801 which a private DSS, of the type disclosed herein, might make available to its users. The scope herein, however, includes all manners of partitions which one skilled in the art can conceive of and implement within a DSS such as a traditional "online social network" partition and corresponding functionality 1802. It can provide its users with a "private" compartment 1804 in which a user can store data that is not intended for viewing by any other user of the system. It can provide its users with a "semi-private" compartment 1805 in which a user can share some information less discriminately than within the social network compartment, but with greater limitations to its availability than that available within a completely public forum. It can also provide its users with a "public" forum 1803 in which all data is intended for unrestricted access to all users of the system, and perhaps to persons, parties and/or agencies outside of the system (e.g. through inclusion of links within public search engines). User data stored within and/or transmitted with respect to a user's "public" forum would not need to be obfuscated since there is no expressed or implicit desire to limit its distribution. All "non-public" forums and/or partitions would be associated with the storage, transmission and/or manipulation by the DSS would be obfuscated except within the corresponding clients.

Each of these compartments and/or partitions can have distinct sub-compartments, each of which can offer the user the ability to specify unique parameters to control, restrict or limit access, and/or to control, restrict or limit the types of processing of a user's data by the user's contacts which the user will permit, such as saving decrypted digital copies to a local hard drive, printing, etc.

Sharing User Content with a Subset of a User's Total Set of "Contacts"

Figure 19:
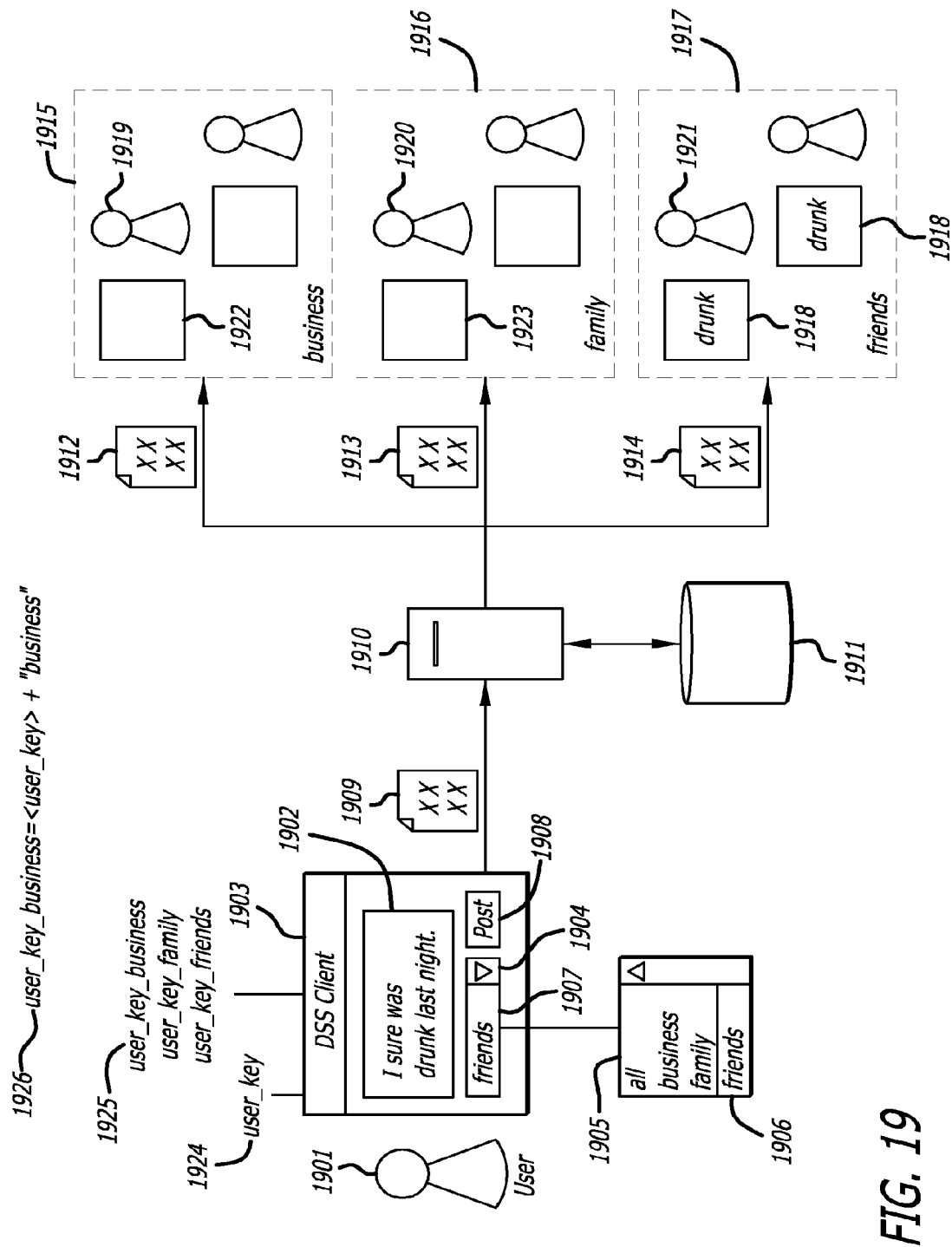
FIG. 19 illustrates the sharing of a newly-created piece of user content with a subset of that user's total set of contacts.

FIG. 19 illustrates the sharing of a newly-created user comment with a subset of the "friends" and "contacts" of that user. This limited sharing can be accomplished by a number of methods or combination of methods, including those discussed below.

If a user 1901 of a private DSS herein creates a message 1902 with the DSS client program 1903 ("DSS_CP") operating on his computing device, he might desire to share that message with only a subset of his friends and contacts, and he might desire to avoid sharing that message with some other subset(s) of his friends and contacts. For example, if the message 1902 is of a personal nature and could be potentially embarrassing to some subset(s) of his friends and/or contacts (such as to his business associates 1915, his boss 1919 or his family 1916) then he will benefit from the ability to limit the distribution of that message to the specific subset(s) of his friends who not interpret the message unfavorably (such as to his "buddies" 1917).

Thus, multiple encryption keys (as in 1925) can be used to provide a means for further ensuring that user content is only viewed by the subset(s) of a user's friends and/or contacts specified by the user. Also, a distinct encryption key for each distribution list defined by a user can be automatically created randomly or through the systematic modification of a base primary key, especially of the user's "primary" encryption key (as in 1926 where "<user_key>" represents the user's primary encryption key).

A user can define a distribution list in order to specify a subset of friends, or even (not shown in figure) an individual friend, with which any particular piece of user content should be shared (as in 1904, 1905, 1906, 1907). A user can define a distribution list in order to limit distribution with respect to the category or topic to which any particular piece of user content pertains. Distribution lists can be defined and utilized in order to affect any other type of limited distribution scheme which would serve the needs of a user. While an unencrypted distribution list can be associated with any packet of encrypted data and can instruct the servers of a private DSS as to which user contacts should receive a copy of the data packet, the additional step of encrypting such a data packet with a key which is possessed only by the contacts which a user has included within the distribution list associated with the key, serves to render the user's specified desire for a limited distribution inviolable.

While a DSS_CP can create a new encryption key, for use in conjunction with a user's newly-defined distribution list, through the generation of a random key value, or by allowing a user to specify the new key value, there is some advantage to creating new encryption keys for a user by systematically modifying the "primary" encryption key of the user (i.e. the key which the user enters in to the DSS_CP when it initializes). If one or more of a user's distribution-list-specific encryption keys are lost somehow, they can be reconstructed if the manner of their generation can be duplicated using only a knowledge of the user's primary encryption key and perhaps the label assigned by the user to the associated distribution list. Also, if a user has defined one or more distribution lists, and his DSS_CP has created one or more distribution-list-specific encryption keys by means of repeatable synthesis of the user's primary encryption key and other distribution-list-specific factors, such as the assigned name of the list, then, in the event that the user should lose or forget his primary encryption key, it may be that only a distribution-list-specific encryption key can be retrieved from the key locker(s) of the user's contact(s), i.e. perhaps the user has elected to only share data with his contacts via specific distribution lists and has therefore not shared his primary encryption key with any of his contacts. In this case, the retrieval of randomly-generated distribution-list-specific encryption keys would be of little value in discovering and/or retrieving the user's lost primary encryption key. However, the retrieval of even a single distribution-list-specific encryption key created through the systematic modification of the user's primary encryption key should be helpful to the user in remembering his primary encryption key.

It is possible, and maybe even preferable, to generate subset-specific encryption keys for a user by augmenting the user's primary encryption key, e.g. "horse feathers," with the name of the subset, e.g. "family," for which a unique encryption key is required, e.g. "horse feathers family." This can eliminate the need for the user to remember, and enter, each subset-specific encryption key and/or decryption key every time he initializes the DSS_CP in an embodiment in which such distribution-list-specific keys are not to be included with a user's key locker. The creation and use of such "derivative" encryption keys can be performed dynamically and still provides substantial protection of the user's content.

In addition to associating unique encryption keys with each distribution list of a user, a DSS_CP can also support the association of unique encryption keys with the archives, forums, and other data partitions which an embodiment may afford a user of a private DSS herein.

The distribution of any element of user content can be limited by:

1. Specifying a subset of contacts 1906 that the user earlier defined within the DSS. For example, the DSS_CP may have earlier facilitated the user's specification of two other contacts (1921 and his neighbor) of the user as members of the subset and/or distribution list defined by the user as "friends." Thus, if the user generates some new content, through creation or uploading, and then specifies that it is to be shared with his "friends," the user can rely upon the DSS server to limit the content's distribution to only the users included within that distribution list.

Pursuant to an embodiment, the DSS_CP allows the user to select any set of distribution lists (i.e. subsets of contacts). And, the associated content is then distributed to the union of the selected subsets. For example user 1901 might specify that his newly-created message 1902 should be distributed to the subsets "family" and "friends." In that case, the DSS server would forward the message to the users in 1916 and 1917.

In another embodiment, or in one option available to users, the user can use only one encryption key 1924 for all of his content. In this scenario, the user relies upon the correct functioning of the DSS server in limiting the distribution of and access to, his content in accordance with the subsets and/or distribution lists of users specified by him at the time of the contents posting (or sharing).

2. However, a user 1901 may find added assurance and peace-of-mind if he is able to make it impossible for any piece of his user content to be accessed and viewed by anyone other than the intended subset of recipients. A private DSS herein may allow a user to directly or indirectly define multiple encryption keys 1925 with which his content can be encrypted instead of just a single key 1924. The user can then determine which of his multiple keys to share with any particular contact within the DSS. Each key can be used to define, in absolute terms, a particular distribution list denoting distribution to a particular subset of contacts (such as "business," "family" and/or "friends") and/or content types (such as "PG," "political," "X-rated" and/or "cooking").

Then, when a user defines his subsets, such as subsets of particular user types and/or as subsets of particular content types, he can associate a unique key with each subset. When he subsequently agrees to share content with another user of the DSS, he can also specify which subset(s) of content he will share with that user. The DSS_CP will then exchange the appropriate set of decryption keys with that user during the "friending" process.

For example, User "A" might elect to share data with User "B" and this process might be mediated by the DSS_CP's of each user in the manner stated earlier. However, if User A elects to utilize distinct encryption keys for each subset of friends and/or data types, then User A may specify that his DSS_CP is to include User B within his "family" and "friends" subsets. The DSS_CP will then share the unique decryption keys of User A associated with his "family" and "friends" subsets with User B during the "key exchange" process. This will enable User B to decrypt and experience any of the data which User A posts to either of those two distribution lists. In the future, any content for which User A specifies as the appropriate distribution the subsets "family" and/or "friends" will be directed to User B by the DSS server. In this case, the content of User A will be encrypted with the unique encryption key corresponding to the "family" subset. A separate encrypted version of that content will also be encrypted using the unique encryption key corresponding to the "friends" subset. If a specified recipient, such as User B, is a member of two or more of the subsets which User A specifies as the target audience for his content, the DSS server may improve the efficiency of the content sharing process by forwarding only one of the two encrypted versions of the content to User B. User B's DSS_CP will then be able to decrypt that content using the corresponding decryption key for whichever of the two varieties of encrypted data packet are sent to him because both decryption keys will already be stored within his key locker.

A reason that the association of a unique encryption key with each subset of a user's friends is potentially desirable is that should the DSS server suffer some kind of fault and function improperly it may inadvertently share a piece of "sensitive" user content 1902 with the wrong subset of friends (such as with the "business" group 1915 when only the "friends" group 1917 was specified by the user). By encrypting the sensitive message 1902 with an encryption key unique to each subset of friends, and the corresponding distribution list, 1925, two levels of protection are provided to the user. First, the message has been encrypted only with the key(s) appropriate to the subset(s) of contacts with which the user wants to share the "sensitive" content. For example, user 1901 might specify that message 1902 is only to be shared with his "friends" 1917 subset of contacts. In that case, the message 1902 will only be encrypted with the "user_key_friends" encryption key (i.e. within his full set of encryption keys 1925). Now, even if this "friends-encrypted" data is improperly distributed 1912, 1913, 1914 to all of the user's contacts, such as to his "business," "family" and "friends" subsets, only the intended group of recipients will possess, in their key lockers, the key required for its decryption.

Integration and Provision of "Premium Services" within a DSS

Figure 20:
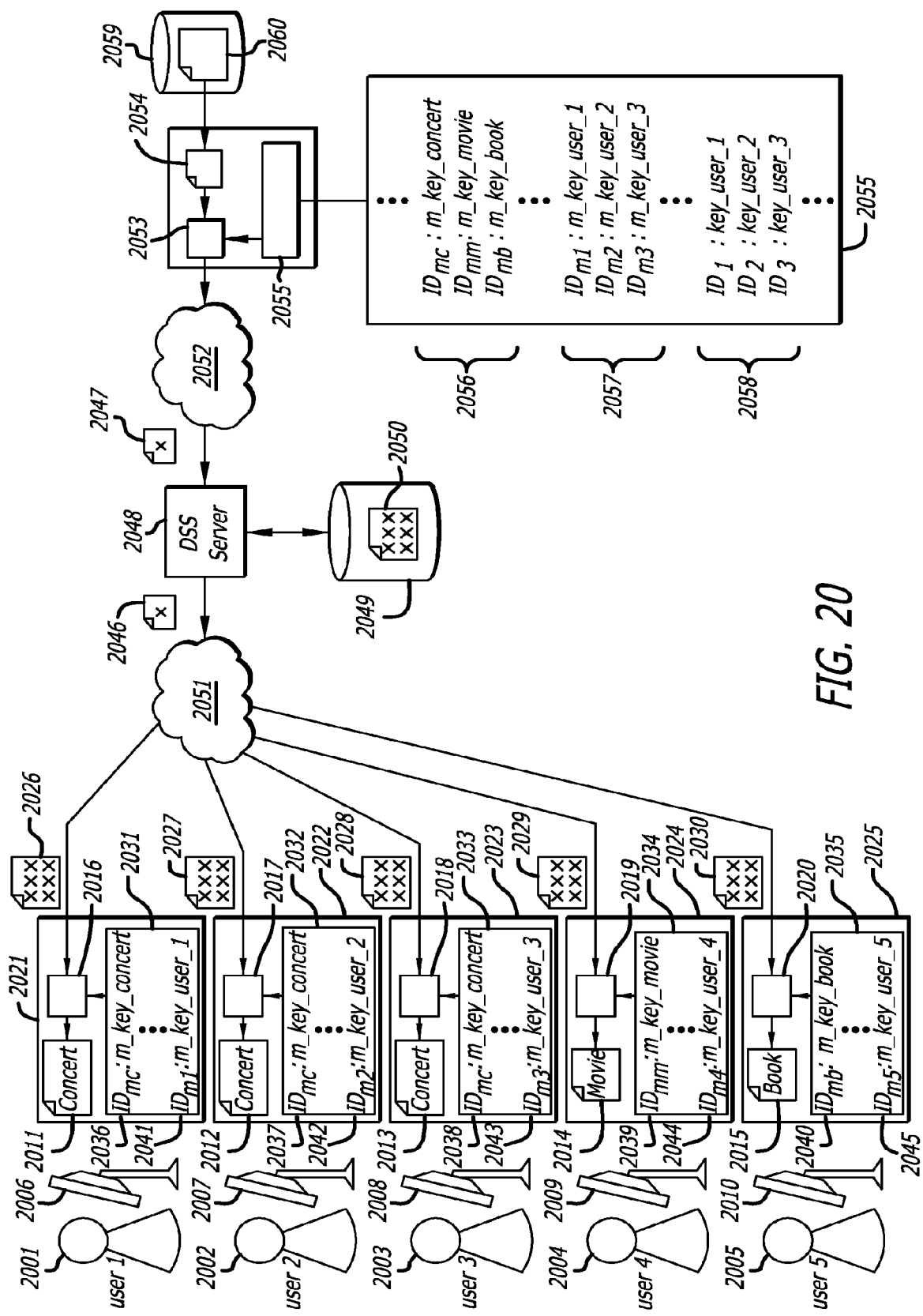
FIG. 20 illustrates the ability of vendors, merchants, and other providers of "premium" content to utilize the secure environment provided by a private DSS of the type disclosed herein to provide their services and/or products with a minimized risk of piracy or other abuse.

FIG. 20 illustrates one of many types of "premium services" that can be supported within a private DSS herein; in this case a "merchant" providing premium content such as "live concerts," "movies on demand," and digital books (and/or other digital documents such as magazines, newspapers and other media). The DSS client program 2053 ("DSS_CP") of the merchant is able to provide content, data and/or other forms of media (2060 and/or 2050) to users (e.g. to paid "subscribers"). A suitably encrypted version of a piece of content, data and/or media 2050 can be stored on the storage device(s) of the DSS server 2049 in the same or similar manner as that of the data of other non-merchant users. That encrypted content can then be accessed by users (i.e. by "contacts" of the merchant) on demand. User access to that content can also be controlled and/or regulated by the DSS_CP of the merchant through additional controls available to merchants and/or to the users of such a DSS.

The DSS client for a merchant can include the means to track and display which contacts have paid for, or otherwise been authorized to, receive specific elements of media, data and/or other products or services which the merchant is able to provide. It can include controls to specify not only the distribution list associated with any element of media, or collection of media, but also the day and time at which it is to be made available to the merchant's contacts, the length of time during which it is to remain available to contacts, etc. It can include controls to specify the path(s) at which data elements are to be found and from which they may be copied or streamed to the DSS servers and to the merchant's contacts. It can include controls allowing the merchant to specify the limits of a contact's ability to experience and/or process any particular collection of media, e.g. whether or not a contact may make a copy of the decrypted media elements, how many times a user may experience (e.g. play) an element of media (e.g. a movie), the resolution at which an element of media is to be displayed, and so forth.

A merchant's content, products and/or media 2060 may also be stored on the merchant's proprietary storage device(s) 2059 (and/or on some other storage device, and/or dynamically-generated content that is not stored and/or some other source of data and/or some combination of these). When some element of that content 2060 is to be transmitted to one or more users, e.g. 2001, 2002, 2003, 2004, 2005, then the merchant's DSS_CP 2053 loads the data (and/or some portion thereof) 2054 and encrypts it with an encryption module in the DSS_CP 2053 using a key which has been, or will be, shared with the contact(s) who are to receive and experience it, the key(s) being drawn from its key locker 2055.

A suitable key can also be generated dynamically by the merchant and then shared with a user, e.g. in the same, or by a similar, manner as that described earlier. Such a dynamically-generated key can be shared with a user by the same method which is used to share keys between pairs of users within the DSS, only in this case it is likely (although not required) that the merchant would share the new key with the user, but the user would not need to share his key with the merchant since the merchant would likely already have that key. A user and/or a merchant might choose to generate keys 2056 that relate to the type of content to be shared, and then presumably select with which users to share each content-specific type of key. A user and/or a merchant can choose to generate keys 2057 specific to a particular other user of the DSS, and/or group(s) of other users of the DSS, and then select which content to direct to those users and/or groups of users.

A merchant, like any other user of the DSS, would also likely possess a copy of the decryption key of every user who had elected to share data with, and/or purchase content from, the merchant. The possession of this user-specific decryption key enables the merchant to verify the authenticity of any payment information, or other potentially-sensitive messages, received from users because the encryption of the data packet sent by the user, and received by the merchant, can be unambiguously authenticated as having originated through the application of the user's proprietary encryption key as a result of its subsequent successful decryption by the merchant using the user's proprietary decryption key.

However, merchants may elect to share dynamically-generated keys with users, and to "re-acquire" the key of each user, so as to operate a dynamic type of service in which commercial relationships between the merchant and users exist for limited periods of time, after which the merchant discards both his own possibly user-specific dynamic key and the keys of any customers (i.e. contacts). This model can be efficient with respect to providing paid access to "live" events which are streamed to users and for which payment is made by users to the merchant on an event-by-event basis.

An individual user (e.g. 2005) might possess multiple keys 2035 from another user (and especially from a merchant). One key 2040 might be specific to the receipt of one type of media, or even of one particular piece of content and/or product, from the merchant. While another key 2045 might be specific to the merchant's relationship with that particular user, and might be used by the merchant to encrypt any content which is not appropriately covered by another key, or if the merchant does not have product and/or product-type keys.

A private DSS herein provides a data distribution network in which merchant content, data, digital services, media, etc. can be provided to users with a minimized risk of piracy and/or other forms of infringement. The secure nature, methods and mechanisms of the DSS also facilitate the secure and authenticated provision of user payments to merchants.

If content is meant to be timely and if the merchant desires that it not be viewed and/or otherwise utilized after the lapse of a specific period of time, then the merchant can revoke the key(s) required for its decryption. If the content is meant to remain available to contacts for an extended period of time (or forever), then a merchant can refrain from revoking the key required for its decryption, thus allowing a user constant, perpetual access. If a merchant intends to provide a user with an unencrypted, or "other" encrypted," version of a file, media element, etc. then the merchant can instruct the DSS server, via his DSS_CP, to allow the recipient user's DSS_CP to permit the user to download and/or save an unencrypted version of the data.

In other words, a number of unique features are included in the embodiment of FIG. 20 as discussed below.

1. Storage of multiple keys in a user's DSS client program (e.g. in his key locker) related to a single other user (possibly a virtual user and/or merchant) in order to allow that other user to differentiate the sharing of content with that user in a manner which does not rely solely upon the correct direction of content within the private DSS.

2. The provision of "premium" content, e.g. live events like concerts, pay-per-view content like movies, pay-per-download content like books, magazines, newspapers, etc. A private DSS may be used as a means to, and adapted to, facilitate a merchant's distribution and/or provision of "premium" content and/or services. For example, a merchant may use a private DSS as the means by which to distribute "pay-per-view" movies and other types of broadcasts to its customers. A psychologist may use a video chat capability within a private DSS to remotely provide psychological counseling to some of his clients. A merchant may share images and details of various products to potential customers within a private DSS, and then receive orders and payment information through that private DSS.

3. The optional storage of user content (especially the content sold and/or otherwise provided to users by a merchant) on the proprietary storage devices of the user and/or merchant governing the provision of that content.

4. The use of (perhaps automatically-generated) multiple encryption keys 2056 by a user (e.g. a merchant) wherein each key relates to a particular piece of content, event and/or product (e.g. <key>_product, <key>_product_type, etc.).

5. The use of (perhaps automatically-generated) multiple encryption keys 2057 by a user (e.g. a merchant) wherein each key is unique with respect to another contact (or group of contacts) with which the user will share content.

6. Not shown in FIG. 20 is that the DSS_CP can allow a user to specify that the recipient(s) can process any or all of the user's data in any number of ways. For example, a user can specify that contacts may download and/or save an unencrypted version of any particular piece of media and/or data. A user may also instruct his DSS_CP to always allow any particular contact and/or group(s) of contacts to download and/or save unencrypted versions of all data and/or data shared with those users. A user can specify that contacts may print any particular piece of media and/or data, or all of that user's media and/or data.

User's Multiple Personas within a DSS Network

Figure 21:
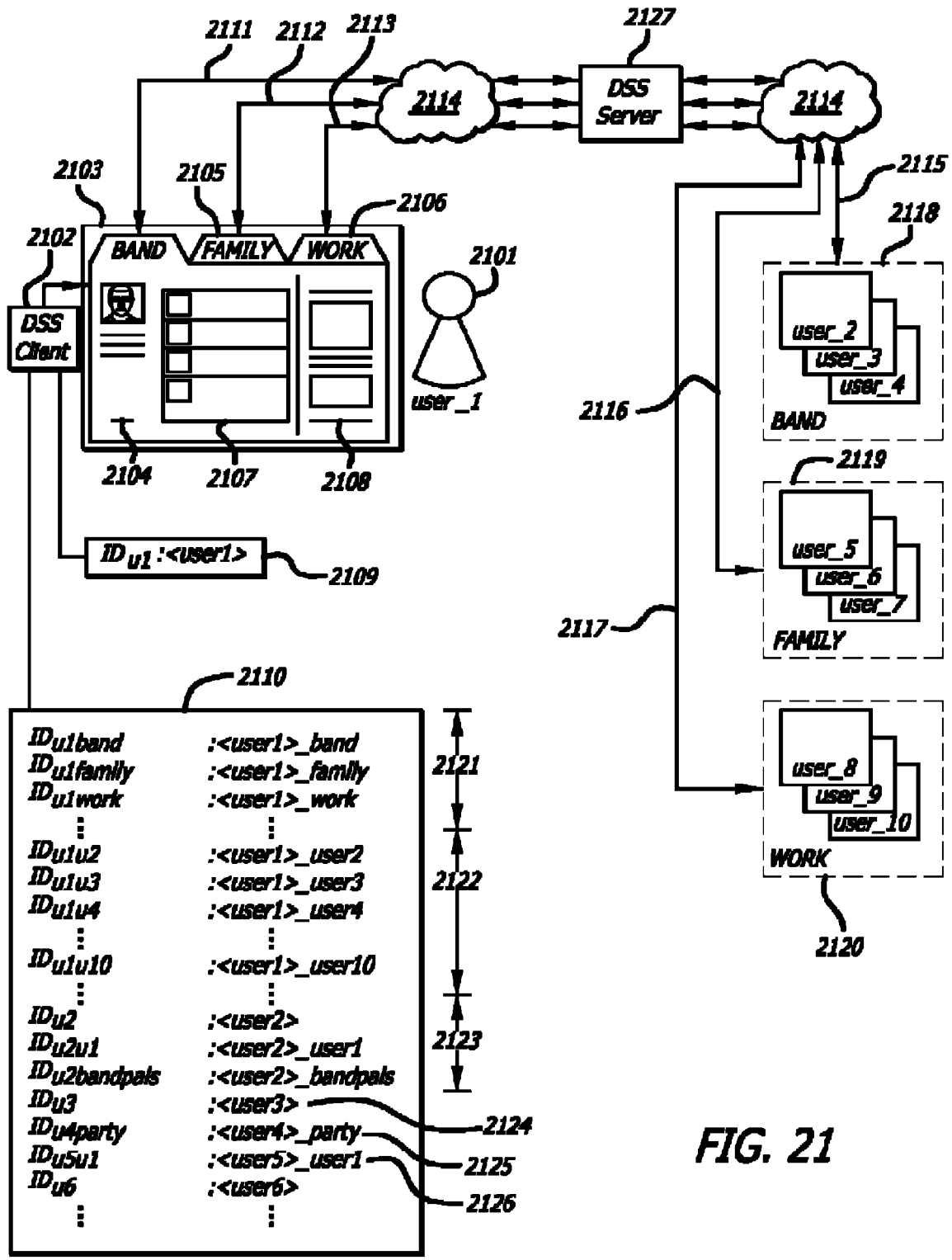
FIG. 21 illustrates the use of the private DSS server, in conjunction with unique encryption keys, to facilitate the creation and use of multiple online personas for a user.

FIG. 21 illustrates a manifestation of a user's 2101 multiple personas within a private DSS of a type disclosed herein. User_1 2101 has created three personas 2104, 2105, 2106 within his DSS client 2102. User_1 experiences his data, and that of his "contacts" within the DSS, on the user interface 2104 created on the display 2103 of his computing device (not shown). The user interface 2104 is generated by User_1's 2101 DSS client 2102.

User_1's DSS client 2102 has access to a number of encryption keys 2109, 2110. The DSS client stores the respective user's primary encryption key (i.e. "<user1>") of User_1 in memory 2109 after User_1 enters that key during the initialization of the DSS client 2101. The DSS client retrieves an encrypted copy of User_1's "key locker" from the DSS server 2127 and, after receiving it, uses User_1's primary encryption key to decrypt the key locker 2110 and gain access to a list of value pairs. The first value in each pair is the id of the encryption and/or decryption key (e.g. "user_1_band"). The second value in each pair is the key (e.g. "<user1>_band"). (An embodiment may also append the user's primary encryption key to the key locker to provide a uniform means of accessing and retrieving encryption and/or decryption keys.)

User_1 has separated his contacts within the DSS (i.e. those with whom he shares at least some information and/or data) into three groups: "band" 2118, "family" 2119 and "work" 2120. When he creates and/or uploads new data to his DSS client he has the option of sharing that data with all of his DSS contacts 2118, 2119, 2120, with one specific group of contacts (i.e. with "band" OR "family" OR "work"), or with any combination of those groups. User_1 can also elect to share that new data with the public (i.e. with all users of the DSS) and/or with any other individual contact (e.g. with User_2) or combination of individual contacts.

In order to specify who is to receive and be able to experience any particular packet of User_1's new data, User_1's DSS client allows him to specify the intended recipients (such as via a drop-down list). The encrypted packet of new data will then be directed by the DSS server 2127 to those recipients, and only those recipients, by means of a distribution list (or distribution list identifier) associated with the encrypted packet of new data. For many users, and many low-security programs, this may be sufficient security, in which case the new data will be encrypted with User_1's primary encryption key ("<user1>") and then transmitted to the DSS server for distribution to the specified set of contacts (assuming that all of the specified recipients possess a copy of the user's primary decryption key).

However, for some users and/or with respect to some sensitive contexts and/or with respect to the sharing of particularly sensitive data (e.g. of the government, law enforcement, business, etc.) it may be desirable to provide added safeguards to ensure that only the specified recipients of any particular packet of a user's data, or set of packets of a user's data, are able to experience that data. This type of added security can be achieved by implementing a private DSS able to provide users with a plurality of encryption keys. In this way, each contact "befriended" by the user (i.e. each contact with which the user agrees to share data) can be provided with one or more decryption keys, some, or all, of which relate to a particular distribution list (i.e. to a particular subset of the user's contacts).

For example, User_1 might provide User_2 (in group 2118) with a key specific to User_2 (see "user_1_user_2" in 2122), i.e. User_1 will only use that key when the intended recipient is User_2. User_1 might also provide User_2 with a key specific to the entire group of contacts in which User_1 has included User_2, e.g. a key specific to User_1's group called "band" 2118. And, User_1 might also provide User_2 with a copy of his primary decryption key so that User_2 is able to decrypt data which User_1 wishes to distribute to all of his DSS contacts.

The additional keys needed to provide a user with the ability to selectively encrypt data so that it can only be viewed by one or more specific contacts, and/or by one or more specific groups of contacts, can be generated by the DSS client automatically by using a user's primary encryption key as the basis for each additional key. This can be accomplished in a number of ways, including, for example, simply appending an index to the value of the primary encryption key, with the index being unique to a particular user with respect to that user's existing set of "variant" encryption keys, or, as shown in 2110 by appending the id or name of the user and/or group for which the key is being created (e.g. the key with the id: "user_1 band" (in 2121) is given the value: "<user1>_band" (i.e. the string "_band" is appended to whatever may be the value of the user's primary encryption key, i.e. "<user1>").

As User_1 interacts with the user interface 2104 created by his DSS client 2102 he can, as one option herein, select the group of contacts with which any data is to be shared.

A user might choose to specify subsets of his contacts on the basis of shared interests, e.g. "rock hounds," shared occupation (e.g. "work"), shared background (e.g. "high school buddies"), shared experiences (e.g. "survivors of an airplane crash"), shared conditions (e.g. "fellow divorced men") and so forth. A user using a private DSS tasked with facilitating access to other types of data, e.g. law enforcement, health records, business data, etc., might specify subsets of contacts on the basis of who needs access to the data encapsulated within a particular grouping. For instance, a user might specify groups like: "case 1993A," "Daniels, H. colonoscopy" and "Dow merger." The "user" to whom such an account within the DSS belongs may serve as a "gatekeeper" for the particular "groups" of data for which he is responsible. In other words, this type of user will be responsible for determining who is allowed to share data with any group, or set of groups; who is allowed to modify data within the group; what types of options are available to particular "contacts" of those groups, e.g. can they print decrypted data, can they save decrypted copies, can they upload data to the account, etc.

FIG. 21 shows that User_1 has been "friended" by other users of the private DSS. And, that those other users have provided him with varying degrees of access to their data. For instance, User_1's key locker 2110 indicates that User_2 has provided him with id:key pairs 2123 needed to decrypt data that User_2 directs to all of his contacts, e.g. "user_2: <user2>"; that he directs specifically to User_1, e.g. "user_2_user_1:<user2>_user_1"; and that he directs to his pals in the band, e.g. "user_2_bandpals:<user2>_bandpals". By contrast, User_1's key locker 2110 indicates that User_4 has only provided User_1 with an id:key pair 2125 that will be associated with data that User_4 directs to his group called "party" (i.e. the id:key pair is "user_4_party: <user4>_party"). Thus, while the DSS will still allow User_4 to send any data to User_1, that data will have to be encrypted with the key "<user4>_party". Thus, it could theoretically be experienced by any other member of the corresponding User_4 group should the DSS server 2127 inadvertently deliver it any other member(s) of that group.

Upon creating and/or uploading new data to his DSS client, the user interface 2104 illustrated in FIG. 21 can provide User_1 with a default distribution list (e.g. of other contacts and/or groups of contacts) based on which "persona" (i.e. in this case, based on which tab) has been selected by the user. For instance, if User_1 creates and/or uploads new data to his DSS client 2102 and if he has the "Band" tab of his user interface selected, then the DSS client can offer as the default distribution list for that new data User_1's group "band" which includes users 2, 3 and 4 at 2118. Despite such a default setting, User_1 would still be able to add to that setting, or to replace that setting with, an alternate group, combination of groups, individual contact, individually-specified group of contacts and/or any combination of these. He would also, pursuant to one embodiment, be able to specify distribution to the "public" in which case the data would be made available to all users of the DSS and would not be encrypted with User_1's encryption key (although it might still be encrypted with an encryption key obtained from the DSS server).

The user interface 2104 created by a user's DSS client can support the creation and definition of multiple personas for a user within the DSS. And, when a user selects a particular persona, within his DSS-client created and executed user interface, with which to interact, then he can see the comments, photos and other data, generated by him and distributed to that corresponding group of contacts, while optionally (and in a preferred embodiment, by default) exclusive of comments, photos, and other data, generated by him but distributed to other groups of contacts. He can also see, and, in one embodiment, only see, the comments, photos, and other data, generated by the contacts associated with that persona and shared by those contacts with him.

Each "persona" within a user's DSS-client generated user interface is similar to a separate account within the DSS and serves to isolate the data shared between the user and the other members of the persona.

A user's DSS-client generated user interface can also include additional "persona's" that can correspond to the viewing and distribution of data shared between the user and any unique subset(s) of contacts (including individual contacts) for which separate id:key pairs may exist, or not exist.

Fraudulent Access to the DSS

A user should be able to access and experience the data shared with him by his contacts if that user logs in to the DSS by accurately specifying his username and password. However, a person should not be able to access the account of a particular user if that person is not that particular user, even if that person possesses the username and password of the user (e.g. perhaps obtained fraudulently through the use of "keystroke logging" software on the actual user's computing device).

There are many safeguards that can be used to minimize the likelihood that a person can successfully masquerade as another despite being in possession of the user's actual username and password. These same safeguards will also minimize the likelihood that a fraudulent user will be able to access a user's account within the DSS by using a counterfeit DSS client. The fraudulent accessing of a user's account with a fraudulent DSS client could be particularly problematic as such a fraudulent DSS client, stripped of its normal internal safeguards and protocols, might make it possible for such a fraudulent user to print and/or save decrypted data shared with the real user by his contacts. The likelihood that such unauthorized access to the DSS via an authentic, or via a corrupted or fraudulent DSS client might succeed can be minimized by a number of methods, including, but not limited to:

(a) the recording within the DSS server of the IP address (es) authorized and/or confirmed by a user (e.g. via a link supplied to the actual user via the actual user's email) and requiring a user logging in to that user's account from a novel IP address to verify, by some external means (e.g. by clicking on a link received within an email sent to the user's email address), the acceptability the particular IP address from which a user is currently attempting to access the account of that user (i.e. presumably the hacker attempting to log in as the actual user using not only the fraudulently obtained log-in credentials of the user, but perhaps even a fraudulent DSS client, would attempt that hack from some other location than the one normally utilized by the actual user);

(b) by determining the signature of the browser being used by a user to log in to the DSS (e.g. the type and version of the browser, the collection of installed browser plugins and their respective versions, as well as any other unique tags, attributes and/or other characteristics of the browser), and alerting the user, and requiring his verification by some third-party means (such as by clicking on a link received in an email sent to the user's email address), that the connection with the variant and/or "unrecognized" (or possibly modified) browser is authorized;

(c) the determination of the geo-location of the IP address from which access is sought and a comparison of that geo-location with those geo-locations known, authorized and/or confirmed by the actual user;

(d) the automated metrication of biometric attributes of a user attempting to log in to the DSS being compared with those attributes known, authorized and/or confirmed by the actual user;

(e) by providing users with a "dongle" which must be connected to, and accessible from, the computing device of the user, and which will verify its unique identity, and thereby confirm the identity of the operator of the computing device to which it is attached, by returning a unique value to the DSS client in response to one of many possible randomly selected queries presented to the dongle by the DSS client and/or by providing the DSS client with a unique (e.g. encrypted with a unique key) value with respect to the time at which any inquiry is made, and then passing the query (or time) and response to the DSS server for verification—only allowing the user to log in if the query:response pair is correct with respect to the dongle known to be "assigned" to the actual user.

Another optional safeguard which may help to ensure the integrity of the log-in process is for a private DSS to require that the entire DSS client always be uploaded to a user's computing device, immediately following a successful log in, by means of an encrypted (e.g. an https) connection. And, if that uploaded DSS client is a randomly-selected variation of the DSS client program, drawn from a large set of potential variations. And, if each variant DSS client were to possess a set of unique validation capabilities. Then the DSS server can periodically test the validity of the DSS client, especially prior to satisfying requests for the data of the user and/or his contacts. Through the use of many equally-functional, and yet independently verifiable and distinguishable variations of the client, the DSS server can ensure that it was likely transmitting data to a genuine client program which would therefore fully and accurately implement the print, save and other restrictions associated with any particular collection of data shared with the user by a contact of the user. Such a variant DSS client might require that any DSS session initiated through it have a maximum duration, after which the user would be required to reconnect to the DSS server and upload a new variant DSS client. This would reduce the opportunity for hackers to test the legitimate client program and thereafter modify their own fraudulent client program to simulate the legitimate client, thus permitting them to swap their own corrupt client for the legitimate one.

This last option is particularly attractive given the recognition than an actual, legitimate user of a DSS may attempt to access his own account with a fraudulent and/or modified DSS client so as to be able to circumvent some of the protections afforded by the DSS to the "owners" and/or authors of data who have agreed to share their data with the user seeking to evade those contact-imposed restrictions. For example, an employee using his company's private DSS may wish to circumvent data distribution (i.e. "read-only") restrictions on some data for the purpose of harming or embarrassing the company.

Additional Potential Attribute(s) for Encrypted Data Files

Some embodiments may allow the user the option of providing, manually or automatically, a short descriptive title for a collection of data. This "packet label" would then make it possible to use meaningful labels when generating a log of requests related to that file, requests related to viewing, printing, saving, etc., of that file. In the absence of such a descriptive label, the DSS server, in a primary embodiment, will generate a log in which individual data packets are referred to by their "packet IDs." These packet ID's can later be associated with their corresponding data packets, and viewed and/or experienced by the user who generated them, in the user's DSS client while the user reviews the log.

Figure 22:
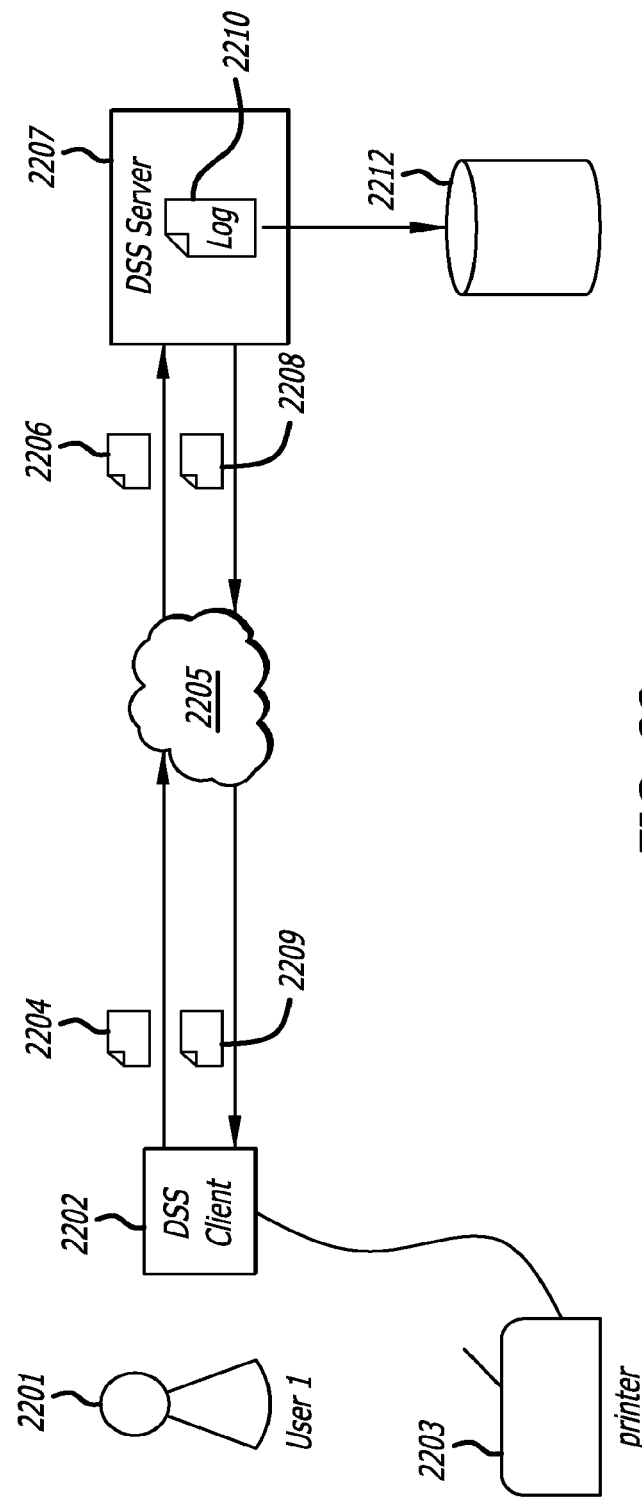
FIG. 22 illustrates a method by which the processing and/or requests for processing of a user's data can be automatically logged within a private DSS.

Implementation of Automated Logging of the Processing Associated with a User's Data FIG. 22 illustrates a method by which the processing and/or requests to process a user's data within a DSS can be automatically logged. Many other alternate logging strategies and methods are possible and will be evident to those skilled in the art.

FIG. 22 shows User1 2201 interacting with his DSS client 2202. User1 directly or indirectly requests that a particular packet of his own data, or a particular packet of data shared with him by another user of the DSS, be retrieved from the DSS server 2207 and/or its associated storage devices. User1's DSS client 2202 transmits a request 2204 and 2206 for the data packet to the DSS server 2207 via a data distribution network 2205 (such as the Internet). Upon receipt of the request, the DSS server 2207 retrieves the specified data packet, such as from its associated storage device(s) 2212, and returns the packet 2208, 2209 to User1's DSS client 2202 via the data distribution network 2205.

If the user who generated the requested data packet has opted to have the DSS server maintain a log of all processing associated with that packet (such as by the DSS server and/or by any other user's DSS client) then, in response to the request for the packet's retrieval, the DSS server can generate a log record that captures data about the packet's sharing (e.g. noting for example, the identity of the user who has directly, or indirectly, made the request and subsequently received the packet, the time and date of the request, and so forth). The DSS server 2207 then saves this log entry 2210 in its associated storage device(s) 2212 and subsequently (likely upon request by the user) provides that log entry (and any other log entries) to the user whose data has been manipulated and/or otherwise processed.

Because the DSS server stores and processes only encrypted user data, the log entries will refer to data packets by their identifiers and/or other attributes. If the user has opted to manually or automatically specify descriptive labels for some or all of his data packets, i.e. packet labels, that will remain unencrypted, even within the DSS server, then any such descriptive packet label(s) may also be included in such log entries, potentially facilitating their future examination and analysis by the user who generated the data.

In another example of the type of logging that might be generated within a private DSS to preserve a record of the types and occurrences of processing and/or manipulations to which some or all of a user's data packets are subjected is with respect to a user's request to print and/or save a decrypted version of some data packet(s).

If User1 (2201) in FIG. 22 were to instruct his DSS client 2202 to save and/or print (e.g. on a printer 2203 connected to User1's computing device) a particular collection of data presented within his DSS client's user interface, his DSS client 2202 would generate a record 2204 (i.e. a log entry) of the printing (or saving) of the data. The DSS client 2202 then transmits this record to the DSS server (2207) where it 2210 can be stored within the storage device(s) 2212 associated with the DSS server.

In a primary embodiment, such an option to print and/or save a decrypted rendering of a particular collection of data would only be offered to a user if the "permissions" attribute(s) associated with that data packet specified that such processing were authorized by the user who generated the data (and with whose key the data was encrypted).

Accordingly, FIG. 22 discloses, inter alia, a log file which notes the processing and/or manipulations of some or all of a user's data within a DSS which may be automatically generated.

III. Further Detailed Descriptions of Embodiments

The description provided below is only one of many different possible embodiments and/or implementations herein. Many options exist with respect to which features are implemented, and/or how they are implemented. The following description is provided as a general example of one possible embodiment and should in no way be regarded as limiting.

Encryption of User Data

In an embodiment, a private data-sharing network is implemented in a manner typical of DSS networks like Facebook and LinkedIn. However, most, if not all, data obtained from and/or generated by each user of the network is encrypted. And, the decryption keys needed to decrypt the user data are only possessed, or available to, the users of the DSS. The needed decryption keys are not available to the owners, and/or operators, of the DSS; they also are not stored in a plain and/or readable format on the computers, servers and/or programs of the DSS server.

The use of encryption, and/or any other method(s), to promote the security and privacy of users' data will never provide perfect security and privacy. Encryption can be broken and encrypted data can be decrypted, even without knowledge of the key(s) used to encrypt it. However, the use of encryption, and/or any other method(s) of data obscuration, to promote the security and privacy of users' data can increase the difficulty of extracting user data without the benefit of the proper decryption keys to the point that it becomes impractical.

In an embodiment, each user's encrypted data is encrypted on the user's computing device(s) using a symmetric-key encryption algorithm in conjunction with a user-defined encryption key, or keys. The encryption (and/or decryption) key(s) are never stored in, transmitted by, or accessible by, the computers, servers, and/or programs with which the DSS server is implemented. Only encrypted versions of user encryption keys and/or decryption keys are stored within the DSS server. And, those encrypted versions of user encryption keys are encrypted with keys not in the possession of, or accessible by, the computers, servers, and/or programs with which the DSS server is implemented.

In an embodiment, a user is required to enter his encryption key and/or decryption key (if they are not the same key) each time the DSS client operating on his computing device is initialized. And the decryption keys of a user's contacts and/or friends are stored within the DSS server, as another element of a user's data. However, like the other elements of a user's data, these decryption keys of contacts are encrypted with the user's encryption key prior to transmission to and storage by the DSS server.

In an embodiment, the DSS server never has possession of or access to the encryption keys of any of the users of that DSS.

Within most existing DSS's, a user's data is generally protected by two layers of security.

The first, a unique username, is utilized by most, if not all, DSS's in the prior art. A user-supplied username (i.e. a unique account identifier or name, often the user's primary email address) is a label with which a particular user's data is stored and differentiated from the data of other users. Such a username is usually associated with a user-supplied password. Thus, in order to gain access to a particular user's data, within a particular DSS, it is usually necessary for a user to enter both the specific username and the specific password associated with his account. A user's failure to supply the proper username and/or password will usually be sufficient for the DSS to deny the user access to the data associated with that particular user's account.

Sources of data are available which can, in certain circumstances, be used in lieu of a username to uniquely identify a particular user. For instance, sometimes it is possible to use a user's unique and invariant IP address to identify that user. In other instances, it is conceivable that a user's geographical location, as suggested by his IP address, in conjunction with an uncommonly configured browser can be sufficient to uniquely identify a particular user. And, within a limited context, such as a local network within a corporate setting, a user's identity can be uniquely associated with his computer's network name, or with some other type of corporate identifier. In any case, while a unique username would seem to be a necessary means of differentiating users with respect to most DSS's, they are by no means required. And the scope herein covers otherwise compatible implementations of DSS's which do not require the specification, or use, of a username.

Likewise, a password would seem to be an obvious and useful means of protecting access of a user's data stored within a DSS, and of limiting access to that data to only the user who created and/or uploaded that data. However, other alternative methods by which a DSS can distinguish one user from another with sufficient accuracy so as to eliminate the need for a user to enter a password in order to be granted access to his data and as would be apparent to those skilled in the art from this disclosure are within the scope herein. Examples of alternatives to passwords as a means of confirming personal identify when logging in to a DSS would include, but not be limited to, the use of biometric profiles capable of uniquely identifying and differentiating people, the use of "security dongles" which provide uniquely encrypted or seemingly random responses to a huge number of potential queries or inputs, e.g. the time of day.

An embodiment specifies the use of both a unique username and of an associated password, and the remainder of this specification will speak of these as though they are requirements. However, they are not required, and the scope includes implementations which utilize neither unique usernames nor passwords.

An additional layer of security, i.e. in addition to a password required for logging in to the DSS, can be provided. This additional layer of security results in the obscuration of the user data in such a way that only the user, and the user's friends, are able to access, view, edit and/or otherwise utilize, the user's data. And, most importantly, with a few exceptions which will be noted later, this additional layer of security renders the DSS server, as well as those who operate and/or own them, unable to access, view, edit and/or otherwise utilize the user's data.

This additional layer of security, and the resulting obscuration which it imparts to user data, requires some specialized knowledge, data, hardware, software or some other resource, whether tangible and/or intangible, in order to transform the obscured user data to a state wherein it may be accessed, viewed, edited, experienced and/or otherwise utilized.

While there are many means of accomplishing this additional layer of security, and the associated obscuration of user data, one embodiment utilizes symmetric-key encryption and an associated key which uniquely determines the resulting pattern of encryption and uniquely enables the efficient decryption of data so encrypted. Each user will define and be responsible for storing and/or remembering, a single, "primary" user encryption key. That primary user encryption key will be used by the user's DSS client to encrypt all of his data prior to its transmission to, storage within or processing by the DSS server.

In an embodiment, a user-specified encryption key (used for both encryption and decryption) is possessed by the user, as well as those contacts (e.g. friends) specified by the user. This key is neither possessed by, nor accessible by, the computers, servers and/or programs of the DSS server. And, most, if not all, of a user's data is encrypted with the user-supplied key whenever it is transmitted to, transmitted from or stored within the computers, servers and/or programs of the DSS server. A user's data only exists in a plain, unencrypted and recognizable form when on the computing devices of the user and his contacts.

Thus, a user's data cannot be sold or disclosed in any fashion to third-parties, by the owners and/or operators of a DSS. A user's data cannot be surreptitiously obtained from the computers, servers and/or programs of the DSS server by hackers who gain access to the collections of user data stored on those computers and servers.

Because of this additional layer of security, a user's data can only be obtained by unauthorized parties if those parties succeed in compromising the security of the user's computing device, or by learning, presumably by means of theft and/or trickery, the user's primary encryption key.

In an embodiment, a user possesses the set of primary user decryption keys required to decrypt the data of his friends. Possession of and/or access to this set of keys allows a user to decrypt, view, and otherwise interact with and experience his contacts' data.

In an embodiment, the primary user decryption keys of a user's contacts are stored in a data object referred to as a "key locker." A user's key locker is then stored within the DSS server, along with the rest of the user's data, following its encryption with the user's primary encryption key.

However, an additional layer of security can be provided for the primary user decryption keys of a user's contacts. The key locker is, like the rest of the user's data, encrypted with the user's primary encryption key. However, in one embodiment, it is also encrypted with a "system locker encryption key." This is an encryption key provided by, and known to, the DSS server, as well as the DSS client. However, this key is not available to the user. In an embodiment, a user-specific and user-unique system locker encryption key can be used to encrypt the key locker of each user.

The redundant encryption of the key locker with a system locker encryption key offers desirable security benefits.

If a user's key locker were only encrypted with that user's primary encryption key, then it would be possible for a user to gain access to the primary decryption keys of his contacts. However, since a user would already have access to the data of his contacts, this would seem to be of little value.

The encryption of a user's list of friend decryption keys, with only the primary encryption key of the user, has a potential drawback in that it makes possible the serial compromise of user decryption keys should an unauthorized party (i.e. a "hacker") gain access to one particular user's decryption key. It is conceivable that a malevolent party (i.e. a "hacker") might learn of a user's decryption key (perhaps along with his username and password) by compromising the security of the user's computer, by tricking the user into disclosing those values with a fake website (such as a "phishing attack"), by guessing one or more of these values by means of a brute-force attack, through the use of "keystroke-logging software", or by some other means.

Under these circumstances, it is conceivable that the hacker might use a stolen decryption key to decrypt a user's key locker and thereby gain access to the decryption keys of all of that user's contacts. The hacker might then use this set of decryption keys to decrypt additional key lockers, thereby gaining access to the decryption keys of still more users, and so on. This process of serial hacking might continue without limit, until, conceivably, every user's primary decryption key, and, by extension, the data of every user, might become known to such a hacker.

Through the redundant encryption of a user's key locker, using a system locker encryption key supplied by the DSS server, especially one unique to each user of the DSS, a user's key locker, and the list of contact decryption keys that it contains, will be better protected from discovery through illicit hacking activities. Even though a hacker might obtain a particular user's primary decryption key, he would not be able to expand his attack by using that single decryption key to obtain the key lockers, and the decryption keys therein, belonging to the violated user's contacts. Presumably, it would be more difficult for a hacker to obtain both a user's primary decryption key, and a second required system locker decryption key, provided directly by the computers, servers, and/or programs of the DSS server, than to obtain a user's primary decryption key alone.

Encryption keys can be any sequence of digital bits. They can be sequences of numbers, characters or just raw bits (e.g. control characters, or hex values). One composition of user-supplied encryption keys which can be used in a DSS is an alphanumeric character string which forms some sequence of words (e.g. a sentence) with meaning to the user, and thereby be more memorable to the user.

In an embodiment, almost all of a user's data is encrypted with the user's primary encryption key, and is, therefore, unavailable to the DSS server. In an embodiment, the exception to this is the user's email address. In an embodiment, the user's email address (and any other user data made accessible to the DSS server) is encrypted with a user-specific system encryption key. Thus, the privacy and security of a user's email address, and any other user data made accessible to the DSS server, is ensured, while allowing the DSS server to have access to that element (or those elements) of user data.

Allowing the DSS to "know" the email address of a user benefits the user. It allows the DSS server to communicate with the user by means of a third-party channel (e.g. a separate email service). This is useful in the event that the user forgets his username or password and cannot log in to the DSS.

(If a user forgets his primary encryption key and/or decryption key (if they are not the same key value), then that key can be recovered once logged in to the DSS client by means described elsewhere in this disclosure.)

In an embodiment, a user can opt to allow some data to remain unencrypted, or to be encrypted with a key known to the DSS server program. This may offer the user access to additional desirable benefits and/or functionalities. For instance, it might be useful for a user to opt to leave certain basic information about himself unencrypted, and perhaps even publicly available and searchable, in order to facilitate the ability of potential contacts and/or friends of the user to accurately identify him and offer him an invitation to share data with them, e.g. to be "friends," within the scope of the DSS.

In an embodiment, users can have the option of declaring that some pieces of their data should be made available within other contexts within the DSS, e.g. to "friends of friends," or for other purposes, such as to allow for self-targeted advertisements. Such availability outside of their set of friends would include that the externally accessible elements of data be unencrypted, or encrypted with a system encryption key, or in some other manner remain accessible to DSS clients which do not possess the primary decryption key of the user sharing the data.

In an embodiment, most user data will likely be encrypted with a user's primary encryption key and will therefore not be known to the DSS server. However, there may be advantages, as discussed above, to not hiding all user data from the DSS server. One method for providing the DSS server with access to the user data not encrypted with the user's primary encryption key is to simply not encrypt that data. Presumably any disclosure, whether intentional or not, of this subset of user data, which would be shared with the DSS server, would be relatively harmless to the user. In fact, the most likely and obvious reasons for allowing the DSS server to have access to such a subset of user data would involve its disclosure in some form or another, most likely to help users identify one another when searching for potential friends.

One way to make this "unencrypted" (that is, not encrypted with the respective primary user encryption key) subset of user data available to the DSS server is to encrypt it, just like the rest of the user data, but to do so with an encryption key known to the DSS server. In fact, this is what an embodiment does.

Nevertheless, even if the portion of user data to be shared with the DSS server is destined to be published, it may still make sense to protect that data while it is stored in, and/or transmitted by, the computers, servers, and/or programs of the DSS server.

The encryption (with a system-supplied, and therefore a system-known, encryption key) of any otherwise "unencrypted" subset of user data which any embodiment would make known to the DSS server would likely enhance the security of this data with regard to theft, or inadvertent disclosure, by providing for the storage of an encrypted version of the data within the computers, servers, and/or programs of the DSS server. It would also allow the DSS server to decrypt and utilize that information when needed to support any optional functionalities which the builders of the DSS might provide to their users in order to enhance the users' experience.

An example of one possible "optional functionality" would be if the creators of a DSS opted to not have DSS client's encrypt the intermediate data, and the final scores (if any), generated when users of the DSS play various games made available within the DSS. Such game-related data might be transmitted to the DSS server(s) in an unencrypted ("plain") format. However, the creators of the DSS might also opt to have the DSS server(s) encrypt such game data prior to its long-term storage, such as when a user has logged out of the game and/or of the DSS, thus providing a useful balance between computational demands and security, i.e. reducing by delaying the encryption of game-related and score-related data until the conclusion of a game will reduce the load on the microprocessors of the DSS servers, whereas encrypting that data when changes to the data have ceased (thus precluding the need for frequent re-encryptions of the modified data) will still increase the security of the data in the long term.

As another example, the creators of a DSS might opt to have their DSS server(s) create and update a "browsing history" for each user in the DSS. Such a history might facilitate a user's ability to return to one or more public accounts within the DSS which had been previously visited through some kind of "auto-complete." The creators of the DSS might opt to create and maintain this data in the DSS server(s) so as to permit a user to enjoy the benefits of such a history even when using multiple distinct DSS clients (e.g. on distinct computing devices). By having such a history maintained by the DSS server(s), the history remains synchronized even when the activity recorded therein is associated with input arising from a multitude of sources. After a user logs out of the DSS, the creators of the DSS may opt to have the DSS server(s) encrypt that user's history so as to better protect its security during the time that passes until the user logs in once again.

Presumably, the users will be explicitly informed if any portion of their data will be accessible to the DSS server in an unencrypted form, or following the encryption of that data with a system-supplied encryption key, and if users are so informed, presumably they will be informed as to which portions of data are affected. Presumably, the users will be allowed to opt in to any such reductions in the security of any portion of their data.

A DSS herein offers many benefits over other DSS implementations and designs.

By storing and transmitting encrypted user data, and by eschewing access to the original, unencrypted data, a DSS provider offers its users a superior level of privacy, both perceived and real. Users will benefit from the assurance that no one, other than the other users who they have designated as contacts and/or friends, will have access to their data. Users will also benefit from a reduced risk of disclosure of their data which could be used to steal their identities, to embarrass them to their employers, to make public their private opinions and activities, etc.

Unencrypted user data stored on a remote server of a DSS may be examined by the owners and/or employees of that DSS. It may also be sold to third parties by the DSS owner for use in targeting advertisements, providing fodder for search engines and so forth. Hackers may gain unauthorized access to such centrally-stored unencrypted user data and exploit that information to perpetrate scams and identity theft. Governments may gain authorized or unauthorized access to such centrally-stored unencrypted user data in order to search for citizens, or foreigners, who hold and/or promulgate political opinions contrary to those in official favor.

A private DSS implemented in accordance with the teachings will eliminate, or greatly impair, the ability of individuals, groups, governments, and others, not authorized by the creator and/or owner of any user data to access and/or exploit that data for their own benefit and/or to the detriment of the creator and/or owner of the data.

A private DSS herein transmits encrypted media and/or other data between users and the computers, servers, and/or programs of the DSS server. Thus, any message received by a user will have been generated by a contact or friend of that user, and explicitly sent to that user, or it will have been generated and sent to the user, presumably in an automated fashion, by the computers, servers and/or programs of the DSS server. Accordingly, the possibility of "spam," i.e. unwanted messages sent to a user by a source other than one of the user's approved contacts, is eliminated, or greatly reduced, in a DSS implemented in accordance with this disclosure.

Furthermore, the DSS client running on a user's computer can easily identify any user data, including messages, which are not encrypted with the user's primary encryption key, or with one of the encryption keys associated with the user's contacts. Thus, any such improperly encrypted user data, and/or any unencrypted user data, can be detected and discarded without exposing the user to the unauthorized content therein.

Because each user encryption key is associated with a specific user, or group of users, it is possible to verify the stated authorship of any message, or media, following decryption, by comparing the owner of the decryption key used to the purported ownership of the encrypted data. If the owner of the media, or author of the message, revealed in the decrypted message does not match the user, or group of users, associated with the encryption key used to decrypt the data, then the message, or media, can be regarded as fraudulent. Such fraudulent data can be hidden from a user, or the user can be alerted to it.

Further to the paragraph above, an attempt to decrypt a packet of data with an incorrect decryption key will not result in a restoration of the original data. Instead it will result in the creation of a meaningless packet of random values, equally senseless as the original encrypted data. In fact, an attempt to decrypt an unencrypted packet of data will also result in a meaningless packet of random values. Thus, if an encrypted data packet is received by User A's DSS client, purportedly having been encrypted and transmitted by User B, who is another user of the DSS with whom User A has agreed to share data, then User A's DSS client will retrieve User B's decryption key from User A's key locker and attempt to decrypt the data packet. If, however, the data packet is not encrypted or if it has not been encrypted with User B's encryption key, then the attempt by User A's DSS client to decrypt it using User B's key will fail. It will result in the creation of a meaningless packet of random values. In this manner, a DSS client can detect, and reject, any data packets which fail to be properly decrypted. It can do this because, within the private DSS disclosed herein, any legitimate data packet received by a DSS client will only be accurately decrypted, and will therefore only result in the revelation of meaningful and properly formatted data, when such a data packet has been encrypted by the method, and with the key, of the specified author of the data packet.

Because the computers, servers and/or programs of the DSS server only transmit and store encrypted user data, any success which a hacker might have in breaching the security of those computers, servers and/or programs of the DSS server will be fruitless, unless the hacker also obtains the decryption keys needed to decrypt the data. And, the primary user decryption keys only exist (in a usable, unencrypted format) in the DSS client programs, or in the minds, of the users.

While it would be possible for hackers to obtain decryption keys from certain users through hacking, phishing, guessing, etc., it is unlikely that hackers would be able to obtain many keys in this manner. Thus, the amount of user data which might be obtained from a penetration of the security protecting the computers, servers, and/or programs of the DSS server should be minimal, or at least minimized.

Furthermore, if double encryption is used to protect all user data (an alternate embodiment option explained elsewhere in this disclosure) then the security of the stored user data would be further increased.

The scope herein can include embodiments characterized by a range of data-obscuration and/or encryption options. Some embodiments may encrypt all user data with encryption keys, and/or methods, known only to the user, leaving only an account identifier (e.g. a username) and perhaps an associated account-specific, log-in password, unencrypted and/or otherwise accessible to the DSS server. Other embodiments may leave large sets of specific user data, and/or categories of user data, unencrypted and/or otherwise accessible to the DSS server.

How the DSS server of any particular embodiment processes the data of users will likely depend on the amount and types of information available to the DSS server regarding the particular elements of any particular user's data. The scope is intended to include all methods of sorting, storing, aggregating, characterizing and/or delivering individual elements of user data to the creators and/or owners of that data and/or the contacts of the data's creators and/or owners.

In an embodiment, certain information will be made available to the DSS server regarding the various individual elements of user data. For example, in an embodiment, the DSS server stores and has access to the following information regarding each individual packet of data owned, authored, uploaded and/or associated with any particular user: (a) An identifier which uniquely identifies and distinguishes each data packet within the computers, servers and/or programs of the DSS server. (b) The media or data type, or category, of each data packet, e.g. original text, a comment on other media, photo, video, link, etc. (c) The relationship of each packet of data to any other packet(s) of data (if any), such as a comment related to some other piece of media. (d) The date and time at which each data packet, and/or the associated media stored therein, was created, uploaded, modified, etc.

If an embodiment makes the above types of information about each piece of user media known to the DSS server, then the DSS server can process the data of any particular user, along with the data of that user's contacts, in an efficient manner which will minimize redundancy and/or wasted transmission bandwidth. The present disclosure also includes all such prioritizations, architectures and/or methods of optimizing, facilitating or otherwise improving, the segregation, sorting, bundling, and other types of processing, designed to facilitate the efficient transmission of only those elements of user data appropriate to the context of a user's DSS client state, and appropriate to the intentions and desires of the user controlling it. Examples of the kinds of optimizations which might be achieved when the above types of media attributes are stored in or with, and/or are otherwise accessible to, the DSS server include:

(A) Differentiating the user data which is relevant to the current context of a user's DSS client from that which would be irrelevant, and therefore wasteful of the bandwidth and time required to transmit it from the DSS server to the user's computing device(s). For instance, the DSS server might transmit to a user's DSS client only the types of media appropriate to the page, screen or state of the user interface being prepared for viewing by the user, e.g. text comments and notifications. As another example, the DSS server might transmit to a user's DSS client only the media belonging to a particular contact if the context would be specific to media from that contact.

(B) Prioritizing the order in which the "context-appropriate" user data is transmitted and/or displayed by the DSS client. For instance, media with more recent creation dates would likely be deemed more relevant, and therefore of higher priority, than older media. In other instances, older media might be deemed of high relevance if a recent comment about that media has been associated with it.

The above examples are not exhaustive, and the scope is intended to include all other methods of optimizing the selection and delivery to a user of relevant user data stored by the DSS server.

In an embodiment, additional metadata would also be generated by the DSS, and stored locally on a user's computer by the DSS client, and/or stored within the DSS server. This metadata would be designed to provide the DSS with hints as to which other encrypted media elements are likely to be most relevant to a user's DSS client, with respect to any particular state of that DSS client. Some, or all, of such user data metadata might be encrypted and hidden from the DSS server if it would be deemed likely to contain user-related data, or if it might provide a risk to the security and/or privacy of user data.

Metadata may include such things as: which mode of a multi-modal user interface (UI) was last selected by the user; the maximum age of the user data which the user wishes to see included in the collections of data presented to the user by the DSS client's UI; which elements of user data the user has specified to be hidden; for which presentation template(s) (or "skin(s)") has the user expressed a preference; etc.

The generation and storage of such general and/or context-specific user data metadata can be particularly useful for embodiments in which only a minimal amount of information about the attributes of individual user data media elements is made available to the DSS server. When only a minimal amount of metadata, if any, is available to the DSS server to assist it in characterizing, sorting and prioritizing user data prior to its transmission to a DSS client, then metadata (especially metadata containing information related to relevance and priority of the media specified within the user data) would likely greatly improve the efficiency of future retrievals and/or transmissions of user data in response to requests by DSS clients.

Because a private DSS implemented in accordance with the teachings should never have access to the decryption keys, or equivalent knowledge, mechanisms, and/or other tangible and/or intangible means of access, used by users to obscure their data, the exchange of unencrypted user decryption keys will best not occur within or through the DSS server. However, embodiments which ignore this advice are nonetheless included within the scope of this disclosure.

For example, a private DSS whose implementation is consistent with the present disclosure may permit, or require, users to exchange their decryption keys outside of the system. For example, the DSS may suggest to its users that they consider exchanging their decryption keys via email, or by phone or chat. Upon receipt of another user's decryption key by such a means, a user might then be required to enter that decryption key into his DSS client manually, after which the DSS client might then add the key to the user's key locker, encrypt the modified key locker, and then transmit the encrypted key locker to the DSS server(s) in order to replace the earlier version.

Pursuant to an embodiment herein and with reference to FIG. 8 discussed above, the following protocol can be followed to facilitate the exchange of decryption keys between users who elect to share access to their data.

Contacts interacting and sharing data within the private DSS exchange their decryption keys by means of their respective DSS clients. One user's DSS client, i.e. the DSS client of the user initiating the data-sharing relationship ("User A"), generates a complementary pair of public-key encryption keys. One of these keys is called the "public encryption key," or, in this case, "public-key-A." The other is called the "private decryption key," or, in this case, "private-key-A."

Public-key-A (the public encryption key) is the key which anyone can use to encrypt data prior to its transmission to User A. However, the public encryption key does not provide sufficient information to decrypt any data that has been encrypted with it. Public key encryption algorithms are "asymmetrical." That is, one key (the "public" key) is used to encrypt data, but is virtually useless for the purpose of decrypting that encrypted data. And, the other key (the "private" key) is required to decrypt the data that has been encrypted with the public key.

Since User A's DSS client remains the only possessor of private-key-A (the private decryption key that it has generated), only User A's DSS client can decrypt anything which has been encrypted with the public encryption key issued by User A's DSS client.

The DSS client of User A sends to the DSS client of the other user ("User B") public-key-A, the public encryption key that it has generated, along with an invitation to become contacts (or friends). This transmission of the invitation and public-key-A is made via the DSS server.

Upon acceptance of this invitation to become friends and to share their data, the DSS client of User B encrypts User B's decryption key using public-key-A. User B, like User A, now generates a pair of public-key-cryptography keys: a public encryption key, "public-key-B," and a private decryption key ("private-key-B"). User B will remain the sole possessor of private-key-B which is required to decrypt anything encrypted with public-key-B.

User B's DSS client then returns to User A's DSS client, the notice that User A's offer of friendship has been accepted by User B, as well as User B's decryption key encrypted with public-key-A, and public-key-B. This transmission is made via the DSS server.

Even though the encrypted version of User B's decryption key is passed from User B's DSS client to User A's DSS client by means of the DSS server, the DSS server cannot decrypt, nor access, nor view, nor otherwise make use of, this encrypted version of User B's decryption key. The DSS server could well still be in possession of the public encryption key which User A's DSS client generated (public-key-A) and which was used by User B's DSS client to encrypt User B's primary decryption key. However, public-key-A can only be used to encrypt data; it cannot be used to decrypt data.

Upon receipt of the encrypted version of User B's decryption key, User A's DSS client uses private-key-A, i.e. the private decryption key that it had earlier generated, to decrypt that encrypted decryption key of User B. User A's DSS client is now in possession of User B's decryption key. And, User A's DSS client can now decrypt any of User B's encrypted data which the DSS server sends to it. User A's DSS client then adds User B's decryption key to User A's key locker (decrypting the key locker first, using the system locker decryption key, if necessary) and encrypts that key locker again with User A's primary encryption key and the system locker encryption key assigned to User A by the DSS server. User A's DSS client then transmits this encrypted copy of User A's augmented key locker to the DSS server for storage along with the rest of User A's encrypted data.

Of course, the friendship is not complete until User B is likewise made able to decrypt and view the encrypted data of User A. In order to supply User B's DSS client with a copy of User A's decryption key, User A's DSS client encrypts User A's decryption key with, public-key-B, the public encryption key that User B's DSS client transmitted to User A's DSS client along with the acceptance of friendship notification and User B's encrypted decryption key. User A's DSS client then transmits this encrypted version of User A's decryption key to User B's DSS client by way of the DSS server.

Even though the encrypted version of User A's decryption key is passed from User A's DSS client to User B's DSS client by means of the DSS server, the DSS server cannot decrypt, or access, or view, or otherwise make use of, this encrypted version of User A's decryption key. The DSS server could well still be in possession of the public encryption key which User B's DSS client generated (public-key-B) and which was used by User A's DSS client to encrypt User A's decryption key. However, public-key-B can only be used to encrypt data; it cannot be used to decrypt data.

Upon receipt of the encrypted version of User A's decryption key, User B's DSS client uses private-key-B, the private decryption key that it had earlier generated along with public-key-B, to decrypt the encrypted version of User A's decryption key. User B's DSS client is now in possession of User A's decryption key. And, User B's DSS client can now decrypt any of User A's encrypted data which the DSS server sends to it.

User B's DSS client then adds User A's decryption key to User B's key locker (decrypting the key locker first, using the system locker encryption key, if necessary) and encrypts that key locker again with User B's primary encryption key and the system locker encryption key assigned to User B by the DSS server. User B's DSS client then transmits this encrypted copy of User B's augmented key locker to the DSS server for storage along with the rest of User B's encrypted data.

Obviously, there can be variations in the steps by which this key exchange is executed; for example, the invitation can be issued and accepted before the DSS client of the user initiating the friendship generates, and sends to the other user, the public encryption key. The description provided above is only exemplary.

In an embodiment, the primary decryption keys of a user's contacts are stored in that user's "key locker." The key locker is a data storage object which contains, for each of a user's contacts, a username and/or key identifier along with a corresponding decryption key.

This key locker is stored in the DSS server, along with the rest of a user's encrypted data. However, the key locker can be encrypted twice. Once, using the primary user encryption key of the respective user, and then using a DSS-generated and/or supplied "system locker encryption key," unique to each respective user of the DSS.

In an embodiment, when the key locker is uploaded into the DSS client, it is decrypted with the user's primary decryption key, just like the rest of the encrypted user data sent from the DSS server to the DSS client. However, this leaves the key locker encrypted with the system locker encryption key. In this embodiment, the DSS client will only fully decrypt a user's key locker, that is, decrypt it with the corresponding system locker encryption key, when a decryption key is needed to decrypt some user data. The rest of the time, the key locker will remain encrypted with the system locker encryption key.

The reason for adding this optional additional layer of encryption to the key locker, a layer for which the user does not possess nor have access to the decryption key needed for decryption, is to improve the security of the decryption keys of a user's contacts. The unauthorized, or otherwise inappropriate, access by anyone other than a user to that user's decryption key can threaten the security of the DSS. In particular, if a user had access to the decryption keys of his contacts, then a hacker, or even that user, if he were malevolent and/or unethical, could gain access to the key lockers of his contacts.

In other words, if key lockers were only encrypted with the primary encryption keys of their respective users, then the compromise of even one user decryption key could lead to the compromise of the key lockers of each contact of the user whose decryption key was compromised. The additional user decryption keys gained from those compromised contact key lockers could then enable a hacker to get access to still more key lockers, and therefore to more user decryption keys, and therefore to more key lockers, and so on, and so on.

By preventing users from possessing or gaining knowledge of the actual decryption keys used by their contacts the security of the DSS is greatly increased.

Even though, in an embodiment, the DSS server does not store an unencrypted copy of a user's decryption key, and therefore cannot replace a lost or forgotten key, each of a user's contacts and/or friends possesses a copy of the user's primary encryption key (which in an embodiment is the same as the user's decryption key).

In an embodiment, if a user has "N" contacts, then there are at least "N" copies of his encryption/decryption key which the DSS server can request be forwarded to the user to replace a lost or forgotten key, with the forwarding of the key likely being accomplished using the same method(s) by which decryption keys are exchanged when two users agree to share data.

Since, in an embodiment, the only authentication/access data not stored in the DSS server is a user's primary encryption/decryption key, the ability to recover a lost or forgotten encryption key ensures that, as with most online services, the only risk to a user's access of his online account is his ability to preserve (e.g. to remember) his username and log-in password. Thus, there is no additional risk to a user's access as a result of the storage of only an encrypted version of most, or all, of his data.

In an embodiment, each user must specify an email address with which he can receive email messages. Thus, in an embodiment, as with many online web sites, if a user forgets his username and/or password, and is thus unable to access his account, but is able to remember the email address which he registered with the DSS server, then his username and/or log-in password (or its equivalent, e.g. a link to reset a password) can be sent to the user at the email address specified.

There may be circumstances in which an account becomes inaccessible for reasons other than the respective user forgetting his username and/or password. For instance, if a user dies, his family may wish to access his account and thus become able to recover, or at least be able to look for, copies of photos, documents, or other data, which are unique, perhaps due to a loss of the corresponding originals. In an embodiment, a private DSS server, and its corresponding DSS clients, would support the ability of a friend of a particular user to initiate the transmission of a petition, or other instrument or device, to some or all of that particular user's friends (including himself). That petition might propose that control of the particular user's account be transferred to a new email address, where the option of recovering the account's original username and password would be issued. In this scenario, if some requisite number or percentage of the particular user's friends supported the proposal, then the account's registered email address would be changed in the manner proposed. However, it would likely be prudent to first issue an email to the address specified by the particular user in his DSS account warning him of the impending transfer and allowing him the opportunity to stop it by responding in a requisite manner within a requisite period of time.

This mechanism of recovering access to an otherwise inaccessible account might also be useful for a user who has forgotten his username and/or log-in password, and has also lost access to the email account which he registered with the DSS (perhaps due to the provider of the email service having gone out of business).

While this method of regaining access to an otherwise inaccessible account is an embodiment of this option, other options exist and all are included within the scope herein.

An embodiment can utilize encryption to obscure, and render secure, the data of users. And in an embodiment, data is encrypted by means of a symmetric-key encryption method, utilizing a user-supplied encryption key (which because of the way that symmetric-key encryption algorithms work also serves as the decryption key). This is the key that will be used to encrypt that user's data prior to its storage within the computers, servers and/or programs of the DSS server, and prior to its transmission from any DSS client.

In an embodiment, each user has a single primary user encryption key, which is used to encrypt and decrypt all user data. This embodiment can include features and functionalities in addition to those which create the basis for the DSS.

This embodiment can include a personal archive in which a user may create and store any personally-generated data, like a diary, to-do lists, list of phone numbers and addresses of friends and family, and so forth. In addition, such a personal archive might include self-reported measurements of weight, blood pressure, exercise, etc.; expenses, investments, and other types of financial records; etc. Such a personal archive might include any data, or type of data, which a user might find useful to create and store, including scanned images of various documents and images.

In an embodiment, the user's primary user encryption key would be used to encrypt and decrypt any such personal archival data, as well as any data generated for the purpose of sharing with friends and/or contacts.

An embodiment includes an arbitrary number of shared archives, that is, archives in which more than one user has permission to add, remove and edit media. Shared archives can be used to store collections of information, or to coordinate activities, relevant to a specific set of individuals. For instance, a user might create, and other users might join, an archive dedicated to the remembrance of a particular event, such as an anniversary, a birthday, a concert or a party. Such a shared archive can include photos, text, scanned images and/or the like. It might also include data to be used to coordinate the implementation of a yet future event, like a camping trip, or an as-yet-uncompleted project, like a park restoration. A shared archive might include a shared calendar, to-do list, registry of participants, contact info, etc.

In an embodiment, a shared archive would be associated with a dedicated "archival encryption and decryption key" which would be created by the creator of the archive, and shared with each participant in, or contributor to, the archive. In an embodiment, the shared archival encryption/decryption key would only be known to the archive's creator. Additional users given access to the archive would be given an encrypted version of the archival decryption key (to be stored in their respective key lockers). This would facilitate the removal of users from the archive and/or the ability of users to quit their membership in the archive, without compromising the security of the archive, and its decryption key.

In an embodiment, the resignation of the creator of a shared archive would invoke a mechanism by which the next most senior member of the archive would be given the opportunity to redefine the encryption/decryption key to be used as the basis for encryption and decryption of the contents of the archive from that date forward. This allows for the possibility that the resigning senior member (and/or creator) can still retain access to the prior contents of the archive by retaining his original decryption key. However, the definition of a new encryption/decryption key by the new senior member would effectively deny access to the prior senior member of any new material added to archive. If the resigning senior member were to be denied access to the old archival material, then it would also necessary for the DSS client(s) of the remaining members to re-encrypt the original, i.e. the old, contents of the archive.

In an embodiment, the definition of what constitutes the "senior" member, and when such a senior member would be selected, would be defined by the creator of the archive. The many options which might be made available to the creator could include defining as the senior member a user "appointed" by the creator at the time a successor were needed, a user "elected" by the existing membership at the time of succession, the user with the longest history of membership, etc.

In embodiments, some user actions are primarily implemented by means of some associated action(s) made with respect to the appropriate encryption key(s).

In an embodiment, when two users agree to share some or all of their data, the DSS client exchanges the users' respective primary decryption keys which will be used to decrypt the encrypted user data to be shared. Such pairs of users are referred to as "friends," or more generally as "contacts."

In an embodiment, when one of the two users who define a particular friendship decides to end that friendship, and thus decides to end any future mutual sharing of PID or data, that user is said to "de-friend" the other user. In an embodiment, the end of a friendship means that the system will no longer transmit to either user, the data of the other. In addition, in an embodiment, the decryption key of each user, which had been shared with the other, will be deleted by each user's DSS client from each respective user's key locker. Thus, at the conclusion of the de-friending process, each of the two users, who had originally been friends, and had originally shared their encrypted data, and had possessed the decryption key of the other, will instead no longer receive encrypted data packets from the other, and will no longer possess the decryption key needed to decrypt the encrypted data of the other even if the relevant encrypted user data were to still be delivered.

In an embodiment, a user may elect to replace an existing encryption key with another for any number of reasons, and will be allowed to do so frequently. In an embodiment, a user may replace a particular encryption key, e.g. his primary encryption key, a shared "archival encryption key" (when that user is the senior member of the group), etc. When a user replaces an encryption key, the user will retain his original key in his key locker. This will allow the user to continue to be able to access and view his original content even after the encryption key is changed and future content is encrypted with that replacement encryption key.

In an embodiment, the user will be given the option of electing to have his original data, which had been encrypted with the now obsolete primary encryption key, re-encrypted with the new primary encryption key. The re-encrypted versions of any user data would be stored by the DSS server and would replace the versions encrypted with the original key.

In an embodiment, the user will be given the option of allowing friends, and/or members of shared archives, to retain the original key in addition to receiving the new, replacement key. One consequence of a user electing to instruct the DSS server to delete the original key from the key lockers of friends, and/or shared archive members, is that the affected users will no longer be able to decrypt any of the original material which had been encrypted with the original key. Another consequence is that the user will no longer be able to rely on the redundant copies of the original key, which will have been possessed by the affected users, in order to restore a lost or forgotten original key.

In an embodiment, the decryption key of a contact, or of a shared archive, may be unilaterally removed from his key locker by the system if the creator and/or owner requests that the DSS revoke that key. The revocation of a key can be an option presented to a user who elects to de-friend another user, and to the senior member of a group who elects to kick another user out of his group.

Key revocation effectively removes a user's access to the data, and/or other encrypted content, the decryption of which was dependent upon access to the revoked key.

In an embodiment, when a user elects to replace one of his own encryption keys with another, the original key, which is replaced, will be preserved in the user's key locker to provide the user with continued access to the data encrypted with that original key, and to remove the potentially computationally-intensive task of re-encrypting with the new key all of the data encrypted with the original key. In an embodiment, the user will be given the option of deleting that original key (and re-encrypting the original data), and, likewise, of deleting the original key and simply deleting all of the original content (which will now be unusable in the absence of a decryption key).

In an embodiment, the user is given the option of re-encrypting data which had been encrypted using a key which the user has elected to replace. This option will require the user's DSS client and/or the DSS server to spend some time, potentially a great deal of time, and a great deal of computing resources, by executing, and especially by repeatedly executing, such re-encryption actions, especially when the volume of the affected user data is significant.

While the primary functionality which an embodiment, as well as many alternate embodiments, would seek to provide to users is that of a private DSS; that is, an automated system which receives data from each user of the DSS, stores it, and distributes it to each of the user's contacts according to the access list associated with each element of that user's data. This is essentially the same functionality provided by current DSS's like Facebook and LinkedIn. However, a primary embodiment, as well as many of the alternate embodiments, can also offer additional functionalities which will operate in conjunction with, or in parallel to, the primary DSS functionality thereby providing novel features and benefits. And the sum of the traditional DSS functionalities and the novel features and benefits is expected to have a synergistic value which will greatly exceed the value of either in isolation.

Furthermore, the availability of a set of keys shared between a set of friends in order to implement a private DSS, may also be used to facilitate other forms of communication and exchanges of data, including the exchange of media of various types, in a secure and private manner. All additional optional uses of these keys, and the ability to share data which remains hidden from all others, are implicitly incorporated within the scope of this disclosure.

In an embodiment, users are offered a number of "personal archives" to complement their private DSS functionality. Typically, the data in these personal logs are not shared with contacts via the private DSS, but are instead guarded as private data. These personal archives allow users to create logs, or archives, of the data which they also share with their friends via the DSS. However, they also allow users to create and update various types of historical or chronological logs in which new data is appended to the log(s) but existing data is neither deleted nor edited. These types of "write-once, read-many" logs can be useful for permanently documenting family histories, medical histories, financial records, etc. These types of logs can be useful for creating a personal diary. These types of logs can include images of scanned documents, user-composed text, audio recordings, video recordings and so forth.

These types of personal archives can be, and likely would be, supported by independent programs, and operated by independent providers. They can exist as "stand-alone" programs, and need not be incorporated within a larger system that also supports a private DSS. Nevertheless there are advantages to having these archives, and the tools to create, edit and maintain them, offered within the scope of a private DSS.

When offered within the scope of a private DSS, such as the kind disclosed herein, the user can utilize the same primary user encryption key for both his DSS-related data as well as the data that he will elect to store within his associated personal archive(s). Furthermore, by offering a private DSS which includes functionality that supports the creation and maintenance of personal archives, the user can be given the opportunity to automate the archiving of various types of data which he might create or upload for the benefit of sharing with his contacts within the DSS. Conversely, the user might elect to share with his contacts data which he created or uploaded primarily for archival purposes, such as a marriage certificate, a birth certificate or a collection of photos.

A private DSS, such as the kind taught in this disclosure, will likely not store all types of user data forever since such data would likely become voluminous over time, and since some types of user data, especially highly impulsive types like status updates, tend to lose their relevance in a relatively short period of time. This means that, at least with respect to some of the kinds of user data which might be shared by users within a private DSS, such as the kind disclosed herein, a user might not be able to count on the indefinite retention of, and the continual access to, some of the data which he shares with his contacts over time.

However, there might be reasons why a user would want to maintain every element of data which he creates and/or uploads over a period of time. For instance, a user may desire to maintain some element(s) and/or type(s) of data for use as evidence to demonstrate performance with respect to some court order (e.g. a court-ordered group therapy requirement satisfied, at least to some extent, by regular interactions with other members via the DSS).

For these reasons, and others, the provision of personal archives in conjunction with a private DSS offers unique and desirable benefits to users. Embodiments that incorporate personal archives of any kind are included within the scope of this disclosure.

In an embodiment, users are able to elect to have all, or some select portion, of the media which they share with their contacts within the private DSS, automatically copied to one of their personal archives. This can be a useful log of the events of one's life, and of the evolution of one's thoughts and beliefs. It can provide other benefits as well.

In an embodiment, users are offered a number of "dynamic personal archives" as well as the "static," "write-once" archives discussed earlier. These dynamic personal archives allow users to create collections of data in which they can modify the contents over time through deletions, edits, etc. These dynamic archives can be implemented such that the frequent modification of the contents is facilitated.

In an embodiment, users are offered the ability to create and modify repositories of data dedicated to the maintenance of "to-do lists," accounting data (both personal and business), and other types of archives dedicated to special purposes, and/or special types of data, in which the user is able to vary the data through additions, deletions, edits and so forth.

In an embodiment, users are able to elect to have all, or some select portion, of the information which they generate or discover online automatically copied to one or more special-purpose personal archives. In an embodiment, these archives can be edited, and otherwise manipulated. This allows a user the ability to construct a variety of collections of information gathered, and/or in some other way generated, through online activity of some kind For instance, a user searching for online tools which facilitate a user's creation of graphical illustrations might elect to collect those tools, or annotated links to the locations where such tools can be found, as well as samples of artwork which the user has created with the tools evaluated. The user might, at some point, elect to reorganize, and fully document, this collection so that it will be suitable for sharing with others.

In an embodiment, a user is able to change the attributes of one of his personal archives, for instance, changing a personal, private archive such as the one described above (dedicated to online tools for graphic illustrations) into a shared archive, either shared with a select group of other users or made public and accessible to any user.

In an embodiment, a user is able to create, and automatically log to, a number of special-purpose archives which can be dedicated to the logging, editing, and preservation of data gathered from various external sources (for example, other than the Internet). For example, a user might check his blood insulin levels with a device capable of logging the data. Such a device might be associated with a program capable of importing the data to an online program. And, the DSS disclosed herein can be equipped with an "application programming interface" (or API) which can be used to provide a means for such an importation utility to automatically transmit such data to the appropriate personal archive of a user of the private DSS. Such automated logs might also be generated with respect to data gathered regarding local weather conditions, the patterns of electrical consumption throughout a user's household, etc.

In an embodiment, a user is able to create, and/or join, private shared archives in which all members of an archive are able to contribute media which will be stored indefinitely, or for a finite period of time specified by the archive's creator. Membership is limited to those users who are approved for membership. And, in an embodiment, membership is approved by the creator (or senior member) of the archive.

Such private shared archives might be used for many purposes. For instance, they might be used to compile historical, or chronological, data related to an activity, the evolution of a business, a topic of interest (such as hang gliding), etc. They might also be used to gather, and memorialize, data which might have evidentiary value. For example, a group of inventors might automatically log their communications regarding a topic or problem of interest within a DSS, such as the one(s) taught in this disclosure. They might do this so that in the event that an innovative solution arises from their discussions, they will be able to review the archived log of their discussions, and shared media, in order to determine who the actual inventors were. This would be especially useful if memories become confused and/or contradictory over time, and the true inventor or inventors need to be identified for the purpose of pursuing a disclosure.

In an embodiment, users are able to create, and/or join, private shared archives which support dynamic communications (like subsets of each member's DSS), as well as the dynamic exchange of media, which are referred to herein as private "forums." These private forums offer many potential benefits to the members who interact within them. For instance, a private forum might allow the employees of a company to organize company events, such as a winter holiday party. The users who interact within such a private forum might not wish to befriend each of the users in the forum. Thus a forum allows the creation and execution of the equivalent of special purpose DSS's which may be temporary, and which may be deleted, or transformed into the equivalent of a private archive, following the completion of an associated event.

Such private forums might be used to create online marketplaces where various goods are offered for sale, or purchased, by a select set of users who share a particular characteristic, e.g. an interest, a location, an employer, etc. For example, collectors of war-related postage stamps might organize a private forum wherein they could discuss stamps, and buy and sell their own stamps.

Such private forums could be used to organize political campaigns. The members of such forums might desire privacy so that their internal organizational efforts and notes do not become accessible to proponents of an opposing candidate or proposition.

Such private forums can exist separate from the type of private DSS disclosed herein. However, users may derive many benefits from a private DSS herein which offers its users the functionality to create and operate such private forums, in addition to supporting the social interaction of users with their friends and other contacts. For example, a user might elect to send particular elements of data which he created or uploaded primarily for the purpose of sharing within a private forum to some, or all, of his friends within his DSS. Such a sharing of media between both a private forum and a DSS is easier and more efficient than the effort required to accomplish such a result with respect to two separate and independent systems.

In an embodiment, users are able to create, and/or join, public shared archives which support dynamic communications (like subsets of each member's OSN), as well as the dynamic exchange of media, which are referred to herein as public "forums." These public forums are like their private counterparts. However, public forums are open to any interested users of the associated DSS and do not require the possession of a user-supplied encryption key.

These archives would likely pertain to special interests which might be shared among a number of users of the DSS. For example, a public shared archive might be created in which users would upload and store their favorite photos of Oregon's "Mount Hood."

Such a public forum might be created and used for the purpose of communicating, and sharing media related to, some topic of special interest to the users who elect to join and participate in it. For example, a user might elect to create, and other users might elect to join, a public forum dedicated to the conservation of natural resources, to personal weight loss, to jazz music, etc.

Because their membership is not restricted, and any user of the private DSS may join, there would be no need for a user to provide an encryption key to protect the privacy of the archive's contents. However, in an embodiment, the archive's contents are nonetheless encrypted with a system-supplied encryption key (a "system data encryption key"). This provision of encryption for a public archive offers benefits. For instance, this helps to prevent the adulteration and/or modification of the archive's contents by hackers. Whereas, inappropriate or otherwise malevolent modification of an archive's contents by a user of the private DSS might leave a trail which could be discovered so that the offending user could be admonished, sanctioned and/or expelled from the DSS.

In an embodiment, these public shared archives would invest in every member the authority to modify the forum's content. However, in an embodiment, the creator of the forum (or its senior member) would have the right to regulate, overrule, and/or reverse such changes.

In an embodiment, users are able to securely and privately transmit data to one another. The delivery of data, such as documents, images and/or videos, from one user of a private DSS, implemented in accordance with the teachings herein, to one or more of that user's friends, or even some other user who is not (yet) a friend, is really just a special program of the existing DSS functionality, in which user-generated, or user-uploaded, media is securely shared with a select set, or subset, of a user's friends, as specified in the access list which the user associates each element of his data.

If data is to be transmitted to someone who is not a friend of the user sending the data, then the same method of encryption as is used to securely send a user decryption key during the process of implementing a data-sharing friendship will be used. In other words, when the data to be transmitted cannot be decrypted by the recipient with the decryption key of the sender (because the recipient is not (yet) a friend of the sender) then the recipient will generate a public-encryption key, and a corresponding private-decryption key, (according to the protocol of an appropriate public-key encryption algorithm). The recipient will first transmit to the sender his public encryption key. The sender will then encrypt the data to be transmitted with that public encryption key. And, the sender will then send to the recipient the encrypted data. The recipient will then use his corresponding private decryption key to decrypt that encrypted data, thus revealing a copy of the original unencrypted data.

In an embodiment, users are able to utilize a traditional email type of functionality to transmit data to friends and contacts, as well as to other users who are not yet friends or contacts. This type of functionality is offered as an alternate mode of data sharing, and is just a special case of the foundational data sharing functionality at the heart of the DSS. This mode of data exchange would likely be particularly distinguished by the ability to share data with users who are not (yet) friends, in the formal sense. This email capability would use at least one of the encryption keys of the sender to encrypt the message, and its attachments (if any), if the email is being shared only with friends or contacts of the user.

If the email is to be sent to one or more users who are not friends or contacts of the sender, then, it will be encrypted with the recipient's public encryption key (as discussed above) and this encrypted version of the email will be sent to the non-friend. The request for a suitable public encryption key can be sent from the sender to the intended recipient by means of the DSS server. And, the encrypted email can then likewise be sent from the sender to the intended recipient by means of the DSS server.

In an embodiment, if an email is to be sent to contacts and to non-contacts, then a plurality of encrypted versions of the email will be created. One version will be encrypted with at least one of the sender's encryption keys. And, upon delivery to each contact recipient, the email and its contents will be decrypted in the standard manner. The other version will be encrypted with a public key solicited from, and generated by, each of the intended non-friend recipients. One of these public-key encrypted copies will then be delivered to each one of the non-contacts, with a copy encrypted with the public-key of a contact being delivered to that contact. Each public-key encrypted copy of the email will then be decrypted by the method described above.

Many alternative methods of implementing this email functionality, and integrating it within the scope of the private DSS functionality, exist, and all are within the scope. Also, embodiments which do not provide such email functionality are also within the scope.

The provision, and availability, of the type of secure and private DSS which is taught in this disclosure would likely be of assistance to people who are resisting the control and oppression of an abusive government. For that matter, the provision and availability of the type of secure and private DSS which is taught in this disclosure would likely be of assistance to any group of people attempting to coordinate their sharing of information, as well as their own actions, as they attempt to resist, undermine, publicize, or otherwise resist, any type of abusive authoritarian organization, e.g. a government, a corporation, a cult, etc.

The provision, and availability, of the type of secure and private DSS herein would likely be of assistance to any intelligence-gathering, investigative, and/or law enforcement type of organization, such as the FBI and CIA. Such a secure and private network of communication, data storage, and data sharing, would provide such organizations with the ability to compartmentalize and safeguard information related to particular investigations, potential suspects, particular organizations (e.g. a terrorist group), etc., while also facilitating the dynamic provision and termination of access to such sensitive information, so that access can be provided on a "need-to-know" basis.

The role played by users and data-sharing relationships within the context of a private DSS can be adapted to a law-enforcement type of program, such that in addition to individual human users, the role of a "user" account could be dedicated to a particular investigation, suspect, or other such conceptualized entity which might typify the types of objects, e.g. investigations, suspects, sources, etc., characteristic of the investigative and/or prosecutorial activities and objectives of these organizations. The DSS clients of agents of these organizations could be given the decryption key(s) corresponding to the objects relevant to any particular investigation. The provision of a decryption key would allow such agents with "read-only" access to such data. The provision of a public-key encryption key to such agents, with the corresponding private decryption key being retained within the client of the owner of a "topical" user account, would allow such agents with the ability to submit new data and/or modified versions of the existing data to the topical account, while permitting the owner (e.g. supervisor) of such an account with the opportunity to review and approve any submitted changes to the collection of data associated with the topical account. Once integrated within the data of such a topical account, such new and/or modified data can then be "shared" with other data-sharing users and/or topical accounts related to it.

Through this type of semantic repurposing of the basic private DSS design herein, the underlying functionality may be readily applied to other programs and systems in which there is a need for secure and private sharing of data related to abstract entities, in addition to, or instead of, the humans involved in the gathering and processing of that data.

The provision, and availability, of the type of secure and private DSS which is taught in this disclosure can assist businesses which seek to coordinate the communications and data-sharing of their employees within a secure environment.

In an embodiment, single-player games, and other entertainment and/or personal programs, would be made available to users when their DSS clients upload (the respective portions of) the program to the user's computing device. The data generated by the user while playing the game, e.g. scores, virtual game objects acquired, etc., will be stored in the DSS server following its encryption with at least one of the user's encryption keys, just like any other user data.

In an embodiment, multi-player games would be available to users in the same way, and by the same method, as that utilized for the provision of single-player games. However, game data would be exchanged between players, i.e. between users of the private DSS, by encrypting their game-related data with at least one of their respective encryption keys, and exchanging, and/or storing, that data within the DSS, in the same manner used for the exchange of any other user data.

Alternative embodiments can opt to allow game-related data to be stored and/or exchanged without encryption. Or, they may allow users to opt in or out of encrypting this type of data, even on a per-game basis.

In an embodiment, users will be given an option to allow third-party programs to access their user account, including their encrypted user data, through an API (or "application programming interface"). If a user provides such authorization, then a third-party program, in order to be provided with encrypted user data, will need to supply the username and password of the user. In effect, if a user so authorizes, any third-party program can, via this API, assume the role of the DSS client and retrieve encrypted user data, transmit encrypted user data to the DSS server, and utilize other functionality normally only accessible by means of the DSS client. Such a third-party program would, just like the DSS client, be required to obtain from the user his encryption and/or decryption key if it needed to decrypt the user's encrypted data obtained from the DSS server, and/or if it needed to encrypt any new media for transmission to, and storage in, the DSS server.

Of course, there would be functionalities for which a third-party program would not need the user's encryption and/or decryption key. For instance, a user might use a third-party program to enter unencrypted data into his account within the DSS. This would only be appropriate if the user elected to enter unencrypted data. This might be reasonable concerning low-security data, e.g. stock prices, gaming results, etc. It would also be possible for the user to elect to enter the data from the third-party program into the DSS server, but then to later request his DSS client to retrieve that data, encrypt it, store the encrypted data in the DSS server, and then request that the DSS server delete the original unencrypted version of that data.

Providing third-party programs with access to a user's account and/or encrypted data will allow a user to access his social data, as well as the data from his personal, shared and public archives. This independent access to his data allows the user to create, edit and/or expand his personal data repository within the DSS using tools, information sources, etc. that might not otherwise be available from within the DSS proper. Third-party programs might allow a user to utilize his data in any number of novel ways not anticipated by this disclosure, provided that the user can find, or create, third-party programs capable of supporting such alternate uses.

For example, a user might create and edit a personal archive of music audio and video files. The user might find or create a program which can use that data in order to generate a personalized musical environment in his home. Without the ability to access and repurpose his user data by means of a third-party program, the user would be unable to derive the maximum possible value and enjoyment from his archive of musical data.

However, a user may elect to limit, or even deny, third-party access to his user data. The authorization to allow third-party access to one's user data would reduce the security of the user's data. By authorizing such access to third-party programs, a user might expose a readily available mechanism for a hacker, or other malevolent person, to gain access to his data. For instance, a deceitfully coded third-party program might promise a useful benefit, and solicit a user's username, password and encryption and/or decryption key, in order to enable it to provide that benefit. If the user were to then provide that data to the program, the author of the program would then have unfettered access to the user's account and data.

Alternative embodiments can elect to limit, or even to deny, access to third-party programs so as to more fully protect the accounts, and the associated user data, of their users.

Alternative embodiments may also mitigate the risk posed by providing third-party programs with access to user data by incorporating methods of distinguishing proper DSS clients from those of third-party providers. When access by a third-party client is detected, then the DSS server(s) can limit access of the third-party client to only the specified individual user's data, i.e. and not provide access to the data of the user's contacts. When access by a third-party client is detected, then the DSS server(s) might also withhold the user's key locker, thereby ensuring that the third-party program was unable to decrypt the locker and obtain the decryption keys of the user's contacts. If such an embodiment provides for the double encryption of the key locker with a user-specific system encryption key, then another potential response of a DSS server to the detection of a third-party client program is to withhold the decryption key required to restore the key locker with respect to its encryption with the system-supplied encryption key.

Detection of Threats and Abuse

There are bad people in the world, who do, and plot to do, bad things. A real consequence of creating forums, means of communication, and means of data storage, which are secure and completely private, is that bad people may seek to use those private functionalities to store and share illegal, or otherwise improper, types of data. Furthermore, bad people may seek to use those private functionalities to conspire to commit crimes, or to otherwise coordinate their abuse of others.

In an embodiment, users who seek to abuse the privacy afforded to them by an implementation of the object will be sought out, and, when detected, will be identified, referred to law enforcement agencies (when appropriate), and removed from the system.

The types of content and activities which would be deemed improper would likely include, but not necessarily be limited to, those related to child abuse, terrorism, and/or overt criminal activity (e.g. trading stolen credit card numbers).

In an embodiment, a decrypted sample of a user's data (such as a single block of text or a single image) will periodically be selected by the user's DSS client. That sample will be encrypted by the user's DSS client with a special encryption key (an "abusive content key") and sent to a location from which it can be decrypted, and then anonymously, and preferably automatically, be examined and searched for improper or illegal content.

In an embodiment, if a sample of a user's data appears to contain improper content, then the next step would be for the "examiner" (perhaps an automated system) to notify the respective user's DSS client. At that point, the DSS client would transmit additional elements of user PID (data) to the examiner to allow the examiner to either confirm, or rule out, the presence of abusive content, and/or the user's involvement in improper activities.

In an embodiment, if a user is deemed to have created, imported, stored, shared, etc., improper content within the private DSS, or if the user is deemed to be engaging in, or supporting (even passively), improper activities or behaviors, then the following steps (of an "abuse response protocol") will be executed:

1. The user's DSS client will be notified, and it will transmit to the examiner all of the user's encryption keys and decryption keys, including the decryption keys and usernames (and/or other account identifiers) of the user's contacts.

2. An examiner will decrypt and examine the user data associated with the abusive user and each of his friends.

3. The examiner will make a final determination of whether or not the user is engaged in improper conduct and/or storing improper content.

4. The abusive user's data will be decrypted and copied to a separate storage location. And, a report will be filed with the appropriate legal authority(s).

5. The account of the abusive user will only be frozen, or otherwise limited, upon request by the appropriate legal authorities. This allows those authorities the opportunity to gather additional evidence, e.g. through sting operations, and to locate, and/or take into custody, the abusive user prior to warning being given to the abusive user.

For each contact of the abusive user whose user data is also found to contain improper content, this procedure will be repeated with respect to each abusive contact.

Alternate embodiments may check for abusive content and/or activity by periodically sending each user's primary user decryption key to a location from which a user's content will be anonymously and comprehensively searched for improper content. However, this method of abuse detection would seem to violate the "spirit" herein which is that the DSS server, and any of its related systems, will never have knowledge of a user's primary decryption key.

Alternative embodiments may utilize tools within the DSS client to look for and detect improper content. This would eliminate the need for compromising the privacy of any user's data until, and unless, content which appears to be abusive is detected.

In an embodiment, heuristics based on attributes of each user's encrypted content, patterns of communication, network of contacts, and/or other factors discernable even in the absence of access to decrypted versions of the user data, will be used to identify those users most likely to be engaging in improper activities and/or to be storing and/or disseminating improper content; with the likelihood of random sampling of user data being at least partially influenced by the results of such analyses.

These heuristics might be based on characteristics related to a user's set of contacts, for instance, on the number, and/or geographical dispersion, of those contacts. They might be based on patterns of communication and sharing. For instance, if one user tends to disseminate relatively large numbers of images to his contacts, while not receiving many messages, or other types of media, in return, that might increase the likelihood of improper conduct. They might be based on the distribution of types of media in a user's account. For instance, if a user stores large numbers of images and videos, but very few status messages, then that might be suggestive of someone storing improper content. Many other potential heuristics are possible, and the uses of all such heuristics for the purpose of identifying abusive users are included within the scope of the possible embodiments.

In an embodiment, users can have the ability to signal to their DSS client (e.g. a "panic button"), and thereby the DSS server, that they have detected improper conduct, and/or improper content, during their social interaction with one or more of their contacts. In an embodiment, such a report would be sufficient cause to proceed to a direct examination of the reported user's data through the designation of the reported user as a potentially abusive user, and the execution of the abuse response protocol specified above.

It is also worth noting that some activities, and types of media, which are deemed to be acceptable in one location, and with respect to one implementation of the object, might be deemed improper in a different location (e.g. one with an authoritarian government) and with respect to a different implementation of the object.

Monetization Strategies

Many of the monetization methods utilized by the owners and operators of current DSS's appear to rely on the ability of the owners and operators of those DSS's to access, view, analyze, sell and otherwise exploit, the data of their users. For instance, there have been reports of DSS's selling user data to third-party companies involved in targeting advertisements to some or all of those users. There have been reports of DSS's selling access to the data of their users. For instance, there have been reports of search engines paying DSS's for access to their users' data. Search engines can then facilitate the ability of the users of their search engines to find information about people in whom they have some special interest. Search engines can then provide their users with access to this user data and can increase the profits they derive from the selling of advertisements alongside search results when people are sufficiently motivated to discover information about their friends and others which those friends and others may well have assumed was being privately shared with a select group of only very close friends. There are reports of other apparent efforts by the owners and operators of DSS's to monetize their sites through a variety of other methods related to the exploitation of their collections of user PID.

Since an object, and its embodiments, results in the storage and transmission of only encrypted, obscured, or otherwise hidden, user data by the computers, servers, and/or programs of the DSS server. Embodiments of this disclosure effectively, and deliberately, deny the owners and operators of a private DSS access to the user data which they manage on behalf of their users. And, this should facilitate the ability of a private DSS, created and operated in accordance with the teachings, and properly marketed, to attract new users, by offering those users a compelling reason to abandon their current "non-private" DSS and/or OSN.

However, while one consequence of implementing a private DSS, according to the teachings, is greater user satisfaction, another consequence is greater difficulty of monetizing the DSS. Without the ability to sell access to, and otherwise exploit, the private data of its users, a DSS may need to find and/or enhance other methods of monetizing their efforts.

Embodiments can monetize their private DSS by means of generic advertisements, that is, advertisements that are not targeted to a particular user, but are presented to users without regard to the differential effectiveness of its presentation to one user in comparison to its presentation to another user.

Embodiments can improve the efficiency with which they monetize their private DSS by targeting advertisements to users on the basis of keywords which are identified in a user's decrypted data by the DSS client. A user's DSS client can search for words, or even image attributes, in the user's decrypted data. The DSS client might then prioritize the words, and/or image attributes, with respect to their relevance to advertisements available to the system, or with respect to their relevance to some other attribute(s).

The DSS client can then transmit these significant words, and/or image attributes, to the DSS server, where they would be used to select advertisements likely to maximize the probability of generating revenue as a result of some ensuing desirable user action (e.g. clicking on an ad). Alternatively, the DSS client can use its analysis of the significance of the words, and/or image attributes, discovered within the user's data, to directly select ads. The DSS client can then request these ads from the DSS server and/or from third-party sites.

Embodiments can improve the efficiency with which they monetize their private DSS by targeting ads to users on the basis of the geographical location of the user. The DSS client and/or DSS server should be able to identify the approximate location of a user based on the IP address from which the client connects to the corresponding data-sharing network, browser attributes and/or other available attributes.

Embodiments herein can improve the efficiency with which they monetize their private DSS by allowing users to select for themselves the attributes that the DSS client and/or DSS server will use to select the advertisements which will be presented to them.

Embodiments herein can monetize their private DSS by offering one or more "premium" services, features and/or functionalities.

For example, a DSS which allows its users to store a maximum of 2 GB of data without cost can offer users the ability to store up to 10 GB of data for a cost of $20 per year.

Premium services, which a private DSS can offer to users for a fee, can include access to special-purpose shared forums. For example, for a fee, a private DSS might allow users to join a shared forum specializing in investments, and offering content generated by a professional investor in real-time in response to the changing conditions of various global stock markets.

Premium functionalities, which a private DSS can offer to users for a fee, can include video chat capabilities; for instance, if the private DSS only offered text chat to non-paying users.

These are just some of the added features, capabilities, services and so forth which embodiments of this disclosure can offer to users as premium services, capabilities, features, etc., to generate revenues. Many other such "premium" features, capabilities, services and so forth can be utilized to accomplish, or to promote, the monetization of a private DSS implemented according to the teachings will be obvious to one skilled in the art and are included within the scope.

Embodiments can monetize their DSS by providing all users with encrypted storage and transmission of certain types of data, e.g. text and images, while only providing encrypted storage and transmission of other types of data, e.g. audio and video, to users who pay a fee. Users who elect to not pay such a fee might be allowed to store and share the other types of media, but only in an unencrypted format. Alternately, users who elect to not pay the fee might not be allowed to store or to share those other types of media at all.

Many variations of this "differential-encryption" monetization strategy are available to embodiments, and all are included within the scope herein.

Embodiments may monetize their private DSS by providing to users who pay a fee access to third-party content. For example, access to streaming third-party data which is integrated into a user's list of social network news could be limited to those users who pay a fee. And, there are other types of third-party content which users might only be able to access, view, use, etc., within the context of the private DSS, following their payment of a fee.

For example, users might elect to prepare, store, and file their tax returns using a third-party tax preparation program within the context of their DSS account. This might offer the user real or perceived benefits, such as being able to archive the return(s), as well as the information gathered in relation thereto, in a private archive created within their private-DSS account. The ability to operate such a third-party tax program within, or in conjunction with, their DSS account might be offered to users for a fee.

Embodiments may monetize their DSS by providing human and/or automated support designed to facilitate a user's ability to accomplish various tasks within the context of the DSS. This might be as simple as providing something as generic as "customer support" only to those users who pay a fee. Or, it might be more sophisticated.

For instance, a private DSS might generate revenue by facilitating, for a fee, the ability of users to integrate third-party programs and/or data within their DSS accounts. Or, as another example, a DSS might generate revenue by facilitating, for a fee, the ability of users to set-up and operate for-profit shared forums wherein the user will sell services or goods, or promote their business, etc.

Third-party providers of premium content and/or services, and/or users wishing to promote their own businesses, might market and sell their wares within a private DSS and the owners of the DSS might help to monetize their DSS by charging such third-party providers of premium content and/or services a fee, percentage and/or tax for the right to conduct their business within, and through, the DSS.

Embodiments herein may monetize their DSS by offering their users the ability to pay for online services or purchases using an online payment service integrated within the DSS. The DSS might charge a flat fee for access to such a service. Or, it might charge a percentage of every payment made.

Embodiments herein may also monetize their DSS by offering automated "bill payment" services. For example, a DSS might, for a fee, allow users to specify that certain utility bills would be paid on certain days, and that the funds would be withdrawn from the user's bank account. This might allow the user the added benefit of creating an automated log of all such payments and the corresponding confirmations. Such an automated log might be stored in a private archive created by the user within his private DSS account.

Many variations of this "integrated online payment service" monetization strategy are available to embodiments, and all are included within the scope herein.

Embodiments herein can monetize their private DSS by charging all users a subscription or service fee in order to have an account within, and/or use, the DSS. This fee might be required for users to access their account within the DSS. Or, it might only be required for users to utilize certain "basic" features of the DSS, such as sharing new content with contacts and/or friends.

Monetization can even be achieved through a combination of all of the strategies discussed above.

In an embodiment, users who provide their "private DSS" (i.e. a DSS designed, implemented and/or operated in accordance with the present disclosure) with their username(s) and password(s) to their current non-encrypted DSS(s) and/or OSN(s) (i.e. a DSS and/or OSN not designed, implemented nor operated in accordance with the teachings) will be provided some continuity in their online interactions.

In an embodiment, a user's encrypted DSS client, when supplied with the username and password of the user's account in another, competing non-private DSS, will periodically log in to that non-private DSS. While logged in to that non-private DSS, the user's private DSS client will download any new status updates from the user's account within the non-private DSS, and/or from the friends and/or contacts of the user in the non-private DSS, and will integrate that data into the user's data within the private DSS.

Such user data gathered from a user's accounts on other (presumably non-private) DSS's will be "ported" to the user's private DSS.

Furthermore, a user who has provided his private DSS client with a username and password to another (presumably non-private) DSS will have the option of transmitting to that non-private DSS each new element of data which he creates and/or uploads. In this way, a user may continue interacting with friends and contacts who share their data within other (presumably non-private) DSS's.

In an embodiment, a user of the private DSS would be encouraged to notify his friends and contacts within the other (presumably non-private) DSS's of his account in the private DSS, and to encourage those friends and contacts to create their own accounts within the private DSS.

Presumably any porting of data from the old to the new DSS, and vice versa, would be a temporary remedy to the threat of an interruption in the continuity of the user's social network.

In an embodiment, a single, symmetric-key encryption algorithm is used within the private DSS clients to encrypt new user data, and to decrypt the encrypted data received from the DSS server and/or from friends and contacts. However, alternative embodiments may allow users to select the encryption algorithm, and/or the implementation-dependent details (e.g. length of key, etc.), which the private DSS will use to encrypt (and decrypt) their data.

Some users, especially those with older, and slower, computing devices, may choose to utilize an encryption algorithm which provides less security, but which is also "easier" to compute, that is, requiring fewer computing resources (i.e. having less of a negative impact on the performance of their possibly older computing device). Other users, especially those with an uncommonly great real or perceived need for security and privacy may elect to utilize an encryption algorithm which is "harder" to compute, but which is also harder to crack.

Even if a user elects to utilize a less secure, and easier to compute, encryption algorithm, his DSS client may still be required to utilize more secure, and harder to compute, encryption algorithms if one or more of his friends have not made the same choice regarding those tradeoffs.

In embodiments in which a variety of encryption methods may be utilized, the DSS client of such embodiments may be required to incorporate programs, or portions of programs, to support the execution of those possibly many different encryption (and corresponding decryption) algorithms.

A private DSS implemented in a particular country may have to limit the encryption algorithms that it offers to its international users in order to comply with their country's national security laws.

In an embodiment, a single, symmetric-key encryption algorithm (and corresponding decryption algorithm) is used by the DSS clients in order to encrypt and decrypt user data. However, alternative embodiments may allow users to specify, create or encode their own encryption algorithms, or even other types of customized data obfuscation algorithms and/or methods.

These alternate embodiments might, for instance, allow a user to provide a "plug-in" or "extension," implemented in accordance with a specified format and/or API, which would be capable of obfuscating and de-obfuscating data, and which would be loaded by their DSS client every time it was initialized and/or stored within the user's key locker. The "decryption plug-in" could then be delivered to each of the user's friends and/or contacts by the same secure methodology specified earlier for the delivery and/or exchange of primary user decryption keys in an embodiment. Such a user-supplied encryption/decryption, or data obfuscation/de-obfuscation, plug-in might not even require an encryption key to operate. Its encryption and decryption (or its obfuscation and clarification) might be completely specified within the plug-in.

Some users, especially those who are particularly suspicious of their government, other users, the world, etc., might believe their security to be enhanced through the definition, not only of a custom encryption key, but also of a custom encryption algorithm or more generalized data obfuscation algorithm. ("Custom" can mean a value, algorithm, program, etc. not known to the public and/or which is a "secret".) Presumably, a well-crafted encryption plug-in, implementing some customized encryption algorithm, would be more difficult for hackers, an intrusive government, etc., to crack since not only the key (if there were one) but also the algorithm itself would need to be reverse engineered.

One way in which embodiments herein can provide users with the ability to further refine and control who gets to have access to their data is to allow them to specify, with respect to each element of data that they create and/or upload, the friend(s), contact(s), archives, forums, etc. with which that element of data will be shared, and/or otherwise made accessible. In an embodiment, a "data access list" will be associated with each element of data that a user creates and/or uploads. This data access list will be one of the attributes of each encrypted packet of data transmitted to, and stored in, the DSS server. In an embodiment, these data access lists will not be encrypted. This allows the system to have access to this information when determining which elements of a user's data to send to any of the user's friends or groups. Alternatively, such a data access list can be encrypted with a key supplied to the DSS client by the DSS server and for which the DSS server possesses a complementary decryption key.

It is useful to remember that the DSS server already maintains knowledge of which users are the friends and/or contacts of any particular user of the DSS. So, allowing the DSS server to have access to the data access lists is not disclosing to the DSS server who one's friends are, as it already knows that. It is only disclosing to the DSS server, with respect to any particular encrypted packet of a user's data, which subset of that user's contacts are allowed to access and view that packet of data.

In an embodiment, users will be able to define various preferences and options which will govern the appearance, structure, operation, and other attributes both functional and aesthetic, related to the manner in which their DSS client is implemented and operates on their computing device(s). In an embodiment, an encrypted version of these various preferences and options will be transmitted to, and stored in, the DSS server. Like any other element of user data, these preferences and options will be encrypted with at least one of the encryption keys of each respective user.

In an embodiment, users can create and associate with their DSS account, multiple personas, that is, social facades.

In an embodiment, users can create a web page, a user-interface context or other means of creating and communicating a presentation, which helps to identify, characterize, promote, or in some other way, or with respect to some other aspect, represents those users to themselves and/or to others. These personal presentation instruments, and/or devices, might be referred to as "user facades." A user facade might be composed of templates, graphics, audio, video, etc.

In an embodiment, users can create multiple facades and specify which friends and/or contacts have access to each facade. In an embodiment, a user may also create multiple facades to which any particular friend, or other user of the DSS will have access. In these cases, a user's DSS client can determine which of a contact's user facades to present to a user based on any number of criteria, including, but not limited to: time of day, the season, the last known geographical location of the contact and/or user, type or other attribute of the media element last created and/or uploaded by the contact, type or other attribute of the media element last created and/or uploaded by the user, and so forth.

One or more unique facades might be made available to particular archive members, forum members, other users and/or groups of users, and/or the public.

These unique personas might be used by a user of a private DSS implemented in accordance with the teachings to create virtual personalities within the DSS.

There are occasions when the owners and/or operators of a DSS, or any other website that stores user-generated data, will be compelled by an order of a judicial body, e.g. a court, with proper jurisdiction, to submit to the court, and/or otherwise make available for scrutiny, the data associated with one or more users of that DSS or website. However, in some of the embodiments in which the DSS does not have access to the data of its users, nor to the knowledge, e.g. a decryption key, needed in order to reconstitute that user's encrypted data, a subpoena, or similar judicial order, mandating the production of original user data cannot be complied with simply by copying and transmitting such data. The data is not immediately available due to its deliberate obfuscation by the users and the DSS.

Therefore, with respect to the mandated disclosure of user data, the owners and/or operators of a private DSS, implemented in accordance with an embodiment, will have the option of communicating an appropriate command to the DSS client of any user whose data must be provided to a proper judicial authority in compliance with a subpoena, or other equivalent legal instrument. In response to its receipt of that command, the respective user's DSS client will transmit to the DSS server the decryption keys of that user, but only of that user and not of the user's friends and/or contacts.

Once in possession of the respective user's decryption keys, the owners and/or operators of the DSS can decrypt the data of that user. The reconstituted user data can then be provided to the appropriate legal authority in compliance with the subpoena.

In such cases, it may be advisable for the owners and/or operators of the private DSS to decrypt the respective user's data (and refrain from examining the decrypted data), encrypt it with an encryption key known to the owners and/or operators of the private DSS (to ensure the continued privacy of the user), store the re-encrypted data securely, and then notify the user of receipt of the subpoena. The user should then be given the opportunity to challenge that subpoena in the respective court of law. If the subpoena is quashed, then the stored and re-encrypted version of the user's data should be destroyed and the user so notified. If the subpoena is upheld, and it becomes necessary for the owners and/or operators of the DSS to comply with that subpoena, then the user data should be decrypted and the original, unencrypted data of the user should be provided to the proper authorities in compliance with the legal order.

In an embodiment, the private DSS provides the user with various options which allow the user more refined control over which people have access to his data, and the security of that data.

In an embodiment of this disclosure, the private DSS provides the user with the ability to specify the degree of protection desired for each element of data that the user creates and/or uploads. The user will likely realize that encryption and decryption take time, and consume computing resources, and should therefore be used only when a proportionate benefit is to be realized as a result.

In an embodiment of this disclosure, the private DSS will allow the user to specify, with respect to each element of data that the user creates and/or uploads, whether each element of data should be "private" or "public." If a user specifies that an element of data is "public" then it will not be encrypted, and will be transmitted, and stored in the DSS server, in its original, unencrypted condition. However, if a user specifies that an element of data is "private" then the user will be allowed to specify the degree of encryption appropriate to the corresponding sensitivity of the data, e.g. the user will be able to specify, with respect to each element of "private" data, whether the encryption used should be cryptographically-weak or cryptographically-strong.

Of course, a user of a private DSS implemented in accordance with an embodiment will be able to specify certain default values and specify variations with respect to those defaults with respect to any particular element of his data.

In an embodiment of this disclosure, a user can elect to have his DSS client gather information about his online viewing habits, online shopping preferences, and other data related to the user's navigation of the Internet. The user's DSS client can maintain this data in specialized elements of user data which are encrypted with at least one of the user's encryption keys, just like the other elements of his data.

A user's "online preferences data" can then be shared with his friends, contacts, archives and/or forums just like the rest of his data.

When a user's DSS client receives these elements of preference data from the user's friends and/or contacts, the DSS client can integrate this data and present the user with an integrated set of recommendations and/or suggestions.

In an embodiment, a user can specify the subset of his friends and/or contacts, as well as the subset of the archives and forums to which he belongs, which will be disclosed to each particular friend and/or contact, and made available to the members of each archive and/or forum to which he belongs. This specification will likely best be accomplished in a hierarchical fashion, specifying the relationships of the user which will be available to his friends, contacts, archives and forums. And then a narrowing of the disclosed set of relationships with respect to each specific contact or group of contacts, as well as the disclosed set of relationships that will be available publicly.

As with many other non-private DSS's, when a user connects to the computers, servers, and/or programs of an embodiment of the centralized DSS (i.e. the DSS server), a DSS-specific computer program (the DSS client, e.g. implemented as code written in html, JavaScript, etc. and/or any combination thereof) is transmitted from the DSS server to the user's browser. However, it is also possible that a dedicated program installed by a user on his computer also mediates access to, and interaction with, the computers and/or servers which instantiate the DSS server.

There are many platform-specific, technology-specific, implementation-specific methods by which the embodiments can be manifested and made available to a user. All of these many practical and/or technical options, possibilities, and variations for the manifestation of the object are included within the scope of this disclosure.

Alternative Methods of Data Obfuscation

An embodiment utilizes encryption, with one or more encryption keys (perhaps passwords or passphrases) in order to render user data hidden, and otherwise unusable, to any unauthorized people or systems. However, the scope includes embodiments which utilize any and all alternate methods, algorithms, techniques and/or systems to hide, obscure, or otherwise promote the security and privacy of a user's data. Any technique, method, protocol, trick, or other manipulation or process, capable of rendering data encrypted, hidden, obscured, partitioned, translated, or otherwise difficult to access, read, decipher, interpret, understand and/or use, would be a basis for an embodiment, and would fall within the scope thereof.

Moreover, regardless of the method of data obfuscation selected for an alternate embodiment as the default for its DSS clients, an embodiment may also allow users to select and/or create their own algorithm, method, protocol, code, etc., with which their data will be obfuscated and clarified.

For example, a user might implement his own customized (and/or secret) data obfuscation method in which his customized "encryption plug-in," loaded into his DSS client, would access a particular document available at a particular URL on the Internet. Such a document might be composed of both text and images, providing access to a very large palette of every possible eight-bit (i.e. "byte") value, i.e. from 0 to 255.

By substituting for each character, or other eight-bit value, in his original unencrypted media, the offset of the same eight-bit value within the referenced online document, this user's DSS client could translate every byte of his original media into an equivalent, though thoroughly obfuscated, version. The copies of this user's plug-in, installed in the DSS client of his friends, could then reverse this process, using each offset value specified in his obfuscated data to retrieve from the appropriate online document the corresponding original character, or eight-bit value.

In this way, the user's data could be obfuscated prior to transmission to, and storage within, the DSS server. And, the DSS server, without access to the user's customized data-obfuscation plug-in, could not view, nor otherwise gain access to, the original data. And, the user's friends, because of their possession of, and their DSS clients' use of, his customized plug-in, would be able to view, and otherwise have full access to, his original data.

While an embodiment utilizes what is known as symmetric-key encryption, the scope herein can include embodiments utilizing any and all encryption methods, including public-key encryption algorithms, as well as embodiments utilizing methods other than, or in addition to, encryption in order to improve the security and privacy of user data.

While an embodiment can utilize public-key encryption as the basis for facilitating the exchange of user decryption keys between two users following their election to be "friends" and to subsequently share access to their respective data, alternate embodiments may facilitate the exchange of decryption keys, and/or other data, by alternate means and/or methods.

Alternative embodiments may encourage or require their users to exchange their decryption keys, and/or other means for accessing the other's obscured data, by means of some communication channel external to, and separate from, the DSS server. For instance, users may be required to exchange their decryption keys by exchanging emails through some third-party email service, e.g. "hotmail." They may be encouraged or required to exchange their decryption keys by means of some third-party instant-message chat service, e.g. "Internet relay chat" (IRC). They may exchange their decryption keys in writing by exchanging letters delivered by a postal service, e.g. the U.S. Postal Service. Or, they may exchange their decryption keys verbally during a phone call. There are a number of alternate methods of exchanging decryption keys, and/or other data, required for use of a private DSS implemented in accordance with the teachings And, all such alternate embodiments are included herein.

Embodiments can optionally have user encryption keys provided by users themselves, by the DSS, or from alternate sources. Embodiments can optionally require the user himself to assume responsibility for storing his encryption (and/or decryption) key(s), and inputting his key(s) when so requested, e.g. by a DSS client program.

There are additional optional embodiments which vary with respect to how user encryption and decryption keys are generated, whether user encryption keys are unique or shared (perhaps even utilizing a single key to encrypt all user data), where user encryption and decryption keys are stored, and how they are transmitted, and otherwise utilized in order to encrypt and decrypt user data.

An alternative method for two users of a private DSS implemented in accordance with the teachings to exchange decryption keys, or other data obfuscation and clarification instruments, (particularly if decryption keys were to be viewable not just by each respective user, but also by that user's friends) is via some method of communication selected by the users that is completely separate from the computers, servers, and/or programs of the DSS server. In this scenario, each user would communicate to the other their decryption key, likely some phrase or sentence. This communication might best be accomplished by means of some text-based method like sending an email. By communicating a decryption key in writing it is possible for the recipient to copy and paste the key, or, at least, to precisely transcribe the key from the message and in to the proper editable text field within the DSS client.

It would be possible for the DSS client of a user to automate the sending of an email containing a needed decryption key to a new friend, since the computers, servers, and/or programs of the DSS server will likely already know the email address of each user of the system (one of the few pieces of data likely to be possessed in an unencrypted form by the DSS server) and the DSS client could thus likely obtain the email address of any new friend from the DSS server.

It would also be possible for the DSS client, when provided with enough information about a user's email account, to automatically monitor the user's email account, and to automatically retrieve and parse the email from the new friend containing that friend's decryption key, and to automatically extract from that email the needed key.

This method of exchanging decryption keys, especially if it were not fully automated, might be tedious or inconvenient, especially for a user who would need to share keys with many friends. However, in most cases, there should be more convenient or otherwise superior, alternative methods of sharing keys available. Some, but not all, of these are discussed below. And, all of these alternate methods, as well as the many alternate methods not discussed, are included herein.

An alternative key exchange option for those implementing a private DSS in accordance with the teachings of this disclosure is available when two users who wish to become friends have a friend in common. If each friend-to-be already possesses the symmetric-key encryption key (which is also its own decryption key) of a friend common to both friends-to-be, then the friends-to-be may exchange their own keys with each other by first encrypting their decryption keys with the encryption key of their mutual friend. Their encrypted decryption keys may then be exchanged via the computers, servers and/or programs of the DSS server. Since the DSS server does not possess, nor have access to, the decryption key of the common friend, the DSS server cannot decrypt, nor otherwise gain access to, the decryption keys being exchanged by this pair of new friends.

In other words, if Users A and B wish to become friends, and become able to share access to their data, and both are already friends with User C, then the following alternate key exchange method is available.

Each user's DSS client can encrypt their respective user's primary encryption key with the encryption key of one of their mutual friends, or of one of the mutual private forums or archives to which they belong.

According to this encryption key sharing scheme, it can be assumed that two new friends are each already friends with a third user, "User C." The decryption key of each new friend is encrypted by the DSS client using User C's encryption key. Then, the encrypted decryption keys of Users A and B can be exchanged by means of the DSS server.

When utilizing this method of key sharing, the DSS server never has access to the actual primary encryption keys of the two new friends. Instead, only the encrypted versions of these keys are passed through the DSS server, and are sent from each new friend to the other. Upon receipt, the DSS client of each new friend uses the decryption key of their common friend, forum or archive, e.g. of User C, to decrypt the decryption key of the other user (i.e. the key of User A or User B).

This method of key exchange can be automated or automatic, without requiring the attention, or the intervention, of the users involved.

In the absence of a common friend, forum or archive, the encryption key of which could be used to encrypt the keys belonging to each of two new friends prior to the exchange of those keys via a DSS, another alternative is for one user to use a secret question, or other type of prompt, which will cause the recipient to recognize a particular phrase or other character string that can be used as an temporary symmetric-key encryption key to facilitate the exchange of their decryption keys by the manner described above using the encryption key of a mutual friend, forum or archive. Such a secret question or prompt can be sent from one user to the other by means of the DSS server.

The DSS client of the user issuing the secret question or prompt (User A) can encrypt that user's decryption key using the value which the secret question or prompt is intended to provoke from the user's friend (user B). The DSS client of User A can then transmit to User B the encrypted decryption key of User A.

When User B reads the secret question or prompt and enters the correct response into his DSS client, then his DSS client will be able to decrypt User A's decryption key. Upon successfully decrypting User A's decryption key, User B's DSS client can then encrypt User B's decryption key with the same secret-question-key and return User B's encrypted decryption key to User A's DSS client, where that DSS client would be able to use the same secret-question-key to decrypt User B's decryption key.

Another alternative would be for each user to create a secret question or prompt, which would then be sent along with the encrypted version of his decryption key created through the use of the correct response to that secret question or prompt. Each user would then be responsible for guessing the correct response in order to decrypt the decryption key of the other.

Such a prompt or secret question would be intended to evoke the needed decryption key directly. For example, I might pass to a new friend, in lieu of my decryption key, the question "What is my favorite type of animal?" My friend, because of his familiarity with my background and preferences, might realize that I was extensively involved with rodeos as a child. He might therefore correctly guess that the correct response to my secret question is "horse."

If a user enters an incorrect response phrase to the suggested prompt or question into his DSS client program, then the resulting encrypted version of that user's decryption key will not be able to be properly decrypted by the other user. Furthermore, if this error should occur, then the user who enters an incorrect response phrase into his DSS client will not be able to properly decrypt the decryption key sent from the other user, since it will have been encrypted with a different response phrase. Should an error like this occur then it will be necessary to repeat the key exchange procedure, by this or by some other means.

If one of these alternative key exchange methods is incorporated into a private DSS implemented in accordance with the teachings, then it may prove useful to append a standard character sequence or phrase to each user's primary decryption key prior to encrypting it with the respective user's secret-question-key. This allows the DSS client attempting to decrypt an encrypted decryption key using the secret-question-key guessed by its respective user to verify whether or not that decryption key has indeed been successfully decrypted by searching for, and confirming the presence of, the expected confirmation sequence or phrase.

Alternative embodiments may encourage and facilitate the use, by users, of a multitude of different methods of exchanging decryption keys, e.g. by email, by instant messenger, by means of a phone call, etc. An advantage of a private DSS supporting a multitude of key exchange options is that it will be more difficult for hackers, or other malevolent individuals, to intercept and steal the decryption keys of users during the key exchange process.

Some of the methods of exchanging decryption keys between contacts discussed above can fail to accurately transmit the needed decryption key(s). An exchange may fail due to a failure of a user to successfully guess the intended response to a user-generated question or prompt. An exchange may fail because of a user's failure to accurately transcribe a key into the DSS client. There are many possible failure modes and any attempt to list them all would seem futile.

Because of the risk that an attempt to transmit, decrypt and/or install a friend's decryption key will fail, it would be wise to offer some provision for verifying that a friend's key has been successfully transmitted and entered into a recipient user's DSS client. There are many methods available to accomplish this, all of which are included within the scope herein. However, by way of an example, the following method is an option which would be a reasonable verification strategy.

The message used to send a decryption key to a friend, either through an external communication channel, or by means of the DSS server, can be made to include a text sample which has been encrypted with the encryption key that corresponds to the same decryption key being transmitted to the friend. The plain, unencrypted version of this same text sample can also be included. Upon receipt, and entry of the decryption key into the recipient's DSS client, the DSS client can then attempt to decrypt the associated encrypted text sample. A subsequent comparison of this decrypted text sample with the original never-encrypted text sample which would also be included in the message, will allow the accuracy of the decryption key's transmission, decryption and entry to be verified manually and/or automatically.

Storage of Encryption/Decryption Keys

A user of a private DSS herein will likely be required to possess a local copy of his own encryption key and corresponding decryption key (if they are not the same key). And, in some alternate embodiments, a user may also be required to keep local copies of the decryption keys needed to decrypt the data of every friend, private forum, private archive, and/or every other DSS-related communication channel or data source with which that user wishes to send, receive, or exchange data. In the absence of a local copy of his contacts' decryption keys, a user of a private DSS of the type taught in this disclosure will likely need to input the required decryption keys every time the DSS client program is initialized.

In alternate embodiments, a copy of the set of encryption and/or decryption keys required to process (i.e. to encrypt and decrypt) a user's data, and the data of his friends, can be stored locally on a user's computer.

Many options exist regarding the storage, retrieval and entry of the set of encryption and/or decryption keys needed by a user of a DSS implemented in accordance with the teachings And, all of these options, and the alternate embodiments which they help to define, are included within the scope.

Alternative embodiments can allow, or require, a user to input, perhaps directly, or by copying and pasting from a separate data file, or by some other method, the set of decryption keys belonging to his contacts within the DSS. If the decryption keys of a user's contacts are to be stored separately from the DSS server, then many different methods of storage may be supported or encouraged. And, all such alternate embodiments are included within the scope.

A user may store the set of decryption keys belonging to his contacts in a digital file, e.g. a text document, on his computer, and, when appropriate, may copy this set of decryption keys from the document and paste it into an appropriate input channel within the DSS client.

A suitable digital file, containing the encrypted or plain contact-specific decryption keys, might be stored on a permanent local storage device connected to the user's computer, e.g. a hard drive. Or, it might be stored in a removable storage device, e.g. a USB drive or a CD. It can be stored within a two-dimensional barcode or some other visual encoding of the keys, and this data can be input to the DSS client program, when required, by means of a video camera attached to the computer. And, there are endless other ways in which such alphanumeric data might be encoded, stored and retrieved, all of which are included within the scope herein.

A set of contact-specific decryption keys stored in this manner can be stored as unencrypted keys, which can be viewed and understood by a user, or they may be stored as encrypted strings of alphanumeric characters corresponding to the original decryption keys, but encrypted with a key supplied by the DSS server (to provide additional protection for the decryption keys of a user's contacts). If encrypted versions of the contact keys are stored, copied and pasted, then the unencrypted versions of the contact keys would only be generated within the DSS client. And, in this scenario, the unencrypted versions of these contact keys would likely not be made available to users.

It would be possible to allow a user to specify a file path which would allow the DSS client to automatically open and parse a set of contact decryption keys without requiring the intervention of the user.

A user may be allowed to provide a URL, and possibly a corresponding username and password, which would allow his DSS client to access a source from which the decryption keys of a user's contacts could be extracted. Suitable sources might include text documents, emails, images, etc. If stored in some image(s), the decryption key data might be encoded within the image(s) through the encoding method known as "Steganography."

There are many methods by which a user might store and retrieve a list of decryption keys corresponding to that user's contacts. The possibilities are too numerous to exhaustively list here. However, anyone skilled in the art will recognize from this disclosure the great variety of options available. All of these options, and their corresponding support within the private DSS taught in this invention, are included within the scope herein.

Storage of the Primary Decryption Keys of a User's Contacts

In an embodiment, the decryption keys of a user's contacts are stored in a data structure called a "key locker." That key locker is encrypted with both an encryption key of the user, and with a DSS-supplied encryption key. The use of double encryption offers better protection for the key locker which is appropriate since this may contain the decryption keys of many other people. And, it also protects the security of a user's decryption key from any malevolent or unethical contact(s).

By storing all of the decryption keys of a user's contacts within a single data object which can be decrypted by the user's DSS client using a decryption key which it can retrieve from the DSS server, and the single primary decryption key of the user, a user is able to supply his own primary decryption key and yet be able to gain access to the full set of data belonging to himself and to his contacts. This greatly simplifies the burden placed on the user by the DSS to remember data required to access and fully utilize the DSS.

Once encrypted with both the user and DSS encryption keys, a user's key locker can be stored by the DSS server along with the rest of that user's encrypted data.

Embodiments can optionally provide means for a user to store his encryption and/or decryption key(s) on his local computer, or in some other local storage location, or by one or more personal storage options. Embodiments can optionally incorporate a system of servers, computers and/or programs, possibly separate from the DSS server, where user encryption and decryption keys are stored. Embodiments can optionally have a user's private encryption and decryption key(s) stored by the DSS server and simply prohibit their access by other functionalities within those servers and/or by the owners and operators of the DSS. However, this option would make any claim that user data is not viewable or accessible, in an unencrypted form, somewhat dubious.

All alternate methods of storing the collection of encryption and/or decryption keys, or other types, forms and/or actual data required by a user to access the encrypted and/or obfuscated data of his contacts are included within the scope.

Sources of Encryption Keys

While an embodiment would have each user supply his own password, passphrase, or other form of encryption key, with which the DSS client may encrypt his data prior to its transmission to, and storage within, the DSS server, the scope is not limited to this implementation option. The scope also includes implementations in which an encryption key is provided to a user, or provided on behalf of a user, by other sources and/or other means. These optional sources of user encryption keys would include the DSS client, a third-party source, e.g. a third-party web site or program, and/or other sources. All such key providing embodiments of the private DSS are within the scope.

Separate Server(s) for Encryption Keys

Another optional embodiment includes the use of a set of computers, servers and/or programs which generate, provide and/or store encryption and/or decryption keys on behalf of users of the private DSS. These encryption and/or decryption key computers, servers and/or programs might exist as a parallel, but separate, system from the computers, servers and/or programs which implement the DSS server. In these alternate embodiments, a DSS client (if one were included as a part of the embodiment) would communicate with the encryption key system in order to retrieve a user's private encryption and/or decryption key(s). It would communicate with the DSS server in order to retrieve the user's encrypted data. And, ideally, the DSS server, and the encryption-key system, would remain completely separated, and only interact in the sense that each communicated with the DSS clients.

With this bifurcated private DSS system, in which one system generates and stores encryption and/or decryption keys, and the other system stores data encrypted with those keys, the security of each user's data is enhanced for the reasons stated with respect to an embodiment. However, in this alternative embodiment, even though the keys would be stored in separate servers, and user data would be encrypted, this alternative embodiment would risk diminishing the perception of security among the users of the system. Users might quite correctly be concerned about the apparent conflict of interest involved in having the same people responsible for guarding their encrypted data also be responsible for guarding the encryption keys with which that encrypted data could be decrypted. Users might be concerned that they would be vulnerable to the same abuses of privacy which have characterized the operation of some of the DSS's in use today. Also hackers who managed to penetrate either the user data and/or the encryption key systems would likely have easy access to the other system if it were implemented within the same network of computers.

Many embodiments which differ from an embodiment in terms of who/what generates the encryption keys, and where/how those encryption keys are stored, are possible. All such alternate embodiments are included within the scope of this disclosure.

Double Encryption for all User Data

In an embodiment, the majority of user data is encrypted with a symmetric-key encryption algorithm, and a single, primary user encryption key. Exceptions to this include the user's key locker which is encrypted with the user's primary encryption key and a DSS-supplied system locker encryption key.

However, security of the private DSS as a whole, and the security of each user's data, would be further enhanced by encrypting not only a user's key locker with a double key, one supplied by the user and the other supplied by the private DSS, but by also doubly encrypting all of a user's data with such a pair of encryption keys.

Data encrypted with both a user-supplied encryption key and a key supplied by the DSS could not be decrypted, nor would it be usable, by either the private DSS or the user in the absence of the key specified by, and solely available through, the other party. And, since the user would never disclose to the DSS server, and the DSS server would never solicit from the user, the user's primary decryption key, only the user and the user's contacts are able to decrypt and utilize the data of the user.

Any embodiment, regardless of the variety of encryption keys, the sources of those encryption keys, and/or the variety of other data obfuscation and/or clarification information, required by the private DSS and/or the user to obfuscate and/or restore a user's data, is included within the scope herein.

Encryption of Supplemental Data

When a user of a private DSS of the type disclosed herein generate and/or upload novel media, such as text, graphics and/or audio, it is useful to enhance the security of that media prior to its transmission to another user and/or to the DSS server by first encrypting that media with that user's primary encryption key.

However, when a user makes a comment, tags a face in a photo, or generates some other type of "secondary" or "derivative" media, most likely relating to someone else's media, e.g. a comment about a friend's status update or photo, then those implementing a private DSS designed in accordance with this disclosure may choose whether to encrypt this secondary media with the primary encryption key of the author of the secondary media, or with the primary encryption key of the author of the original, or "primary" media to which the secondary media relates. Encrypting such secondary media with the primary encryption key of the author of the original, or "primary" media to which the secondary media relates might be reasonable since that secondary media would only have relevance in connection to the media to which it relates, and would thus likely be distributed to, and only viewed by, the same users viewing the primary media to which it relates.

One option for an embodiment is to encrypt any secondary media with the primary encryption key of the author of the secondary media, rather than with the primary encryption key of the author of the primary media to which the secondary media relates. This precludes the ability of any friends of the author of the primary media from being able to decrypt and view the secondary media unless those friends are mutual friends of both authors.

Distribution of such secondary media, and access to them, would seem to be related to primary two factors:

First, such secondary media are likely only relevant to those who can view or have viewed the primary media. This is the set of users specified as friends of the author of the primary media. Presumably, only those friends of the author of the primary media would be able to formulate and submit secondary media related to such primary media.

Second, such secondary media would properly be regarded as data belonging to the author of the secondary media. And, to be consistent with principles of privacy of this disclosure, it would seem improper to disclose any portion of a user's data to users who the author of the secondary media has not explicitly accepted as friends or contacts. In fact, it is conceivable that the author of a piece of secondary media might actually have a deep antipathy for one or more of the friends of the author of the primary media to which the secondary media relates. Within the context of this limitation, it would seem reasonable to only distribute a piece of secondary media to the author of the secondary media (by default), to the author of the primary media (already a friend of the author of the secondary media), and to that subset of users who are friends of both authors, i.e. friends of both the author of the primary media and the author of the related secondary media—the only subset of the contacts of the author of the secondary media to whom the secondary media would have any relevance.

Thus, the implementer of an embodiment will likely need to decide which of these two perspectives and related distribution and/or encryption choices is the most reasonable, given the particular context of the actual private DSS to be implemented.

There are many options regarding the distribution of, and access to, secondary media and other types of addenda to media created by, or uploaded by, users of the private DSS.

If an alternative embodiment is implemented in which secondary media are to be distributed to every user to whom the primary media were distributed (i.e. to every friend of the author of the primary media), then this distribution event might best be preceded by an appropriate warning being issued by the DSS client to the author of the secondary media. In such case, the author of the secondary media might be given an option of vetoing the distribution of his secondary media to particular friends of the author of the primary media.

Another option for an embodiment would be to distribute the full comment to every user to whom the original media was distributed, but to make its attribution "anonymous" to any users who are not mutual friends of both the author of the original media and the author of the comment.

Another option for an embodiment related to the encryption and/or distribution of secondary media is to distribute only the username of the author of the secondary media, in lieu of the actual media, to any users who are not mutual friends of both the author of the primary media and the author of the secondary media. This would inform those users who are not mutual friends of both authors that secondary media was submitted, and is potentially available, even though the actual content of the secondary media has been excluded. This allows users who are not mutual friends of both authors to seek to establish a friendship with the author of the secondary media, which would result in their gaining access to the excluded media.

Another option for an embodiment is to simply associate all secondary media with the primary media, and make the full content of the secondary media, as well as the attribution of the secondary media, available to all recipients of the primary media, whether or not they are mutual friends of both authors. However, if this option is implemented, it could be advisable for the DSS client to advise, or remind, the author of the secondary media of the pending disclosure to non-friend users within the private DSS.

If the distribution of secondary media, related to a piece of primary media, is to be limited to those users of the private DSS who are mutual friends of both the author of the secondary media, and the author of the primary media, then it is likely best to encrypt the secondary media with the primary encryption key of the author of that secondary media. This is more consistent with the principle that media are encrypted with the primary encryption keys of their authors (or submitters).

If the distribution of secondary media related to a piece of primary media is to include every recipient of the primary media, with full attribution, whether or not those recipients will include users who are not friends of the author of the secondary media, it can be preferable to encrypt the secondary media, and attribution, with the primary encryption key of the author of the primary media. This would be consistent with the pattern of distribution which is to follow. In fact, the DSS clients of users who are friends of the author of the primary media, but not friends of the author of the secondary media, would otherwise be unable to decrypt the secondary media if it were delivered to them after having been encrypted with the encryption key of the author of the secondary media.

If the distribution of secondary media related to a piece of primary media is to include every recipient of the primary media, but if full attribution is only to be given to those recipients of the secondary media who are mutual friends of both the authors of the primary media and the secondary media, it may be preferable to encrypt the secondary media associated with full attribution with the key of the author of the secondary media, and to encrypt the anonymous version of the secondary media with the primary encryption key of the author of the primary media, thus enabling that anonymous version to be distributed to the friends of the author of the primary media who are not also friends of the author of the secondary media.

There are many options with regard to which user's primary encryption key to use when encrypting secondary media, and with regard to the pattern of distribution that follows, and all such alternate embodiments are included within the scope.

User Data which is Available to the DSS Server

In an embodiment, a user's unique username, and corresponding log-in password, as well as the email address specified by the user, are not encrypted within the DSS server. The DSS server uses the unique username to distinguish one user account from another. It uses the log-in password associated with each username to validate the identity of each user. And, it uses the email address to allow the user to regain control of his account should he forget his log-in password, or in some other manner lose access to his account.

However, an embodiment herein also allows the DSS server to associate a unique identifier with each element of user data, and to access various attributes of each element of user PID that help it to identify which pieces of user data to transmit to the author of the data or to friends of the author. It also helps the DSS server to determine which elements of data are appropriate to the screen(s), page(s), context(s), etc. of the user interface that a user's DSS client is attempting to construct. For example, there is likely no need for the DSS server to transmit photos belonging to the user, or the user's friends, if the context of the DSS with which the user wants to interact is related solely to relevant audio files.

It can be preferable for any embodiment, at a minimum, to have some identifiable value(s) or label(s) which will allow one user account to be distinguished from another. Although it is conceivable that some external identifier, e.g. an IP address, a corporate network ID, etc., can be used in place of a user-supplied username.

In a secure implementation of many embodiments, the unique username and corresponding log-in password, both of which a user would declare during the process of creating a new account within a private DSS herein, would be the only elements of user data which would not be encrypted with the user's primary encryption key (e.g. password or passphrase).

However, such an extreme implementation, while maximizing the privacy of the user, and the security of his data, may also limit or preclude certain potentially useful options which might otherwise be made available within a private DSS implemented herein. For instance, by leaving a user's email address unencrypted, or encrypted with a key known to the DSS server, a message which discloses to a new friend the decryption key of a user can be automatically generated and transmitted. Without knowledge of users' email addresses, a DSS server would be unable to provide a DSS client program the email address to which a decryption-key disclosing email should be sent.

There are a wide variety of schemes regarding which types of user-related and/or media-related data would be made available to the DSS server, in a private DSS herein. All such alternative embodiments are included within the scope herein.

Variety of Encryption Keys

In an embodiment, users can have a single primary encryption key which they have specified and which is not known to the computers, servers and/or programs of the DSS server. In an embodiment, a user may have additional encryption keys corresponding to his membership in various private shared archives and/or forums, or corresponding to various specialized and limited distribution lists each of which would specify a subset of the user's contacts to which the user may elect to transmit and share his data.

In an embodiment, the user's primary user encryption key would be used to encrypt any such personal archival data, as well as any data generated for the purpose of sharing with friends and/or contacts. However, in other embodiments, especially those in which encryption keys were able to be accessed, viewed and/or otherwise discovered by a user's friends and contacts (i.e. in which those keys were not concealed from users within an encrypted key locker), it can be prudent to allow, encourage or even require users to specify an alternate encryption key which would be used to encrypt personal archival data. This would minimize the risk that a user's personal archival information could be accessed by a hacker, or a friend or contact, who discovered, or was permitted to have knowledge of, the user's primary encryption key.

In any embodiment, the perception of user control over his/her own data can be important. Many users will desire the tools and/or the control necessary to ensure that their data which might be related to any particular facet(s) of their lives will only be shared with friends who share their interest in and/or acceptance of, such activities, beliefs, interests, etc.

An embodiment herein associates an access list, or distribution list, with each element of user data in order to ensure that each user is able to control which friends and/or contacts will be allowed to view, and/or otherwise have access to, each particular element of that user's data.

However, since this restriction of access to user data is expected to be such a serious concern for users of private DSS's implemented in accordance with the teachings, some alternate embodiments may find it useful to provide redundant protection for the security, and proper segregation, of user data. Also, in alternative embodiments in which an attribute such as an access list is either not implemented, or is encrypted along with the content of a packet of encrypted user data, it can be useful to have some other method of ensuring that only those groups, and/or sets of friends, specified by a user are able to access particular elements of that user's data. Therefore, in addition to the use of a per-data-packet access-list attribute, if such an access list is available, it can be useful to provide a method of ensuring that only specified users and/or groups are able to decrypt and view particular elements of user data.

In an embodiment, all of the data which a user intends to share with friends can be encrypted with a single primary user encryption key and an access list will be a system-accessible attribute of each packet of encrypted user data. However, alternate embodiments may wish to allow a user to define a unique encryption key with respect to each attribute, classifier, and/or category used by that user to segregate the distribution of his data. For instance, a user may wish to define an encryption key for "night life," another for "work," and yet another for "home and kids." In this way, an embodiment can use a targeted distribution list, in conjunction with a specific user encryption key in conjunction with that list, as a means of ensuring that only specific users are able to decrypt particular types of user data.

In this alternate embodiment it may be necessary or desirable to exchange more than one decryption key with a prospective friend or contact. For instance, a user may send to one prospective friend the decryption keys corresponding to "home and kids" and "work," while sending to another prospective friend only the decryption key for "night life." In an alternative embodiment employing this kind of key management scheme it would only be necessary for the user to specify the key-specific categories to which any particular element of data belonged in order to ensure its proper delivery to the corresponding friends. The DSS client could then automatically generate a user-unique encryption key to use in conjunction with the user-specified distribution list.

However, by combining this key-segregated data categorization method, with an access list for each element of user data, the set of friends and/or contacts with which any particular element of user data can be rigorously enforced. In other words, with this hybrid user data access scheme, a user can ensure that only a particular set of friends and/or contacts can possibly gain access to any particular element of data, because only those friends and contacts will possess the decryption key(s) needed to decrypt it. However, he can further limit the distribution and access to any particular element of data to only a subset of the friends who might possess any particular category-specific decryption keys by specifying an appropriate access list composed of individual friends and/or contacts within the total set.

Many such variations on this scheme of substituting multiple context-specific, and/or even friend-specific, encryption keys for the single primary encryption key favored in an embodiment are possible. And, all such variations are included within the scope herein.

Alternate embodiments may elect to transmit and store primary user encryption and/or decryption keys, as well as any other special-purpose encryption and/or decryption keys, in plain text; that is, in an unencrypted form. These alternate embodiments may also elect to allow users to have access to, and to inspect, the full complement of such user-generated encryption and/or decryption keys which have been provided to them through the consummation of their friendships, or through their acceptance to shared archive(s) and/or forum(s), or other special-purpose multi-user programs supported within the private DSS.

In these cases, it may be useful to allow a user to specify a unique encryption key for each relationship, i.e. with respect to each friend. It may also be useful to allow a user to specify a unique encryption key for each subset of friends. In fact, it may be useful to allow a user to define a unique encryption key for each activity, relationship, archive, etc. and/or combination thereof.

If user encryption keys are to be unencrypted (not even encrypted with a system-supplied encryption key) and if, as a consequence, any key created by a user is, either directly, or potentially indirectly, discernable to other users within the DSS, then users can be provided with the option of redefining these keys thereby rendering the original keys obsolete.

Users may elect to redefine encryption keys when they use a single key for communications or activities related to a group of other users and they subsequently wish to exclude one user from such a group. Users may elect to redefine encryption keys when they believe a particular key has become known to someone whom the user does not wish to allow access to certain data. And, there are other reasons why users may wish to redefine encryption keys when keys are directly, or potentially, discernable to other users within the private DSS, or to persons or systems outside the private DSS.

All embodiments which include, allow and/or facilitate such encryption key definitions and uses, and/or such key replacements are included within the scope of this disclosure.

Variable Encryption Methods

In an embodiment, user data is encrypted with a symmetric-key encryption algorithm. In an embodiment, the encryption algorithm used is a "cryptographically strong" encryption algorithm. However, alternate embodiments included herein may utilize relatively weak encryption algorithms, especially when those weaker algorithms offer some concomitant benefit, such as ease of computing or compliance with national security mandates. In fact, alternate embodiments may not utilize any encryption at all, but may, instead, rely on some other form of data obscuration or protection. All such embodiments are included within the scope of this disclosure.

In an embodiment, user data is encrypted with a cryptographically-strong encryption algorithm. This means that user data will receive a high degree of security with respect to unauthorized access to, and viewing of, user data, which most users would likely believe to be a positive aspect of a private DSS. However, the use of a cryptographically-strong encryption algorithm also has some possibly negative consequences.

For instance, if an embodiment were to offer users the possibility of attempting to recover a lost or forgotten encryption key, for which no replacement copy of the key could be obtained from a friend, or from any other source, then the computational complexity, and the computing resources, required to successfully complete a cryptographic attack, and thus discover the user's encryption key, would be much higher and more costly in the event that cryptographically strong encryption had been used.

Also, alternate embodiments may elect to search for inappropriate content, e.g. exploitation of children, terrorism, etc., by attacking select elements of user data, for example, through the use of some password-cracking algorithm. In this type of alternate embodiment, the use of a cryptographically-strong encryption algorithm can make the execution of such attacks prohibitively expensive in terms of the time and computing resources required.

Alternate embodiments which utilize cryptographically-weak encryption algorithms can enjoy the advantages of being able to recover, or discover (by means of a cryptographic attack), the encryption key of a user. However users of the private DSS, if they become aware of the weakness of the encryption used to protect their data, may lose confidence in the ability of the DSS to protect the privacy of their data. Such a lack of confidence may prevent an embodiment from attracting a sufficient number of active users to justify the expense of its implementation, maintenance and operation.

User Access to the Stored Decryption Keys of Contacts

If the decryption keys of a user's contacts are to be transmitted and/or stored in a doubly-encrypted form, utilizing not only the user's encryption key, but also another key unknown to the user, perhaps supplied by the DSS server, then there is likely no purpose to be served by allowing users to view the encrypted form of their contacts' decryption keys (encrypted with both keys, or just with the unknown key).

A question does arise if the decryption keys of a user's contacts are to be stored following encryption with only the encryption key of the user, or with any number of keys if all of those keys are known to the user. In this situation, the decryption keys of a user's contacts might reasonably be made available for viewing by the user in an unencrypted form. However, this may compromise the security of those keys.

Some users may appreciate having the ability to, at any time, directly view the decryption keys of their friends and/or contacts. These keys may serve as a "signature" for each user, for example "Rodeo Bob" or "Twinkle Toes." And users may derive some satisfaction from having particularly clever keys. Some users may also find some reassurance in being able to verify that the key being used by each friend appears to have been generated by that friend, e.g. that it seems consistent with the personality, occupation, interests, etc. of that friend.

Using plain, user-viewable encryption and/or decryption keys may also simplify the process whereby a user manually enters a key into his DSS client program, if the DSS implementation requires or at least allows such user action. Presumably, friend keys will be composed of intelligible phrases or sentences which will simplify the remembrance of these keys as they are entered.

However, a negative consequence of allowing users to view the unencrypted keys of their contacts is that it creates a security risk. If a user is malicious, or if the security of a user's computer is compromised, then it might be possible for a malicious user or hacker to gain access to a user's friends' keys in the same manner that a user would use to access and view those keys. This might provide a malicious user or hacker knowledge of not only the decryption key of the user, but also of the user's contacts. It might be unwise to allow, and users might resent the possibility that, the security of a user's data might be compromised through the bad intentions, poor security, or bad luck, of a friend or contact.

Alternative Architectures

While an embodiment utilizes an architecture in which a DSS server is responsible for the "server" functionalities of storing and transmitting encrypted user data, there are alternative embodiments which also achieve the innovative aspects and are therefore included within the scope of this disclosure.

An embodiment utilizes a DSS server in which an integrated collection of computers, servers, and/or programs accomplish the requisite tasks of: (a) storing, transmitting and otherwise processing the encrypted pieces of user data; and (b) validating login usernames and passwords.

An alternate embodiment would implement these server functionalities by means of distributed, loosely-connected network of computers, servers, and/or programs. These distributed servers can potentially offer users the benefit of lower latencies in their interactions with the private DSS since the distributed servers can include one or more servers local to each user. Shorter geographical distances between users, and the servers with which they communicate, can reduce communication-based latencies.

A potential negative consequence of creating a distributed DSS server would be the risk that modifications to user data on one distributed server might take a non-trivial amount of time to be communicated to the other distributed servers in the collection of servers which define a private DSS.

Another possible alternate embodiment would be to have the server functionality actually implemented within each DSS client. In other words, each DSS client would be responsible for storing and transmitting encrypted user data. In such an alternate embodiment, it is likely that redundant copies of each piece of encrypted user data would be distributed across many individual DSS client/servers, that is, the DSS client/servers of many different users.

In addition to the alternate embodiments already discussed, many other possible architectures that would also be capable of implementing the innovations are disclosed herein. In other words, there are many different architectures which can still encrypt all, or almost all, user data using an encryption key (or keys) supplied by the users themselves. These other alternate embodiments can also provide for the storage and transmission of only encrypted user data. And, they can provide the other functionalities discussed in this disclosure.

Detection of Fraudulent DSS Clients

In an embodiment of the private DSS, the client program is relied upon to enforce certain aspects of the data protection and control upon which the maintenance of privacy depends. For instance, after decrypting the key locker a client is responsible for ensuring that the contents of that key locker, namely the decryption keys shared with a user by his friends and/or contacts, are protected and not made available to the user. As another example, in an embodiment, a user may associate various permission-attributes with a data packet in which those permission-attributes define what types of processing a contact or friend may apply to the contents of that packet. For instance, a user may specify that contacts may print the contents of one data packet, while specifying that contacts may not print the contents of another packet. A user may specify that contacts may save copies of the decrypted contents of a packet to their local hard drives, while specifying that contacts may not save copies of the decrypted contents of another data packet.

The DSS client is responsible for maintaining the security of the encryption and decryption keys of the user, and of the decryption keys of the user's contacts. It is also responsible for enforcing whatever limitations a user has specified for how a contact may use the contents of a data packet.

If a hacker were to engineer an alternate client which was able to successfully interact with the DSS server, he might engineer such an alternate client to reveal the keys contained within a key locker. He might engineer such an alternate client to ignore any specified limitations regarding what he may do with the decrypted contents of data packets shared with his client by the contacts of the user under whose credentials the client logged in to the server.

The use of such a "fraudulent" client would not need to be used in conjunction with a stolen username and/or password. It could also be used by an authorized user in order to obtain printouts and/or soft copies of the data shared with him by other users of the DSS. For example, if a private DSS is used by a company in order to manage access to, and protect the privacy of, its corporate data, then an employee of that company might seek to undermine the security of the company's data (especially data designated as "read only" by the company). Such an employee might use a fraudulent client in order to circumvent the read-only protections and limitations associated by a company with some of its data.

An embodiment might reduce the risk that a fraudulent client could be used to compromise the security of a private DSS through the following method:

A user retrieves a client program from a server. The user's retrieval of the client could precede the user's logging in to the server, or it could occur only after a successful log in. The client could be a program designed to operate within a "browser" program operating on the user's computing device. It could be a "stand-alone" program that operates independently of other programs on the user's computing device. Or it could be a program that operates in conjunction with other programs, including, but not limited to, browser programs, on the user's computing device.

The client that a user receives on his computing device could be one of many different client programs, and/or one of many different configurations of such that program, that a server was capable of sending to the user.

The actual client program and/or configuration of the program that the server sends to a user could be determined randomly or by some other method. However, it is most useful if the manner of selection, and the program and/or program configuration received by the user, would not be predictable by the user.

Each of the client programs and/or program configurations that the server is capable of sending to a user can be capable of:

performing a unique set of functions, the availability or lack thereof being detectable by the server (for example, responding to a specific query from the server);

providing a unique set of responses to a set of queries from the server; and executing a unique set of modifications to data packets transmitted from the client to the server; etc.

The server will know and remember which variation of the client program and/or program configuration that it sent to a user's computing device. It will thus be able to determine, through specific queries, the responses received from the client in response to those queries, and/or analyses of the data transmitted to it by the client, whether or not the pattern of responses and/or failed responses, and/or the pattern of variations detected in the data that it receives from the client, is consistent with the variation in the client, and/or the variation in the configuration of the client, that it sent to the user's computing device.

If the server detects a discrepancy between the pattern of behaviors and/or variations in data observed with respect to the client being used by a user, with the pattern of behaviors and/or variations in data expected of the client sent to the user by the server, then the server can block or limit the user's access to the DSS.

The ability of a hacker to adapt to the variations prescribed by the server for the client through which he is supposed to access the DSS can be reduced by using a client which is programmed to log the user out and/or otherwise disconnect from the DSS after a specified length of time, after which the user would be forced to obtain a new client, characterized by a new set of variations, from the server, and to use that new client in order to access the DSS.

IV. Additional Disclosure Informations (1) Specific machines are used in the systems and methods herein. A preferred embodiment can use a computing device capable of communicating digital data across a network of some kind, and a means of storing digital data which, when controlled by software of the kind taught herein, will form a server capable of forming the basis of a private DSS of the type taught herein, and which is usually referred in this disclosure as a "DSS server."

An embodiment can also include at least one computing device capable of communicating digital data across a network of some kind and a means of storing digital data which, when controlled by software of the kind taught herein, forms a client program capable of communicating with the DSS server across the relevant type(s) of network(s).

Both the DSS server and DSS client computing devices likely use one or more specialized hardware modules (such as Ethernet cards and/or wireless Internet cards) dedicated to the transmission and receipt of digital data over the respective sharing network(s).

The DSS client computing device can use a built-in and/or peripheral component which enables that computing device to communicate user data and/or other media, content, etc. to the user. This can likely be satisfied with components that generate visual and audio data for the user (such as a computer monitor and sound system). However, this might be satisfied and/or augmented with component(s) capable of providing data to users through the generation of tactile information and Braille output devices and Braille printers are examples of these components. It might also be satisfied and/or augmented with component(s) capable of directly communicating data to a user via electrical stimulation of some portion of the user's nervous system, and examples of such components include electrode arrays attached to a person's skin The DSS client computing device can include a built-in and/or peripheral component which enables the user to communicate with the DSS client, and thereby to indirectly communicate with the DSS server and other users of the private DSS. This can likely be satisfied with components that generate electrical signals and/or digital data in response to user actions, examples of such components include keyboards, mice and touch screens. This can be satisfied and/or augmented with component(s) capable of translating user actions into digital data by means of tactile input (e.g. a keyboard), visual input (e.g. a video camera), audio input (e.g. a microphone) and even by means of electrical impulses and signals generated directly by the user's nervous system (e.g. electrodes on the scalp).

(2) Data is transformed in the systems and methods herein. Digital data of various forms and formats (e.g. text, photos, audio, etc.) are transformed into representations which cannot be read, viewed, understood, edited and/or exploited without knowledge of the data and/or algorithm and/or secret required for its restoration. In a primary embodiment, this data obfuscation is accomplished by means of a symmetric-key encryption method (and corresponding program, or portion of a program) using an encryption key defined by, and known only to, the author of each element of encrypted data. Only this transformed and obfuscated data is stored within the DSS server and transmitted throughout the DSS.

(3) Articles are transformed in systems and methods herein. The memory elements (i.e. the bits) of the storage device(s) of the DSS server are transformed as they store encrypted user data. The storage devices of the users of the DSS are transformed in a similar manner as only encrypted user data is stored on the user computing devices by the DSS client (with the possible embodiment-dependent exception of limited amounts of unencrypted user data such as email addresses, data-packet distribution lists, etc.).

Also, the memory elements and transmission circuits associated with the implementation of the data-distribution network(s) through which the DSS server and DSS client's share data are transformed relative to what they might have been in the absence of this disclosure in that instead of storing and transmitting data which is either not encrypted or is encrypted with a key known to the servers, they store and transmit data for which the decryption key is not known to the servers responsible for its transmission.

(4) Algorithms are used in systems and methods herein. In a preferred embodiment, each DSS client can use a symmetric-key encryption algorithm for which only the user of the DSS client knows the key used for encrypting data and/or for decrypting data originally generated by the respective user; and only the DSS client knows the keys used for decrypting the data originally generated by other users of the system.

In some embodiments, other encryption and/or data obfuscation algorithms (including algorithms not known to the public and specified by the users themselves) may be used to implement the DSS client's. These other encryption and/or data obfuscation algorithms may be associated with separate algorithms required for the restoration of the encrypted and/or obfuscated data. For instance, a private DSS of the type herein might utilize a "public key" encryption algorithm.

A primary embodiment can also use a specialized data structure referred to herein as a "key locker." This key locker can store all of the encryption and/or decryption keys required for the nominal operation of the DSS client. In an alternate embodiment, the key locker does not store the user's primary encryption key. In this embodiment, the user's primary encryption key can be an independent and separate data value (of that of the friend's key), and an example can be a string like "My favorite color is blue."

(5) One or more microprocessors can be involved in the present system and method, in the sense that a computing device implements the DSS server and each DSS client, and a computing device, by definition, contains at least one processor. The processor of each computing device implements the data-manipulation steps specified in the software (i.e. the DSS server program(s) and the DSS client program(s)) used to control their respective computing devices.

(6) Data is processed in the present system and method. A prevalent form of processed data is user data which has been encrypted with an encryption key known only to the respective users.

Whereas, with respect to the physical world, the original, i.e. unencrypted, data may be read and processed by many unmodified computing devices and subsequently used by those computing devices to generate pictures and sounds which are intelligible to humans. The encrypted data, i.e. the "processed" data, in the absence of the user's decryption key, cannot be translated by a computing device into pictures or sounds which would be intelligible to humans and the encrypted data cannot be exploited by people other than the user who is the author of that data.

(7) The data can be represented and manipulated as explained below. Potentially sensitive and/or embarrassing user data is encrypted with an encryption key known only to the user who generates the data and only to the DSS client's of the recipients authorized by the user to receive, read, view, hear and/or otherwise experience that data. Therefore, original user data (such as text, photos and/or videos) is encrypted and only these encrypted forms of user data are stored and transmitted by the private DSS. Only in the DSS client program of an authorized user of the DSS, i.e. one possessing the requisite decryption key, can encrypted user data be restored and experienced.

For the most part, both the original and encrypted data represent images, descriptions, audio recordings, etc. of physical objects, human experiences, etc.

(8) A number of "non-transitory computer-readable storage medium with an executable program stored therein wherein the program instructs a microprocessor to perform specific steps" are disclosed in the present system and method. Steps of the DSS client are outlined in the textual translation above following FIG. 4. The steps of the DSS client primarily involve storing, retrieving, and transmitting to the appropriate DSS servers: (a) user account information, including user names and passwords; and (b) encrypted user data associated with unencrypted file attributes like user ID, creation date, etc.

The DSS server is also responsible for facilitating the exchange of decryption keys between users of the DSS who decide to share data, i.e. to be "friends."

Although the present inventions have been described in terms of preferred and alternative embodiments above, numerous modifications and/or additions to the above-described embodiments would be readily apparent to one skilled in the art. The embodiments can be defined as methods carried out by any one, any subset of or all of the components and/or users; as servers/clients/computing devices adapted to or programmed to carry out certain functions/methods/steps; as a system of one or more components in a certain structural and/or functional relationship; as a "non-transitory computer-readable storage medium with an executable program stored therein wherein the program instructs a microprocessor to perform specific steps." As another example, the inventions can include subassemblies or sub-methods. However, it is intended that the scope of the present inventions extend to all such modifications and/or additions and that the scope of the present inventions is limited solely by the claims set forth herein.

What is claimed is:

1. A method by a data sharing system (DSS) server, which is operably connected to a data distribution network (DDN) that includes a first client of a first user, a second client of a second user and a third client of a third user, of facilitating the private sharing of data between the first, second and third client, the method comprising:
receiving via the DDN a first obfuscated data packet (ODP) from the first client;
transmitting via the DDN the first ODP, or a copy thereof, to the second client;
transmitting via the DDN the first ODP, or a copy thereof, to the third client;
receiving via the DDN a second ODP from the second client;
transmitting via the DDN the second ODP, or a copy thereof, to the first client;
transmitting via the DDN the second ODP, or a copy thereof, to the third client;
receiving via the DDN a third ODP from the third client;
transmitting via the DDN the third ODP, or a copy thereof, to the first client;
transmitting via the DDN the third ODP, or a copy thereof, to the second client;
wherein the server lacks the "value, method and/or program or portion of a program" (VMP) needed to de-obfuscate the first ODP;
wherein the server lacks the VMP needed to de-obfuscate the second ODP; and
wherein the server lacks the VMP needed to de-obfuscate the third ODP.

2. The method of claim 1 wherein the first ODP is an encrypted data packet.

3. The method of claim/wherein the second ODP is an encrypted data packet.

4. The method of claim 3 wherein the third ODP is an encrypted data packet.

5. The method of claim 1 further comprising the server storing a copy of the first ODP.

6. The method of claim 5 further comprising the server storing a copy of the second ODP.

7. The method of claim 6 further comprising the server storing a copy of the third ODP.

8. The method of claim 1 wherein the first ODP contains a decryption VMP of the first user.

9. The method of claim 8 wherein the second ODP contains a decryption VMP of the second user.

10. The method of claim 9 wherein the third ODP contains a decryption VMP of the third user.

11. The method of claim 1 wherein the first ODP and the second ODP are obfuscated with different data obfuscation values and/or programs or portions of programs.

12. The method of claim 11 wherein the differing obfuscation values and/or programs or portions of programs are differing cryptographic keys used in conjunction with the same or differing symmetric-key algorithms.

13. The method of claim 11 wherein the third ODP is obfuscated with different data obfuscation values and/or programs or portions of programs than either of the first ODP or the second ODP.

14. The method of claim 13 wherein the differing obfuscation values and/or programs or portions of programs are differing cryptographic keys used in conjunction with the same or differing symmetric-key algorithms.

15. The method of claim 1 wherein the DDN includes a fourth client of a fourth user, and a fifth client of a fifth user.

16. The method of claim 15 further comprising:
receiving via the DDN a fourth ODP from the fourth client;
transmitting via the DDN the fourth ODP, or a copy thereof, to the fifth client;
receiving via the DDN a fifth ODP from the fifth client;
transmitting via the DDN the fifth ODP, or a copy thereof, to the fourth client;
the server lacking the VMP needed to de-obfuscate the fourth ODP; and
the server lacking the VMP needed to de-obfuscate the fifth ODP.

17. The method of claim 16 further comprising:
before the receiving the first ODP, receiving via the DDN valid first log-in credentials from the first client;

before the receiving the second ODP, receiving via the DDN valid second log-in credentials from the second client;

before the receiving the third ODP, receiving via the DDN valid third log-in credentials from the third client;

before the receiving the fourth ODP, receiving via the DDN valid fourth log-in credentials from the fourth client; and before the receiving the fifth ODP, receiving via the DDN valid fifth log-in credentials from the fifth client.

18. The method of claim 17 further comprising determining whether the first, second, third, fourth and fifth log-in credentials are valid by identifying whether or not a respective user-specified username is associated with an account known to the server, and, whether or not a respective user-specified password, or a respective variation thereof, or an alternate means of determining a user's identity, exactly matches the respective password, respective specific variation thereof, or respective alternate identifying data, associated with any respective specific user-specified username.

19. The method of claim 18 wherein the respective variation thereof is an encrypted version of the respective password thereof.

20. The method of claim 17 further comprising:
  determining that the users with which the first user has opted to mutually share data through the DDS include at least the second and third users;
  determining that the users with which the second user has opted to mutually share data through the DDS include at least the first and third users;
  determining that the users with which the third user has opted to mutually share data through the DDS include at least the first and second users;
  determining that the users with which the fourth user has opted to mutually share data through the DDS include at least the fifth user; and
  determining that the users with which the fifth user has opted to mutually share data through the DDS include at least the fourth user.

21. The method of claim 20 wherein each of the determining steps are before the respective transmitting, via the DDN:
  of the first ODP, or a copy thereof, to the at least second and third clients;
  of the second ODP, or a copy thereof, to the at least first and third clients;
  of the third ODP, or a copy thereof, to the at least first and second clients;
  of the fourth ODP, or a copy thereof, to the at least fifth client; and
  of the fifth ODP, or a copy thereof, to the at least fourth client.

22. The method of claim 20 wherein the determining steps are done by identifying which pairs of users have both indicated to the server that they wish to exchange and/or share data.

23. The method of claim 22 wherein the identifying is by identifying which pairs of users have "friended" one another.

24. A data sharing system (DSS) client architecture, comprising:
  a computing device having operatively thereon a DSS client which is initialized by a first user with at least "a data obfuscation value and/or program or portion of a program" (DOVP);
  wherein the first user's DSS client, using a DOVP of the first user, is configured to obfuscate a data file of the first user and to transmit the obfuscated data file (ODF) over a data distribution network for receipt by at least second and third DSS clients, of second and third users, respectively;
  wherein the second DSS client is initialized with at least a DOVP of, and by, the second user;
  wherein the second user's DSS client, using a DOVP of the second user, is configured to obfuscate a data file of the second user and to transmit the ODF over a data distribution network for receipt by at least the first and third DSS clients, of the first and third users, respectively;
  wherein the third DSS client is initialized with at least a DOVP of, and by, the third user;
  wherein the third user's DSS client, using a DOVP of the third user, is configured to obfuscate a data file of the third user and to transmit the ODF over a data distribution network for receipt by at least the first and second DSS clients, of the first and second users, respectively;
  wherein the DOVP of the first user is not the same as the DOVP of the second user;
  wherein the DOVP of the first user is not the same as the DOVP of the third user;
  wherein the DOVP of the second user is not the same as the DOVP of the third user;
  wherein the second DSS client is configured to de-obfuscate the ODF of the first user using "a data de-obfuscation value and/or program or portion of a program" (DDVP) which the first user, directly or indirectly, provided to the second user;
  wherein the third DSS client is configured to de-obfuscate the ODF of the first user using a DDVP which the first user provided, directly or indirectly, to the third user;
  wherein the first DSS client is configured to de-obfuscate the ODF of the second user using a DDVP which the second user, directly or indirectly, provided to the first user;
  wherein the third DSS client is configured to de-obfuscate the ODF of the second user using a DDVP which the second user provided, directly or indirectly, to the third user;
  wherein the first DSS client is configured to de-obfuscate the ODF of the third user using a DDVP which the third user, directly or indirectly, provided to the first user; and
  wherein the second DSS client is configured to de-obfuscate the ODF of the third user using a DDVP which the third user provided, directly or indirectly, to the second user.

25. The architecture of claim 24 wherein the DOVD of the first user is an alphanumeric character string suitable for use as a symmetric-key-encryption cryptographic key.

26. The architecture of claim 25 wherein the DOVD of the second user is an alphanumeric character string suitable for use as a symmetric-key-encryption cryptographic key.

27. The architecture of claim 26 wherein the DOVD of the third user is an alphanumeric character string suitable for use as a symmetric-key-encryption cryptographic key.

28. The architecture of claim 24 wherein transmissions between the first, second and third DSS clients are via a DSS server.

29. The architecture of claim 24 wherein the ODF of the first user is stored in a DSS server of the data distribution network.

30. The architecture of claim 29 wherein the ODF of the second user is stored in a DSS server of the data distribution network.

31. The architecture of claim 30 wherein the ODF of the third user is stored in a DSS server of the data distribution network.

32. The architecture of claim 24 wherein the DDVP is provided by exchanging the DDVP through a DDS server when the version of DDVP sent to, received by, and forwarded by, the DDS server was obfuscated using a DOVP for which the complementary DDVP was neither in the possession of nor accessible by the DSS server.

33. The architecture of claim 24 wherein the DDVP used by the second DSS client to de-obfuscate the ODF received from the first user is stored in a data object within the second DSS client.

34. The architecture of claim 33 wherein the data object is a key locker.

35. The architecture of claim 34 wherein the key locker is configured to have been retrieved from a DSS server.

36. The architecture of claim 35 wherein the key locker which the second DSS client received from the DSS server was obfuscated using a DOVP whose complementary DDVP was neither in the possession of nor accessible by the DSS server.

37. A data sharing system (DSS) method by a DSS client of a first user, comprising:
receiving first and second obfuscated data packets from a DSS client of a second user and via a data distribution network;
wherein the first and second obfuscated data packets were obfuscated using at least a first obfuscating algorithm and/or parameter of, and unique to, the second user;
de-obfuscating the first and second obfuscated data packets using at least first de-obfuscating algorithm and/or parameter of the second user, complementary to the first obfuscating algorithm and/or parameter of the second user;
receiving third and fourth obfuscated data packets from a DSS client of a third user and via the data distribution network;
wherein the third and fourth obfuscated data packets were obfuscated using at least a second obfuscating algorithm and/or parameter of, and unique to, the third user; and
de-obfuscating the third and fourth obfuscated data packets using at least a second de-obfuscating algorithm and/or parameter of the third user and unique to the third user, complementary to the second obfuscating algorithm and/or parameter of the third user.

38. The method of claim 37 wherein the first, second, third and fourth obfuscated data packets are first, second, third and fourth encrypted data packets, respectively;
the first and second encrypted data packets were encrypted using a first encryption key of, and unique to, the second user;
the de-obfuscating the first and second obfuscated data packets includes decrypting the first and second encrypted data packets using a first decryption key of the second user, complementary to the first encryption key of the second user;
the receiving third and fourth obfuscated data packets includes receiving the third and fourth encrypted data packets from the DSS client of the third user and via the data distribution network;
the third and fourth encrypted data packets were encrypted using a second encryption key of, and unique to, the third user; and
the de-obfuscating the third and fourth obfuscated data packets includes decrypting the third and fourth encrypted data packets using a second decryption key of the third user and unique to the third user, complementary to the second encryption key of the third user.

39. The method of claim 38 further comprising before decrypting the first and second encrypted data packets, receiving the first decryption key from a key locker of the first user.

40. The method of claim 38 wherein the decrypting the first and second encrypted data packets includes the first decrypted data being a double encrypted data.

41. The method of claim 37 wherein the receiving is from a DSS server of the data distribution network.

42. A non-transitory computer-readable storage medium with an executable program stored therein wherein the program instructs a microprocessor to perform the following steps:
encrypting data prior to transmission of the data to another program and/or to a data distribution network;
decrypting at least some of the data received from a data distribution network using a "decryption key and/or a decryption methodology" determined at least in part by a user of the program and/or another user of a similar program connected to the program by the data distribution network; and
sharing of data between, among and by at least three users of three different instances of the program operating on three different computing devices;
wherein each user's key used for both encryption and decryption, and/or pair of complementary encryption and decryption keys, is different from the key or keys of the other at least two users, thereby requiring each user to possess a different at least one decryption key for each other user in order to decrypt the data received from each other user.

43. The storage medium of claim 42 wherein the at least three users of instances of the program include:
a first user's instance of the program which has access to a first decryption key and a different second decryption key;
a second user's instance of the program which has access to a copy of the first decryption key and which does not have access to a copy of the second decryption key; and
a third user's instance of the program which has access to a copy of the second decryption key and which does not have access to a copy of the first decryption key.

44. The storage medium of claim 42 wherein the storage medium is a hard drive, disk drive or other non-volatile memory device positioned in a private data sharing system server.

45. A data sharing system (DSS) client architecture, comprising:
a first computing device having operatively thereon a first DSS client which is initialized by a first user with at least a "data obfuscation value and/or program or portion of a program" (DOVP) of, and by, the first user;
a second computing device having operatively thereon a second DSS client which is initialized by a second user with at least a DOVP of, and by, the second user;
a third computing device having operatively thereon a third DSS client which is initialized by a third user with at least a DOVP of, and by, the third user;
the DOVP of the first user not being the same as the DOVP of the second user;
the DOVP of the first user not being the same as the DOVP of the third user;
the DOVP of the second user not being the same as the DOVP of the third user;
the first user's client, using the DOVP of the first user, being configured to obfuscate a data file of the first user and to transmit the obfuscated data file (ODF) over a data distribution network for receipt by at least second and third DSS clients, of second and third users, respectively;

the second client, using a DOVP of the second user, being configured to obfuscate a data file of the second user and to transmit the ODF over a data distribution network for receipt by at least the first and third DSS clients, of the first and third users, respectively;

the third client, using a DOVP of the third user, being configured to obfuscate a data file of the third user and to transmit the ODF over a data distribution network for receipt by at least the first and second DSS clients, of the first and second users, respectively;

the first DSS client being configured to de-obfuscate the ODF of the second user using a "data de-obfuscation value and/or program or portion of a program" (DDVP) which the second user, directly or indirectly, provided to the first user;

the first DSS client being configured to de-obfuscate the ODF of the third user using a DDVP which the third user, directly or indirectly, provided to the first user;

the second DSS client being configured to de-obfuscate the ODF, of the first user using a DDVP which the first user, directly or indirectly, provided to the second user;

the second DSS client being configured to de-obfuscate the ODF of the third user using a DDVP which the third user provided, directly or indirectly, to the second user;

the third DSS client being configured to de-obfuscate the ODF of the first user using a DDVP which the first user provided, directly or indirectly, to the third user; and the third DSS client being configured to de-obfuscate the ODF of the second user using a DDVP which the second user provided, directly or indirectly, to the third user.

46. The architecture of claim 45 wherein the DOVD of, and by, the first user is an alphanumeric character string suitable for use as a symmetric-key-encryption cryptographic key.

47. The architecture of claim 45 wherein transmissions between the first, second and third DSS clients are via a DSS server.

48. The architecture of claim 45 wherein the ODF of the first user is stored in a DSS server of the data distribution network.

49. The architecture of claim 45 wherein any one of the DDVPs is provided by means of exchanging the DDVP through a DDS server when the version of DDVP sent to, received by, and forwarded by, the DDS server was obfuscated using a DOVP for which the complementary DDVP was neither in the possession of nor accessible by the DSS server.

50. The architecture of claim 45 wherein the DDVP used by the first DSS client to de-obfuscate the ODF received from the second user is stored in a data object within the first DSS client.

51. The architecture of claim 45 wherein the DDVP used by the first DSS client to de-obfuscate the ODF received from the second user was previously stored in a key locker within the first DSS client.

52. The architecture of claim 51 wherein the key locker used by the first DSS client was retrieved from a DSS server.

53. The architecture of claim 52 wherein the key locker which the first DSS client received from the DSS server was obfuscated using a DOVP for which the complementary DDVP was neither in the possession of nor accessible by the DSS server.

54. A data sharing system (DSS) method by a DSS client of a first user, comprising:

receiving a first obfuscating algorithm and/or parameter (OAP) from the first user;

receiving first and second obfuscated data packets;

wherein the first and second obfuscated data packets were obfuscated using at least the first OAP;

receiving second and third obfuscated data packets;

wherein the second and third obfuscated data packets were obfuscated using at least a second OAP of, and unique to, a second user:

receiving fifth and sixth obfuscated data packets;

wherein the fifth and sixth obfuscated data packets were obfuscated using at least a third OAP of, and unique to, a third user;

de-obfuscating the first and second obfuscated data packets using at least a first de-obfuscating algorithm and/or parameter (DeOAP) of the first user, and unique to the first user, complementary to the first OAP of the first user;

de-obfuscating the third and fourth obfuscated data packets using at least a second DeOAP of the second user, and unique to the second user, complementary to the second OAP of the second user;

de-obfuscating the fifth and sixth obfuscated data packets using at least a third DeOAP of the third user, and unique to the third user, complementary to the third OAP of the third user;

receiving the first and second obfuscated data packets via the data distribution network;

receiving the third and fourth obfuscated data packets from a DSS client of the second user and via a data distribution network; and receiving the fifth and sixth obfuscated data packets from a DSS client of the third user and via the data distribution network.

55. The method of claim 54 wherein the receiving is from a DSS server of the data distribution network.

56. The method of claim 54 further comprising before the de-obfuscating, receiving the second de-obfuscating algorithm and/or parameter of the second user from a key locker of the first user.

57. The method of claim 56 further comprising before the de-obfuscating, receiving the third de-obfuscating algorithm and/or parameter of the third user from a key locker of the first user.

58. The method of claim 56 wherein the decrypting includes the third and fourth obfuscated data packets being a double-obfuscated data, and the decrypting the obfuscated data further includes decrypting using a DSS-server-generated de-obfuscation algorithm and/or parameter.

59. The method of claim 58 further comprising before the decrypting the double-obfuscated data, obtaining the DSS-server-generated de-obfuscation algorithm and/or parameter from a DSS server of the data distribution network.

60. The method of claim 56 wherein: the second DeOAP of the second user, embedded within de-obfuscated contents of the obfuscated data object, was transmitted to the DSS client of the first user, and subsequently imported into the de-obfuscated contents of the obfuscated data object, contemporaneously with the first user's DSS client's transmission of a copy of the first DeOAP of the first user to the DSS client, of the second user.

61. The method of claim 60 wherein: the third DeOAP of the third user, embedded within de-obfuscated contents of the obfuscated data object, was transmitted to the DSS client of the first user, and subsequently imported into the de-obfuscated contents of the obfuscated data object, contemporaneously with the first user's DSS client's transmission of a copy of the first DeOAP of the first user to the DSS client of the third user.

62. The method of claim 61 wherein: a fourth DeOAP of a fourth user, is not transmitted to the DSS of the first user, and subsequently imported into the de-obfuscated contents of the obfuscated data object.

63. The method of claim 61 wherein: the first user's DSS client does not transmit a copy of the first DeOAP of the first user to the DSS client of a fourth user.

* * * * *